US011200248B2

(12) United States Patent
Murray et al.

(10) Patent No.: US 11,200,248 B2
(45) Date of Patent: *Dec. 14, 2021

(54) TECHNIQUES FOR FACILITATING THE JOINING OF DATASETS

(71) Applicant: Oracle International Corporation, Redwood Shores, CA (US)

(72) Inventors: Glenn Allen Murray, Boulder, CO (US); Luis E. Rivas, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/731,850

(22) Filed: Dec. 31, 2019

(65) Prior Publication Data

US 2020/0210417 A1 Jul. 2, 2020

Related U.S. Application Data

(63) Continuation of application No. 15/705,108, filed on Sep. 14, 2017, now Pat. No. 10,565,222.

(Continued)

(51) Int. Cl.
*G06F 16/248* (2019.01)
*G06F 16/2455* (2019.01)
(Continued)

(52) U.S. Cl.
CPC ........ *G06F 16/248* (2019.01); *G06F 16/2456* (2019.01); *G06F 3/0482* (2013.01); *G06F 3/04817* (2013.01)

(58) Field of Classification Search
CPC .............. G06F 16/2456; G06F 3/0482; G06G 3/04818
See application file for complete search history.

(56) References Cited

U.S. PATENT DOCUMENTS 5,511,190 A 4/1996 Sharma et al.
6,556,983 B1 4/2003 Altschuler et al.
(Continued)

OTHER PUBLICATIONS

"Apache Tika—A Content Analysis Toolkit", The Apache Software Foundation, Available Online at http://tika.apache.org/, Dec. 23, 2015, pp. 1-9.

(Continued)

*Primary Examiner* — Baoquoc N To
(74) *Attorney, Agent, or Firm* — Kilpatrick Townsend & Stockton LLP

(57) ABSTRACT

Techniques are disclosed for a system that provides an intuitive way for merging or joining data from different datasets. The system may provide graphical interfaces to enable a user to combine or join datasets identified as having a relationship. In at least one embodiment, the system can determine options for joining datasets, such as by a left join, right join, or outer join. A graphical interface may display a visual representation (e.g., a "Glenn Diagram") illustrate options for joining datasets based on identifying a relationship between the data sets. The representation may further illustrate one or more types of joins and information about the data, such as rows where data may be joined based on the type of join function for the relationship by columns. The visual representation may indicate where the datasets can be joined, such that they are not overlapping.

20 Claims, 34 Drawing Sheets

Related U.S. Application Data

(60) Provisional application No. 62/395,352, filed on Sep. 15, 2016.

(51) Int. Cl.
*G06F 3/0481* (2013.01)
*G06F 3/0482* (2013.01)

(56) References Cited

U.S. PATENT DOCUMENTS

| | | | |
|---|---|---|---|
| 6,839,724 | B2 | 1/2005 | Manchanda et al. |
| 7,571,177 | B2 | 8/2009 | Damle |
| 8,082,233 | B2 | 12/2011 | Bhandari |
| 8,155,951 | B2 | 4/2012 | Jamieson |
| 8,458,191 | B2 | 6/2013 | Bhattacharjee et al. |
| 8,874,616 | B1 | 10/2014 | Coffman et al. |
| 9,792,351 | B2 | 10/2017 | Hernandez-Sherrington et al. |
| 10,083,223 | B2 | 9/2018 | Le Biannic |
| 10,445,062 | B2 | 10/2019 | Oberbreckling et al. |
| 2006/0282429 | A1 | 12/2006 | Hernandez-Sherrington et al. |
| 2007/0112827 | A1 | 5/2007 | Dettinger et al. |
| 2008/0281820 | A1 | 11/2008 | Do et al. |
| 2011/0106791 | A1 | 5/2011 | Maim |
| 2011/0208748 | A1 | 8/2011 | Chaudhuri et al. |
| 2011/0225167 | A1 | 9/2011 | Bhattacharjee et al. |
| 2012/0101975 | A1 | 4/2012 | Khosravy |
| 2012/0254201 | A1* | 10/2012 | Cochrane ............... G06F 16/26 707/754 |
| 2013/0110792 | A1 | 5/2013 | Hudis et al. |
| 2014/0067728 | A1 | 3/2014 | Ogren et al. |
| 2014/0074829 | A1 | 3/2014 | Schmidt |
| 2015/0074117 | A1 | 3/2015 | Gorelik et al. |
| 2015/0106324 | A1 | 4/2015 | Puri et al. |
| 2015/0220080 | A1 | 8/2015 | Nixon et al. |
| 2015/0254255 | A1 | 9/2015 | Trivedi et al. |
| 2015/0269161 | A1 | 9/2015 | Bhagavan et al. |
| 2016/0055205 | A1* | 2/2016 | Jonathan ............. G06F 16/9024 707/714 |
| 2016/0055221 | A1 | 2/2016 | Paquette et al. |
| 2016/0092090 | A1 | 3/2016 | Stojanovic et al. |
| 2016/0259826 | A1 | 9/2016 | Acar et al. |
| 2017/0116227 | A1 | 4/2017 | Shaked |
| 2017/0132289 | A1 | 5/2017 | Palaniappan et al. |
| 2017/0149924 | A1 | 5/2017 | Peterson et al. |
| 2017/0185668 | A1 | 6/2017 | Convertino et al. |
| 2017/0193036 | A1 | 7/2017 | Yueh et al. |
| 2017/0364570 | A1 | 12/2017 | Jacob et al. |
| 2017/0371949 | A1 | 12/2017 | Le Biannic |

OTHER PUBLICATIONS

"Commons Virtual File System", The Apache Software Foundation, Available Online at http://commons.apache.org/proper/commons-vfs/index.html, Feb. 28, 2014, pp. 1-2.
"Gensim: Topic Modelling for Humans", Genism, Available Online at: https://radimrehurek.com/gensim/, Dec. 23, 2015, 2 pages.
"Hadoop MapReduce Next Generation—Writing YARN Applications", Apache Hadoop 2.4.1—HadoopMap Reduce Next Generation—2.4.1, Jun. 21, 2014, 11 pages.
"HDFS Permissions Guide", Apache Hadoop 2.7.1—HDFS Permissions Guide, Available Online at http://hadoop.apache.org/docs/current/hadoop-project-dist/hadoop-hdfs/HdfsPermissionsGuide.html, Dec. 23, 2015, 6 pages.
"Jaccard Index", Wikipedia, Available Online at: https://en.wikipedia.org/wiki/Jaccard_index, Dec. 23, 2015, 5 pages.
"K-Means Clustering", Wikipedia, Available Online at: https://en.wikipedia.org/wiki/K-means_clustering, Accessed from Internet on Jul. 12, 2019, pp. 1-12.
"Launching Spark on YARN", Spark 0.9.0, Available Online at: http://spark.apache.org/docs/0.9.0/running-on-yarn.html, Dec. 23, 2015, 4 pages.

"Making Sense of Word2vec, RaRe Technologies", RaRe Machine Learning Blog, Available Online at http://rare-technologies.com/making-sense-of-word2vec/, Dec. 23, 2014, pp. 1-16.
"MLlib—Feature Extraction and Transformation", Spark 1.5.2, Available Online at http://spark.apache.org/docs/latest/mllib-feature-extraction.html, Dec. 23, 2015, 9 pages.
"Running Spark on YARN", Spark 1.5.2, Available Online at: http://spark.apache.org/docs/latest/running-on-yarn.html, Dec. 23, 2015, 4 pages.
"Securing the Hadoop Ecosystem", ATM (Cioudera) & Tucu (Cioudera), Hadoop Summit, Available Online at http://www.slideshare.net/Hadoop_Summit/abdelnur-myers-june261120room230av2, Jun. 2013, pp. 1-27.
"Service Level Authorization Guide", Apache Hadoop 2.6.0-cdh5.5.1, Available Online at http://archive.cloudera.com/cdh5/cdh/5/hadoop/hadoop-project-dist/hadoop-common/ServiceLevelAuth.html, Dec. 23, 2015, 3 pages.
"Sorensen-Dice Coefficient", Wikipedia, Available Online at https://en.wikipedia.org/wiki/S%C3%B8rensen%E2%80%93Dice_coefficient, Dec. 23, 2015, 4 pages.
"Sqoop User Guide (v1.4.2)", Available Online at: http://sqoop.apache.org/docs/1.4.2/SqoopUserGuide.html, Dec. 23, 2015, 37 pages.
"Suffix Tree", Wikipedia, Available Online at: http://en.wikipedia.org/wiki/Suffix_tree, Dec. 23, 2015, 7 pages.
"Supported File Systems", Commons VFS, Version: 2.1-Snapshot, Available Online at http://commons.apache.org/proper/commons-vfs/filesystems.html, Feb. 28, 2014, 6 pages.
"Trie", Wikipedia, Available Online at: http://en.wikipedia.org/wiki/Trie, Dec. 23, 2015, 8 pages.
"Tversky index", Wikipedia, Available Online at: https://en.wikipedia.org/wiki/Tversky_index, Dec. 23, 2015, 2 pages.
"Welcome to Apache Flume", Available Online at: http://flume.apache.org/, Dec. 23, 2015, 7 pages.
"Yago: A High-Quality Knowledge Base, Databases and Information Systems", Max Planck Institut Informatik, Available Online at: http://www.mpi-inf.mpg.de/departments/databases-and-information-systems/research/yago-naga/yago//, Dec. 23, 2015, 4 pages.
Angell, et al., "Automatic Spelling Correction Using Trigram Similarity Measure", Information Processing & Management, vol. 19, No. 4, 1983, received for publication Feb. 4, 1982, pp. 255-261.
Boruvka, "On a Certain Minimal Problem", Faculty of Moravian, vol. III, Publication 3, 1926, pp. 37-58.
Buscaldi, et al., "LIPN-CORE: Semantic Text Similarity using n-grams, WordNet", Syntactic Analysis, ESA and Information Retrieval based Features, Second Joint Conference on Lexical and Computational Semantics Proceedings of the Main Conference and the Shared Task, Jun. 13-14, 2013, pp. 162-168.
Dave, "IndexedRDD: Efficient Fine-Grained Updates for RDD's", UC Berkeley AMPLab, Available Online at: http://www.slideshare.net/SparkSummit/ankur-dave, Jun. 15, 2015, 26 pages.
Edmonds, "Choosing the Word Most Typical in Context: Using a Lexical Co-occurrence Network", In Proceedings of the 35th Annual Meeting of the Association for Computational Linguistics, Available Online at https://arxiv.org/pdf/cs/9811009.pdf, Jul. 1997, pp. 507-509.
Florek, et al., "On Liaison and Points Dividing a Finite Set", Colloquium Mathematicae, vol. 2, No. 3-4, 1951, 5 pages.
Fu, et al., "Learning Semantic Hierarchies via Word Embeddings", Proceedings of the 52nd Annual Meeting of the Association for Computational Linguistics, Available Online at http://ir.hit.edu.cn/~rjfu/publications/acl2014.pdf, Jun. 23-25, 2014, pp. 1199-1209.
Halevy, et al., "Goods: Organizing Google's Datasets", SIGMOD/PODS, Jun. 26, 2016-Jul. 1, 2016, pp. 795-806.
Homma, et al., "An Artificial Neural Network for Spatiotemporal Bipolar patterns: Application to Phoneme Classification", Proceeding NIPS'87 Proceedings of the 1987 International Conference on Neural Information Processing Systems, Jan. 1987, pp. 31-40.
Islam, et al., "Text Similarity Using Google Tri-grams", Proceeding Canadian AI 2012 Proceedings of the 25th Canadian conference on Advances in Artificial Intelligence, May 28, 2012, pp. 312-317.
Jaccard, "The Distribution of the Flora in the Alpine Zone", New Phytologist, vol. 11, No. 2, Available Online at http://www.researchgate.net/profile/Paul_Jaccard/publication/230302439_The_

(56) References Cited

OTHER PUBLICATIONS distribution_of_the_flora_in_the_alpine_zone/links/02e7e51cb76619a0fa000000.pdf, Feb. 1912, 15 pages.

Kalchbrenner, et al., "A Convolutional Neural Network for Modelling Sentences", Proceedings of the 52nd Annual Meeting of the Association for Computational Linguistics, Available Online at: https://arxiv.org/abs/1404.2188, Apr. 8, 2014, 11 pages.

Malak, "17 Qualities of the Ideal Recommender System", Data Science Association, Available Online at http://datascienceassn.org/content/17-qualities-ideal-recommender-system, Aug. 9, 2014, pp. 1-3.

Malak, "Extending Word2Vec for Performance and Semi-Supervised Learning", Oracle, Available Online at http://spark-summit.org/2015/talk/extending-word2vec-for-performance-and-semi-supervised-learning, Jun. 15, 2015, 39 pages.

Markines, et al., "Evaluating Similarity Measures for Emergent Semantics of Social Tagging", International World Wide Web Conference 18th, Apr. 20-24, 2009, pp. 641-650.

Mikolov, et al., "Exploiting Similarities Among Languages for Machine Translation", Available Online at http://arxiv.org/pdf/1309.4168.pdf, Sep. 17, 2013, 10 pages.

Ouyang, et al., "Sentiment Analysis Using Convolutional Neural Network", IEEE International Conference on Computer and Information Technology; Ubiquitous Computing and Communications; Dependable, Autonomic and Secure Computing; Pervasive Intelligence and Computing, Oct. 26-28, 2015, pp. 2359-2364.

Ricci, "Part 15: Knowledge-Based Recommender Systems", Available Online at http://www.ics.uci.edu/~welling/teaching/CS77Bwinter12/presentations/course_Ricci/15-KnowledgeBased.pdf, Dec. 23, 2015, pp. 1-58.

Sanborn, et al., "A Bigram Extension to Word Vector Representation", Available Online at http://cs229.stanford.edu/proj2014/Adrian%20Sanborn,%20Jacek%20Skryzalin,%20A%20bigram%20extension%20to%20word%20vector%20representation.pdf, 2015, pp. 1-5.

Sedding, et al., "WordNet-Based Text Document Clustering", Proceedings of the 3rd Workshop on Robust Methods in Analysis of Natural Language Data, Romano '04, Jan. 1, 2004, 10 pages.

Smetanin, "Fuzzy String Search", Nikita's Blog, Search Algorithms, Software Development and so on, Available Online at: http://ntz-develop.blogspot.com/2011/03/fuzzy-string-search.html, Mar. 24, 2011, pp. 1-21.

Suchanek, et al., "Yago: A Core of Semantic Knowledge Unifying WordNet and Wikipedia", Proceeding WWW'07 Proceedings of the 16th International Conference on World Wide Web, Session: Ontologies Available Online at: http://www2007.org/papers/paper391.pdf, May 2007, pp. 697-706.

Yang, et al., "Learning Multi-Relational Semantics Using Neural-Embedding Models", Cornell University Library, Available Online at: http://arxiv.org/abs/1411.4072, Nov. 14, 2014, 5 pages.

International Application No. PCT/US2015/052190, International Preliminary Report on Patentability dated on Apr. 6, 2017, 18 pages.

International Application No. PCT/US2015/052190, International Search Report and Written Opinion dated Dec. 9, 2015, 20 pages.

International Application No. PCT/US2015/052228, International Preliminary Report on Patentability dated Apr. 6, 2017, 8 pages.

International Application No. PCT/US2015/052228, International Search Report and Written Opinion dated Nov. 18, 2015, 11 pages.

U.S. Appl. No. 15/705,108, Non-Final Office Action dated Jun. 28, 2019, 10 pages.

U.S. Appl. No. 16/552,254, Non-Final Office Action dated Apr. 29, 2021, 8 pages.

\* cited by examiner

Data Enrichment Cloud Service

<Catalog | pvo_20140917_test1

Catalog | Dashboard | Policies | Documentation

Save | Cancel

Search

≡ | ≡ | ↻ Refresh | ↻ Reset | ↶ Undo | ↷ Redo | ⚲ Recommendations ~606

Transform Script ~602

Remove 123 columns ×
Rename Col_0001 to date_time ×
Rename Col_0003 to date_time_02 ×
Rename Col_0004 to url ×
Rename Col_0007 to url ×
Rename Col_0008 to city ×
Rename Col_0010 to state ×
Rename Col_0011 to hexid ×
Rename Col_0019 to ip ×
Rename Col_0063 to url_02 ×

Recommendations for All ~604

← Format epoch date as MM/dd/yyyy for column ... ×
← Format epoch date as MM/dd/yyyy for column ... ×
← Format epoch date as MM/dd/yyyy hh:mm:ss aa ×
← Format date as yy-M-d H:m:s z for column dat... ×
← Remove time from date_time_02 ×
← Remove date from date_time_02

~408

| Column | Type | Value |
|---|---|---|
| date_time_02 | date | 2012-03-12 09:21:45; 2012-03-07 18:47:25; 2012-03-12 09:35:37; 2012-03-12 08:50:35; 2012-03-06 19:03:37; 2012-03-06 18:59:39; 2012-03-12 09:25:46 2012-03-06 19:08:00 2012-03-15 18:56:34 |
| url | string | http://www.acme.com/SH55126545/VD55177927; http://www.acme.com/SH55126545/VD55179433; http://www.acme.com/SH55126545/VD55149415; http://www.acme.com/SH55126545/VD55170364; http://www.acme.com/SH587637/VD55178699; http://www.acme.com/SH55126545/VD55173061; http://www.acme.com/SH559040/VD55175948; http://www.acme.com/SH5580165/VD55173281; http://www.acme.com/SH5580165/VD55156528; http://www.acme.com/SH55126554/VD55147564 |
| Col_0005 | string | shoes; clothing; movies; handbags; home&garden; tools; outdoors; games; computers; automotive |
| Col_0006 | string | WABC; WOI; KLKN; WCIB; WJBF; WFTS; WPVI; KSTP; WLS; KSAT |
| uri | string | comcast.net; rr.com; qwest.net; verizon.net; 66.231.145.174; mercydesmoines.org; clearwire-wmx.net; windstream.net; 99.126.116.121 |
| city | string | hawthorne; hendersonville; seminole; adel; new york; carpentersville; eden prairie; chicago; wahoo; charlotte |
| Col_0009 | string | usa |
| state | string | fl; ne; nc; il; ia; mn; pa; in; ny; tx |
| hexid | string | D84F550B-FD75-422A-AB3F-F514357BA6AC; E733FA17-4501-428F-A1C8-1C5BA9AD5ED2; 36F9EA4-9D76-44AE-BC08-6014DF865B2D; B7C591A2-9277-40CE-87C4-EBC26FFC1BC7; 6186EABD-7700-F17F-0809-5C717AC6CCC9; B15166CA-CFA1-4889-A884-3C49292AC5F6; 2A078DC0-007E-4C55-B4B4-2CD7A9D2E946; 48B3B5EA-CD07-865D-DB03-C35C19CD9FEF; D4A080B5-E392-4F73-854C-0FE220AEC3D3B; B0DD8E45-455D-42C7-8AEF-BC2C65D14CD3 |
| Col_0012 | string | 25-Sep-89; 15-Sep-88; 26-Mar-85; 20-Sep-91; 30-Apr-74; 17-Feb-87; 14-Aug-88; 1-Aug-93; 14-Oct-88; 30-Nov-85 |
| Col_0013 | string | F; M; U |

| Transform Script | | | |
|---|---|---|---|
| Rename Col_0001 to date_time | date_time_02 | date | 2012-03-12 09:21:45; 2012-03-07 18:47:25; 2012-03-12 09:35:37; 2012-03-12 08:59:51; 2012-03-12 08:50:35; 2012-03-06 19:03:37; 2012-03-06 18:59:39; 2012-03-12 09:25:46 2012-03-06 19:08:00 2012-03-15 18:56:34 |
| Rename Col_0003 to date_time_02 | url | string | http://www.acme.com/SH55126545/VD55177927; http://www.acme.com/SH55126545/VD55179433; http://www.acme.com/SH55126545/VD55149415; http://www.acme.com/SH55126545/VD55170364; http://www.acme.com/SH55587637/VD55178699; http://www.acme.com/SH55126545/VD55173061; http://www.acme.com/SH55559040/VD55175948; http://www.acme.com/SH55580165/VD55173281; http://www.acme.com/SH55580165/VD55156528; http://www.acme.com/SH55126554/VD55147564 |
| Rename Col_0004 to url | | | |
| Rename Col_0007 to url | | | |
| Rename Col_0010 to state | Col_0005 | string | shoes; clothing; movies; handbags; home&garden; tools; outdoors; games; computers; automotive |
| Rename Col_0011 to hexid | Col_0006 | string | WABC; WOI; KLKN; WCJB; WJBF; WFTS; WPVI; KSTP; WLS; KSAT |
| Rename Col_0019 to ip | uri | string | comcast.net; rr.com; qwest.net; verizon.net; 66.231.145; morrisbb.com; mercydesmoines.org; clearwire-wmx.net; windstream.net; 99.126.116.121 |
| Rename Col_0063 to url_02 | | | |
| Rename Col_0008 to city | city | string | hawthorne; hendersonville; seminole; adel; new york; carpenterville |
| Enrich column city with city.population | lon | string | -118.35; -86.6; -82.79; -83.42; -73.94; -88.27; -93.46; -87.68; -96.62; -80.83 |
| Enrich column city with city.lat | lat | string | 33.91; 36.29; 27.84; 31.14; 40.67; 42.12; 44.85; 41.84; 41.21; 35.2 |
| | population | string | 84716; 48533; 18934; 5422; 8413351; 38298; 61754; 2868594; 3953; 705567 |
| Recommendations for All | Col_0009 | string | usa |
| Extract day_of_year from date_time_02 | state | string | fl; ne; nc; il; ia; mn; pa; in; ny; tx |
| Extract month from date_time_02 | hexid | string | D84F550B-FD75-422A-AB3F-F514357BA6AC; E733FA17-4501-42BF-A1CB-1C5BA9AD5ED2; 36F9EA4-9D76-44AE-8C08-60140 B7C591A2-9277-40CE-87C4-EBC26FFC1BC7; 6186EA8D-7700-F17F-0809-5C717AC6CCC9; B15166CA- |
| Extract quarter from date_time_02 | | | |
| Extract year from date_time_02 | | | |
| Enrich column city with city.state | | | |

Inner

Output Options

● Rows matching both datasets
○ Left Join
○ Right Join

Left

Output Options

○ Rows matching both datasets
● Left Join
○ Right Join

Right

Output Options

○ Rows matching both datasets
○ Left Join
● Right Join

TECHNIQUES FOR FACILITATING THE JOINING OF DATASETS

CLAIM OF PRIORITY

The present application is a continuation of, and claims the benefit and priority of U.S. application Ser. No. 15/705,108, filed Sep. 14, 2017, entitled "TECHNIQUES FOR FACILITATING THE JOINING OF DATASETS," which claims the benefit and priority under 35 U.S.C. 119(e) of U.S. Provisional Application No. 62/395,352, filed Sep. 15, 2016, entitled "TECHNIQUES FOR FACILITATING THE JOINING OF DATASETS," the entire content of which are incorporated herein by reference for all purposes and is considered part of this disclosure.

BACKGROUND

The present disclosure relates generally to data preparation and analysis. More particularly, techniques are disclosed for analysis, generation, and visualization of data obtained from multiple data sources.

Before "big data" systems can analyze data to provide useful results, the data needs to be added to the big data system and formatted such that it can be analyzed. This data onboarding presents a challenge for current cloud and "big data" systems. Typically, data being added to a big data system is noisy (e.g., the data is formatted incorrectly, erroneous, outdated, includes duplicates, etc.). When the data is analyzed (e.g., for reporting, predictive modeling, etc.) the poor signal to noise ratio of the data means the results are not useful. As a result, current solutions require substantial manual processes to clean and curate the data and/or the analyzed results. However, these manual processes cannot scale. As the amount of data being added and analyzed increases, the manual processes become impossible to implement.

The rapid proliferation of data from a variety of sources: internal and external, unstructured and structured, traditional and new data types, presents an enormous opportunity for businesses to gain valuable insights that can help them make improved and timely decisions that will win, serve, and retain customers. A key part of preparing these data sources for analysis is the ability to merge or join (e.g., blend) two or more datasets originating from different sources into a single file ready to be used for further processing, such as by a big data analytics system. The heterogeneity and size of datasets introduce tremendous challenges to find similarities in the data, such as columns, which could be used as a basis for merging these datasets.

Data from disparate sources may include different types of data having different formats. For example, data from an enterprise may be different than data from click stream or error logs, or structured data from social media sources. Users may desire to use data from multiple sources to build a data lake, to perform downstream processing for applications, and to perform ETL (extract, transform, and load) processing. The data from web logs and social media may be completely unrelated to data about transactions for users. A significant amount of time, money, and computing resources may be spent to utilize data from various sources to provide enrichment of the data.

The heterogeneity and size of the data being compares introduces an additional challenge to find columns in the data that could be used for merging (e.g., joining or blending) the data. In addition to identifying columns for potential merger or joining, large datasets are hard to visualize and therefore, difficult to combine. Some have tried to provide a visualization to show the options and results for combining data that can be merged or joined. However, visualizations may not be adequate to assisting users in understanding the efficacy of options for merging data, in addition to helping users request a better set of results for merging data. Data in a particular format, such as tabular format, may aide in the identification and presentation of options for merging data. Often, large datasets from different sources may have little or no formatting, such as a columnar format. For example, the datasets may not be obtained from a database, which provides data in a structured format. The data may be obtained from different, often unrelated sources, such that merging the data becomes even more challenging. These datasets introduce greater challenges for merging. Certain embodiments of the present disclosure address these and other problems.

BRIEF SUMMARY

The present disclosure relates generally to techniques (e.g., systems, methods, and operations) for analysis, generation, and visualization of data obtained from multiple data sources. Such techniques may be implemented as a computer-based system, which can be implemented in an enterprise computing system or cloud computing system. The computer system may be implemented as a cloud-based service. Specifically, system may implement techniques to analysis data from multiple different data sources to determine a relationship between the data (also referred to herein a "data relationship discovery"). Data relationship discovery may enable may different types of data to be merged or joined (e.g., "blended"). Relationship discovery may be useful to enable different types of data, which seemingly appear unrelated, to be joined for purposes of enriching the data.

In at least one embodiment, the system implements one of a variety of algorithms for data relationship discovery. Often times, data from each of the different data sources may represent large data sets. Data from different sources may be in different formats. The data may seemingly be unrelated, but data from one data source may be useful to enrich or supplement other data. The system can implement one or more approaches to merge and/or join data to enhance the value and use of data.

The system can provide an intuitive way to enable provide options for merging or joining data from different datasets. Such techniques may be used to combine or join datasets identified as having a relationship. In at least one embodiment, the system can determine options for joining datasets, such as by a left join, right join, or outer join. One or more interfaces (e.g., graphical interfaces) may be generated to illustrate options for joining datasets based on identifying a relationship between the data sets. An interface may display a visual representation (e.g., a "Glenn Diagram") of the data or a join of two datasets based on an identified relationship. The representation may further illustrate one or more types of joins and information about the data, such as rows where data may be joined based on the type of join for the relationship by columns. The visual representation may indicate one or more keys, each corresponding to a recommendation based on a relationship discovered between two datasets. The visual representation is based on a relationship discovered between two datasets. The visual representation may indicate where the datasets can be joined, such that they are not overlapping.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

In some embodiments, a computer system may be implemented for a data enrichment service. The computing system may be configured to implement methods and operations described herein. In some embodiments, a system is disclosed for generating and displaying interactive visualizations for recommended data transformations and repairs. The system may include a plurality of data sources and a plurality of data targets. The system may include a cloud computing infrastructure system comprising one or more processors communicatively coupled to the plurality of data sources and communicatively coupled to the plurality of data targets, over at least one communication network. The cloud computing infrastructure system may include a memory coupled to the one or more processors, the memory storing instructions to provide a service, where the instructions, when executed by the one or more processors, cause the one or more processors to perform one or more methods or operations described herein. Yet other embodiments relate to systems and machine-readable tangible storage media, which employ or store instructions for methods and operations described herein.

In some embodiments, a method may include generating first profile metadata for each column of a first plurality of columns in a first dataset stored a first data source. A method may include generating second profile metadata for each column of a second plurality of columns in a second dataset stored a second data source. A method may include identifying, based on the first profile metadata and second profile metadata, a plurality of column pairs between the first dataset and the second dataset, where columns in each of the plurality of column pairs have a relationship. A method may include determining one or more types of join functions for each of the one or more column pairs. A method may include generating a first graphical interface to display each of the one or more types of join functions, where each of the one or more types of join functions are displayed showing a diagram of the type of join function for joining the first dataset with the second dataset by columns in a different column pair of the plurality of column pairs. A method may include receiving input corresponding to selection of a first type of join function of the one or more types of join functions. A method may include generating a second graphical interface to display a third dataset based on joining, according to the first type of join function, the first dataset at a first column within a first column pair with the second dataset at a second column in the first column pair.

In some embodiments, the diagram of a type of join function displayed for the type of join function is displayed with a visual appearance where the columns in the first column pairs are joined between the first dataset and the second dataset.

In some embodiments, the third dataset is displayed with an visual appearance that indicates the columns in the first column pair where the first dataset and the second dataset are joined to form the third dataset.

In some embodiments, the method may include generating the third dataset based on joining, according to the first type of join function, the first dataset at the first column within the first column pair with the second dataset at a second column in the first column pair.

In some embodiments, the input is a first input. The method may include receiving second input corresponding to selection of a second type of join function of the one or more types of join functions; and updating the second graphical interface to display a fourth third dataset based on joining, according to the second type of join function, the first dataset at a first column within a second column pair with the second dataset at a second column in the second column pair.

In some embodiments, the one or more type of join functions includes a left join, a right join, or an outer join.

In some embodiments, the first graphical interface presents each of the identified column pairs with one of the one or more types of join functions.

The foregoing, together with other features and embodiments will become more apparent upon referring to the following specification, claims, and accompanying drawings.

BRIEF DESCRIPTION OF THE DRAWINGS

FIGS. 4A-4D depict examples of a user interface that provides interactive data enrichment, in accordance with an embodiment of the present disclosure.

FIGS. 5A-5D depict examples of the results of interactive data enrichment, in accordance with an embodiment of the present disclosure.

DETAILED DESCRIPTION

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

The present disclosure relates generally to a data service that analyzes, prepares, extracts, repairs, generates, and/or enriches data obtained from multiple data sources. Specifically, techniques disclosed herein enable relationship discovery between data from multiple data sources. Data may be in a different format and/or may have different content. The data from disparate sources can be ingested, analyzed, and processed to determine a relationship between the data. The discovered relationship may be useful for merging, or "blending," the data for enrichment. The relationship discovery may be useful for merging new data from the same data sources, which may have the same relationship. The relationship may improve the processing of a computer system for providing the data from different sources in a viewable form together.

In certain embodiments of the present disclosure, prior to loading data into a data warehouse (or other data target) the data is processed through a pipeline (also referred to herein as a semantic pipeline) which includes various processing stages. In some embodiments, the pipeline can include an ingest stage, prepare stage, profile stage, transform stage, and publish stage. During processing, the data can be analyzed, prepared, and enriched. The resulting data can then be published (e.g., provided to a downstream process) into one or more data targets (such as local storage systems, cloud-based storage services, web services, data warehouses, etc.) where various data analytics can be performed on the data. Because of the repairs and enrichments made to the data, the resulting analyses produce useful results. Additionally, because the data onboarding process is automated, it can be scaled to process very large data sets that cannot be manually processed due to volume.

Figure 1:
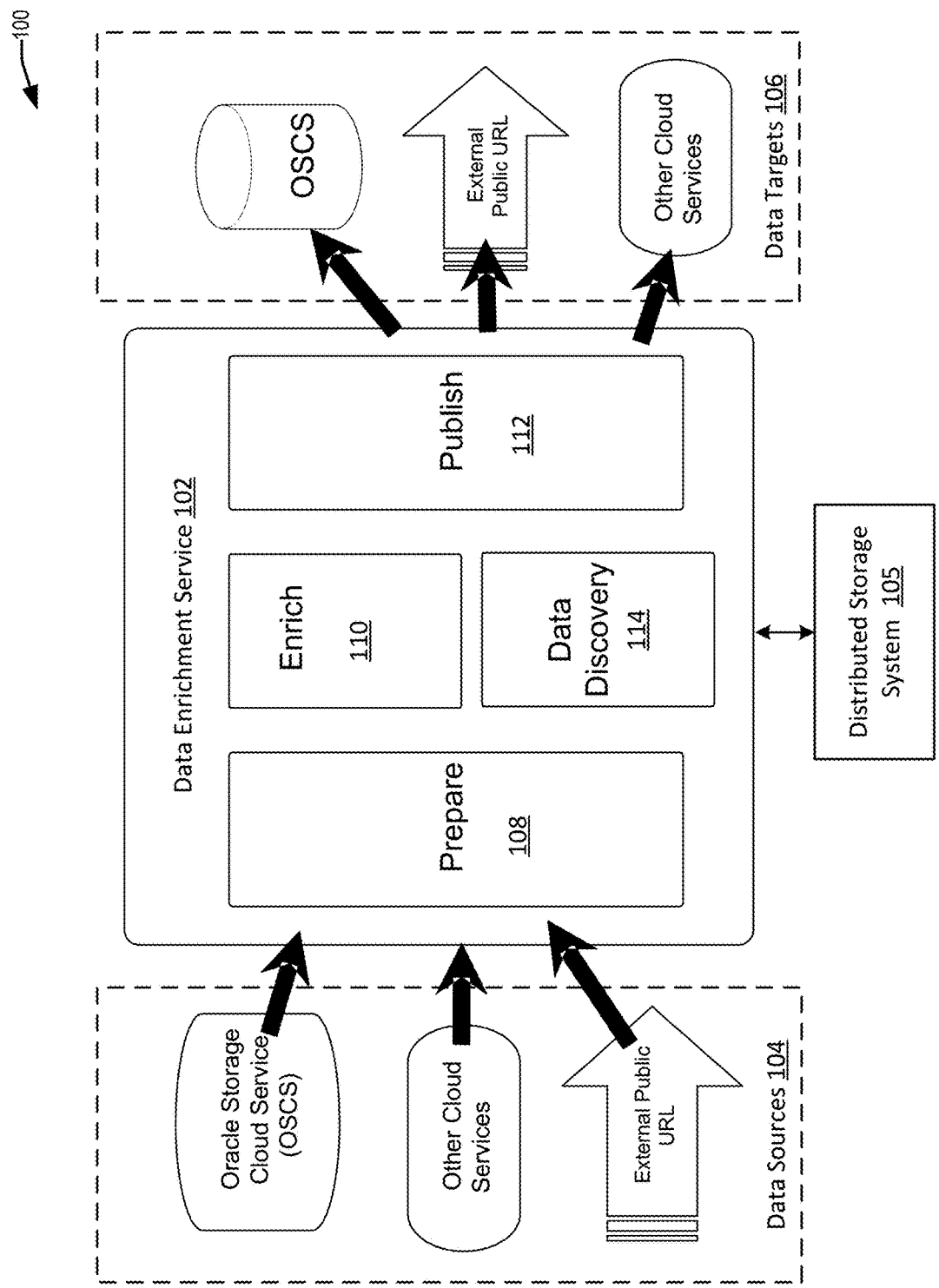
FIG. 1 depicts a simplified high level diagram of a data enrichment service, in accordance with an embodiment of the present disclosure.

FIG. 1 depicts a simplified high-level diagram 100 of a data service, in accordance with an embodiment of the present disclosure. The data service may be referred to herein as "a data enrichment service," and "a preparation service." As shown in FIG. 1, a cloud-based data enrichment service 102 can receive data from various data sources 104. In some embodiments, a client can submit a data enrichment request to data enrichment service 102 which identifies one or more of the data sources 104 (or portions thereof, e.g., particular tables, datasets, etc.). The data enrichment service 102 may then request data to be processed from the identified data sources 104. In some embodiments, the data sources may be sampled, and the sampled data analyzed for enrichment, making large data sets more manageable. The identified data can be received and added to a distributed storage system (such as a Hadoop Distributed Storage (HDFS) system) accessible to the data enrichment service. The data may be processed semantically by a number of processing stages (described herein as a pipeline or semantic pipeline). These processing stages can include preparation stages 108, enrichment stages 110, and publishing stages 112. In some embodiments, data can be processed in one or more batches by the data enrichment services. In some embodiments, a streaming pipeline can be provided that processes data as it is received.

In some embodiments, a prepare stage 108 can include various processing sub-stages. This may include automatically detecting a data source format and performing content extraction and/or repair. Once the data source format is identified, the data source can be automatically normalized into a format that can be processed by the data enrichment service. In some embodiments, once a data source has been prepared, it can be processed by an enrich stage 110. In some embodiments, inbound data sources can be loaded into a distributed storage system 105 accessible to the data enrichment service (such as an HDFS system communicatively coupled to the data enrichment service). The distributed storage system 105 provides a temporary storage space for ingested data files, which can then also provide storage of intermediate processing files, and for temporary storage of results prior to publication. In some embodiments, enhanced or enriched results can also be stored in the distributed storage system. In some embodiments, metadata captured during enrichment associated with the ingested data source can be stored in the distributed storage system 105. System level metadata (e.g., that indicates the location of data sources, results, processing history, user sessions, execution history, and configurations, etc.) can be stored in the distributed storage system or in a separate repository accessible to the data enrichment service.

In some embodiments, data enrichment service 102 may provide data discovery 114 functionality for enriching and/or preparing data from different data sources. Data from one or more sources may be in a different format and/or may have different content. The data can be ingested, analyzed, and processed by data discovery 114 to determine a relationship between the data. The discovered relationship may be useful for merging, joining, or "blending," the data for enrichment.

In some embodiments, data discovery 114 can include determining a join, or blend of data from datasets identifies by data discovery 114 as having a relationship. Data discovery 114 may implement one or more techniques for determining a type of join based on discovery of a relationship. Based on the type of join, data discovery 114 can generate one or more visual representations (e.g., a "Glenn Diagram") for a type of join. The visual representation may be displayed in a graphical interface to show where data may be joined or blended for the type of join. The visual representation may enable a user to select a best matching relationship between datasets that would otherwise be difficult to analyze and assess for joining. The visual representation may illustrate an example of data that is joined based on a type of join for datasets chosen by a user and one or more recommended relationships between the datasets.

Features and functions of data discovery 114 are further described within this disclosure.

In certain embodiments, the enrichment process 110 can analyze the data using a semantic bus (also referred to herein as a pipeline or semantic pipeline) and one or more natural language (NL) processors that plug into the bus. The NL processors can automatically identify data source columns, determine the type of data in a particular column, name the column if no schema exists on input, and/or provide metadata describing the columns and/or data source. In some embodiments, the NL processors can identify and extract entities (e.g., people, places, things, etc.) from column text. NL processors can also identify and/or establish relationships within data sources and between data sources. As described further below, based on the extracted entities, the data can be repaired (e.g., to correct typographical or formatting errors) and/or enriched (e.g., to include additional related information to the extracted entities).

In some embodiments, a publish stage 112 can provide data source metadata captured during enrichment and any data source enrichments or repairs to one or more visualization systems for analysis (e.g., display recommended data transformations, enrichments, and/or other modifications to a user). The publishing sub-system can deliver the processed data to one or more data targets. A data target may correspond to a place where the processed data can be sent. The place may be, for example, a location in memory, a computing system, a database, or a system that provides a service. For example, a data target may include Oracle Storage Cloud Service (OSCS), URLs, third party storage services, web services, and other cloud services such as Oracle Business Intelligence (BI), Database as a Service, and Database Schema as a Service. In some embodiments, a syndication engine provides customers with a set of APIs to browse, select, and subscribe to results. Once subscribed and when new results are produced, the results data can be provided as a direct feed either to external web service endpoints or as bulk file downloads.

Through this disclosure, various flowcharts and techniques are disclosed illustrating processes according to some embodiments of the present disclosure. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in the figures may be implemented in software (e.g., code, instructions, program) executed by one or more processing units (e.g., processors cores), hardware, or combinations thereof. For example, data enrichment service 102 can be implemented by a computer system for the processes described with reference to any of the figures. Any of the processes may be implemented as a service. In some embodiments, any of the elements in the figures may be implemented with more or fewer subsystems and/or modules than shown in the figure, may combine two or more subsystems and/or modules, or may have a different configuration or arrangement of subsystems and/or modules. Subsystems and modules may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

The particular series of processing steps in the figures is not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, data may be stored using one or more data structures. Data structures may be organized in a variety of ways depending on how, what, and/or where data is stored. Although each of the data structures are shown including particular data, more or fewer data structures may be implemented to store the data. A data structure can include a reference to other data structures. The data structures may be implemented using one or more types of data structures including, without restriction, a linked list, an array, a hashtable, a map, a record, a graph, or other type of data structure. A data structure may be implemented in a hierarchical manner. Each of the data structures may be defined in a declarative manner based on input by a user. The data structures can be defined based on a template, e.g., a template defined based on a markup language, such as Extended Markup Language (XML). A data structure may have one or more formats, also referred to as a document format.

Figure 2:
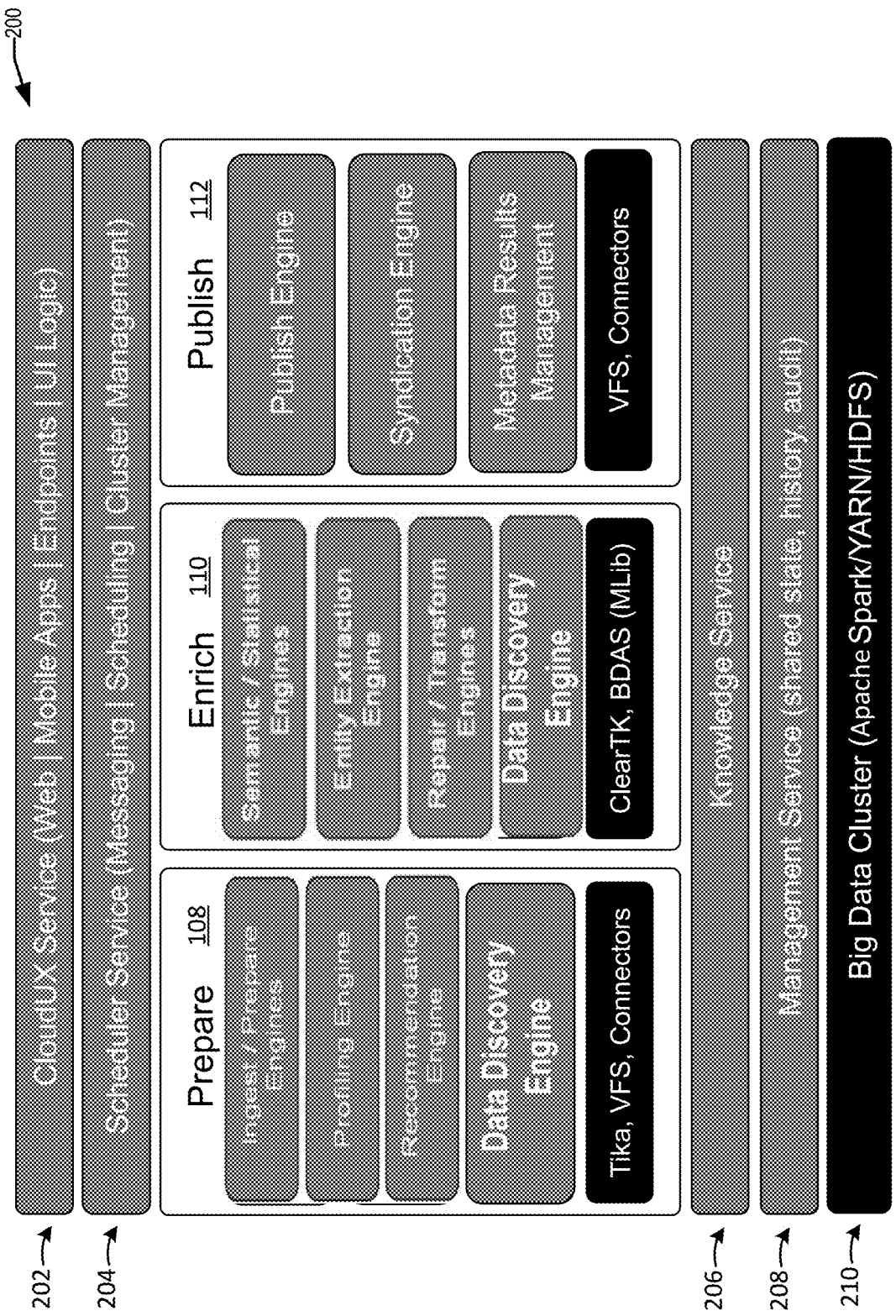
FIG. 2 depicts a simplified block diagram of a technology stack, in accordance with an embodiment of the present disclosure.

FIG. 2 depicts a simplified block diagram 200 of a technology stack or system, in accordance with an embodiment of the present disclosure. In some embodiments, the data enrichment service can be implemented using the logical technology stack shown in FIG. 2. The technology stack can include a user interface/experience (UX) layer 202 that provides access to the data enrichment service through one or more client devices (e.g., using a thin client, thick client, web browser, or other application executing on the client devices). A scheduler service 204 can manage requests/responses received through the UX layer and can manage the underlying infrastructure on which the data enrichment service executes.

In some embodiments, the processing stages described above with respect to FIG. 1, can include a number of processing engines. For example, the prepare processing stage 108 can include ingest/prepare engines, a profiling engine, a recommendation engine, and a data discovery engine. As data is ingested during prepare processing, the data (or samples thereof) can be stored in a distributed data storage system 210 (such as a "big data" cluster). Data preparation can include functions for data discovery to identify data relationships. The enrich processing stage 110 can include semantic/statistical engines, an entity extraction engine, repair/transform engines, and a data discovery engine. Data discovery engine may be implemented in all or some parts of system 200. Data discovery engine is further disclosed below. As described further below, the enrich processing stage 110 can utilize information obtained from knowledge service 206 during the enrichment process. Enrichment actions (e.g., the addition and/or transformation of data) can be performed on the data stored in the distributed storage system 210. Enrichment actions can include merging or blending of datasets from one or more data sources. Transformation of data may include modification to add missing data or data to enrich the data. Transformation of data may include modifying errors in the data or repairing the data. Transformation may include merging or blending of datasets from one or more data sources. The publish processing stage 112 can include a publish engine, a syndication engine, and a metadata results manager. In some embodiments, various open source technologies can be used to implement some functionality within the various processing stages and/or processing engines. For example, file format detection can use Apache Tika.

In some embodiments, a management service 208 can monitor changes made to the data during enrichment processing 110. The monitored changes can include tracking which users accessed the data, which data transformations were performed, and other data. This can enable the data enrichment service to roll back enrichment actions.

Technology stack 200 can be implemented in an environment such as a cluster 210 for big data operations ("Big Data Cluster"). Cluster 210 can be implemented using Apache Spark, which provides a set of libraries for implementing a distributed computing framework compatible with a distributed file system (DFS) such as HDFS. Apache Spark can send requests for map, reduce, filter, sort, or Sample cluster processing jobs to effective resource managers like YARN. In some embodiments, cluster 210 can be implemented using a distributed file system offering such as one offered by Cloudera®. The DFS, such as one offered by Cloudera®, may include HDFS and Yarn.

Figure 3A:
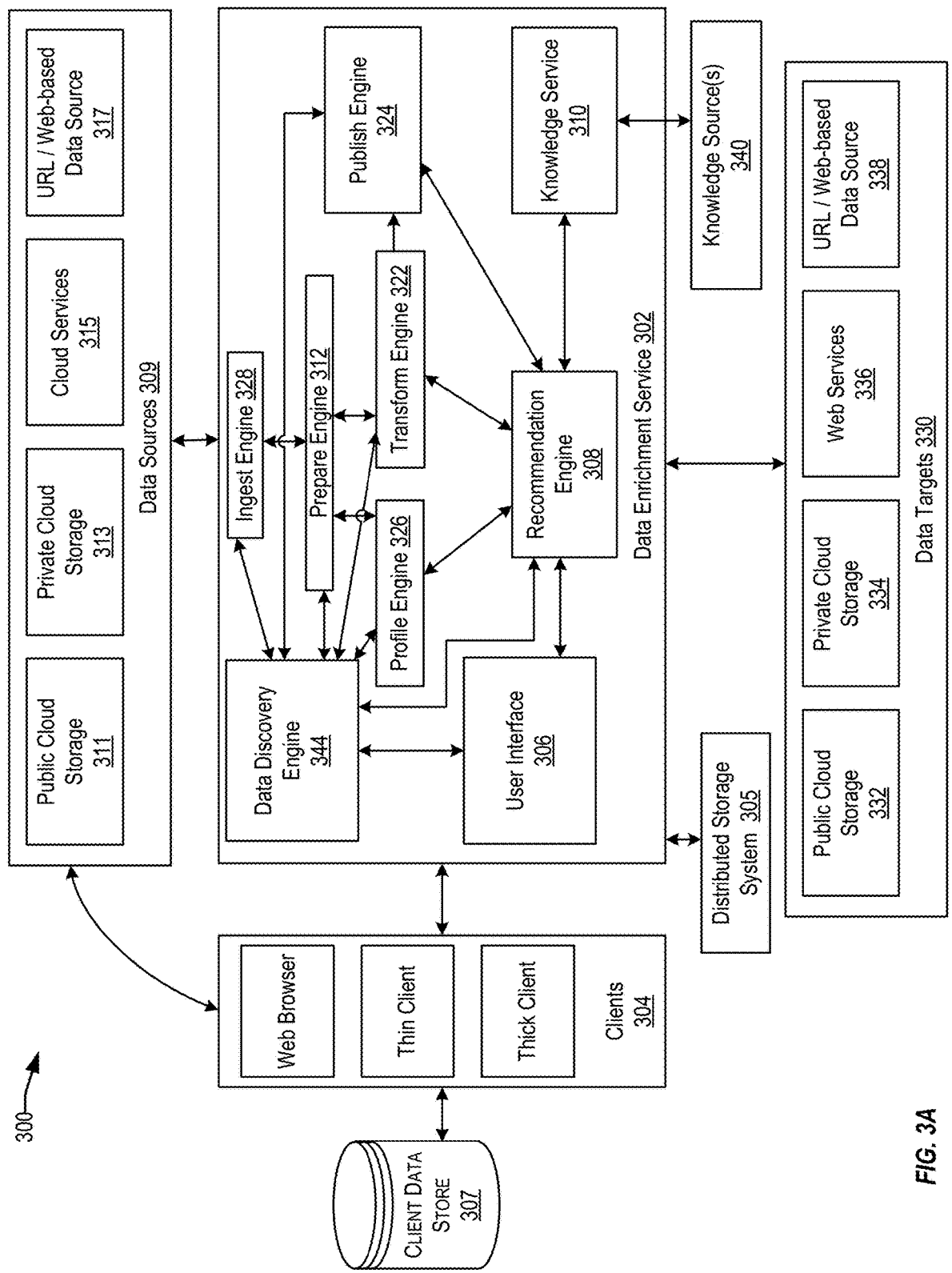
FIG. 3A depicts a simplified block diagram of an interactive visualization system, in accordance with an embodiment of the present disclosure.

FIG. 3 depicts a simplified block diagram of data enrichment system 300, in accordance with an embodiment of the present disclosure. Data enrichment system 300 may implement a data enrichment service 302. Data enrichment service 302 can receive data enrichment requests from one or more clients 304. Data enrichment service 302 may comprise one or more computers and/or servers. Data enrichment service 302 may be a module that is comprised of several subsystems and/or modules, including some, which may not be shown. Data enrichment service 302 may have more or fewer subsystems and/or modules than shown in the figure, may combine two or more subsystems and/or modules, or may have a different configuration or arrangement of subsystems and/or modules. In some embodiments, data enrichment service 302 may include user interface 306, ingest engine 328, recommendation engine 308, knowledge service 310, profile engine 326, transform engine 322, a prepare engine 312, publish engine 324, and data discovery engine 344. The elements implementing data enrichment service 302 may operate to implement a semantic processing pipeline as described above.

Data enrichment system 300 may include a semantic processing pipeline, in accordance with an embodiment of the present disclosure. All or part of the semantic processing pipeline may be implemented by data enrichment service 102. When a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below.

In some embodiments, data enrichment service 302 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The clients 304 can include various client devices (such as desktop computers, laptop computers, tablet computers, mobile devices, etc.). Each client device can include one or more client applications 304 through which the data enrichment service 302 can be accessed. For example, a browser application, a thin client (e.g., a mobile app), and/or a thick client can execute on the client device and enable the user to interact with the data enrichment service 302. The embodiment depicted in FIG. 3 is merely an example and is not intended to unduly limit the claimed embodiments of the present disclosure. One of ordinary skill in the art would recognize many variations, alternatives, and modifications. For example, there may be more or fewer client devices than those shown in the figures.

The client devices 304 may be of various different types, including, but not limited to personal computers, desktops, mobile or handheld devices such as a laptop, a mobile phone, a tablet, etc., and other types of devices. A communication network facilitates communications between client devices 304 and data enrichment service 302. The communication network can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients and data enrichment service 302.

A user can interact with the data enrichment service 302 through user interface 306. Clients 304 can render a graphical user interface to display the user's data, recommendations for transforming the user's data, and to send and/or receive instructions ("transformation instructions") to the data enrichment service 302 through user interface 306. The user interfaces disclosed herein, such as those references in FIGS. 4A-4D and 5A-5D may be rendered by data enrichment service 302 or via clients 304. For example, a user interface may be generated by user interface 306, and rendered by data enrichment service 302 at any one of clients 304. A user interface may be provided by data enrichment system 302 via network as part of a service (e.g., a cloud service) or a network-accessible application. In at least one example, an operator of a data enrichment service 302 may operate one of clients 304 to access and interact with any user interfaces disclosed herein. The user can send instructions to user interface 306 to add data sources (e.g., provide data source access and/or location information, etc.).

Data enrichment service 302 may ingest data using ingest engine 328. Ingest engine 328 can serve as an initial processing engine when a data source is added. The ingest engine 328 can facilitate safe, secure, and reliable uploading of user data from one or more data sources 309 into data enrichment service 302. In some embodiments, ingestion engine 328 can extract data from the one or more data sources 309 and store it in a distributed storage system 305 in data enrichment service 302. Data ingested from one or more data sources 309 and/or one or more clients 304 can be processed as described above with respect to FIGS. 1-2 and stored in a distributed storage system 305. Data enrichment service 302 can receive data from a client data store 307 and/or from one or more data sources 309. The distributed storage system 305 can serve as temporary storage for the uploaded data during the remaining processing stages of the pipeline, prior to the data being published to one or more data targets 330. Once an upload is complete, the prepare engine 312 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 311, a private cloud storage service 313, various other cloud services 315, a URL or web-based data source 317, or any other accessible data source. A data enrichment request from the client 304 can identify a data source and/or particular data (tables, columns, files, or any other structured or unstructured data available through data sources 309 or client data store 307). Data enrichment service 302 may then access the identified data source to obtain the particular data specified in the data enrichment request. Data sources can be identified by address (e.g., URL), by storage provider name, or other identifier. In some embodiments, access to a data source may be controlled by an access management service. The client 304 may display a request to the user to input a credential (e.g., username and password) and/or to authorize the data enrichment service 302 to access the data source.

In some embodiments, data uploaded from the one or more data sources 309 can be modified into various different formats. The prepare engine 312 can convert the uploaded data into a common, normalized format, for processing by data enrichment service 302. Normalizing may be performed by routines and/or techniques implemented using instructions or code, such as Apache Tika distributed by Apache®. The normalized format provides a normalized view of data obtained from the data source. In some embodiments, the prepare engine 312 can read a number of different file types. Prepare engine 312 can normalize the data into a character separated form (e.g., tab separated values, comma separated values, etc.) or as a JavaScript Object Notation (JSON) document for hierarchical data. In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 312 can perform context extraction and conversion to the file types expected by data enrichment service 302, and can extract document level metadata from the data source.

Normalizing a data set mat include converting raw data in a data set into a format that is processable by the data enrichment service 302, in particular profile engine 326. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 326. Data may be normalized by being modified or converted from a non-tabular format to a tabular format, having one or more columns of data.

Once the data has been normalized, the normalized data can be passed to profile engine 326. The profile engine 326 can perform a column by column analysis of normalized data to identify the types of data stored in the columns and information about how the data is stored in the columns. In this disclosure, although profile engine 326 is described in many instances as performing operations on data, the data processed by profile engine 326 has been normalized by prepare engine 312. In some embodiments, the data processed by profile engine 326 may include data that is not normalized for being in a format (e.g., a normalized format) processable by profile engine 326. The output, or results, of profile engine 326 may be metadata (e.g., source profile) indicating profile information about the data from a source. The metadata may indicate one or more patterns about the data and/or a classification of the data. As further described below, the metadata may include statistical information based on analysis of the data. For example, profile engine 326 can output a number of metrics and pattern information about each identified column, and can identify schema information in the form of names and types of the columns to match the data.

The metadata generated by profile engine 326 may be used by other elements of data enrichment service, e.g., recommendation engine 308 and transformation engine 322, to perform operations as described herein for data enrichment service 302. In some embodiments, the profile engine 326 can provide metadata to a recommendation engine 308.

Recommendation engine 308 can identify repair, transform, and data enrichment recommendations for the data processed by profile engine 326. The metadata generated by profile engine 326 can be used to determine recommendations for data based on the statistical analysis and/or classifications indicated by the metadata. In some embodiments, recommendations can be provided to the user through a user interface or other web service. Recommendations can be tailored for business users, such that the recommendations describe at a high level what data repairs or enrichments are available, how those recommendations compare to past user activity, and/or how unknown items can be classified based on existing knowledge or patterns. Knowledge service 310 can access one or more knowledge graphs or other knowledge sources 340. The knowledge sources can include publicly available information published by web sites, web services, curated knowledge stores, and other sources. Recommendation engine 308 can request (e.g., query) knowledge service 310 for data that can be recommended to a user for the data obtained for a source.

In some embodiments, transform engine 322 can present the user with the sampled data for each column, or sample rows from the input dataset through user interface 306. Through user interface 306, data enrichment service 302 may present a user with recommended transformations. The transformations may be associated with transformation instructions, which may include code and/or function calls to perform transformation actions. The transformation instructions may be invoked by a user based on selection at user interface 306, such as by selecting a recommendation for transformation or by receiving input indicating an operation (e.g., an operator command). In one example, transformation instructions include a transformation instruction to rename at least one column of data based on the entity information. A further transformation instruction can be received the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 306, a user can perform transform actions, and the transform engine 322 can apply them to the data obtained from a data source and display the results. This gives the user immediate feedback that can be used to visualize and verify the effects of the transform engine 322 configuration. In some embodiments, the transform engine 322 can receive pattern and/or metadata information (e.g., column names and types) from profile engine 326 and recommendation engine 308, which provides recommended transform actions. In some embodiments, transform engine 322 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 308 for that column can also be removed. Similarly, if a transform action results in inserting new columns and that action is deleted, then any actions performed on the new columns are also deleted.

As described above, during processing the received data can be analyzed and a recommendation engine 308 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 326 and the recommendation for enriching the data determined by recommendation engine 308. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 302 may be stored in an intermediary data format including, but not limited to, RDD, text, a document format, any other type of format, or a combination thereof. The data stored in the intermediary format may be used to further perform operations for data enrichment service 302.

The following tables illustrate examples of transformations. Table 1 shows an outline of types of transforms actions.

TABLE 1

| Transform Types | Function Parameter(s) | Description | Examples |
|---|---|---|---|
| Update | String => String | Update column values | Obfuscate, date format, |
| Split | String => Array[String] | Split a column's values into new columns | Regex split, delimiter split |
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |
| Insert | String => Array[String] | Insert new columns | Insert timestamp |
| Insert 1: M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

TABLE 3

| Transform Actions | Description | Input | Output | R1 |
|---|---|---|---|---|
| Obfuscate | Obfuscate sensitive information such as e.g. credit card numbers, ID's, or birth dates | 123-45-6789 | ###-##-#### | Y |

TABLE 3-continued

| Transform Actions | Description | Input | Output | R1 |
|---|---|---|---|---|
| Date Reformat | Reformat a column containing a date | 1330978536 2012 Mar. 12 14:13:49 | Mar. 5, 2012 Mar. 12, 2012 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/ Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone | Keep all rows whose values contain "Android" or "iPhone" | Y |

The recommendation engine 308 can use information from a knowledge service 310, knowledge source 340 to generate recommendations for transform engine 322 and to instruct transform engine 322 to generate transform scripts that will transform the data. Transform scripts may include programs, code, or instructions that may be executable by one or more processing units to transform received data. As such, the recommendation engine 308 can serve as an intermediary between the user interface 306 and the knowledge service 310.

As discussed above, profile engine 326 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexidecimal identifiers, social security numbers, US box numbers, typical US street address patterns, zipcodes, US phone numbers, suite numbers, credit card numbers, proper names, personal information, and credit card vendors.

In some embodiments, profile engine 326 may identify patterns in data based on a set of regular expressions defined by semantic constraints or syntax constraints constraints. A regular expression may be used to determine the shape and/or structure of data. Profile engine 326 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 326 may perform parsing operations using one or more regular expressions to identify patterns in data processed by profile engine 326. Regular expressions may be ordered according to a hierarchy. Patterns may be identified based on order of complexity of the regular expressions. Multiple patterns may match data that is being analyzed; the patterns having the greater complexity will be selected. As described further below, profile engine 326 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 326 may perform statistical analysis to disambiguate the patterns and/or the text in data. Profile engine 326 may generate metadata including statistical information based on the statistical analysis. When patterns are identified, profile engine 326 may determine statistical information (e.g., a pattern metric) about each different pattern to disambiguate between the patterns. The statistical information may include a standard deviation for different patterns that are recognized. The metadata including the statistical information can be provided to other components of data enrichment service 302, such as recommendation engine 308. For example, the metadata may be provided to recommendation engine 308 to enable recommendation engine 308 to determine recommendations for enrichment of the data based on the identified the pattern(s). Recommendation engine 308 can use the patterns to query a knowledge service 310 to obtain additional information about the patterns. Knowledge service 310 can include or have access to one or more knowledge sources 340. A knowledge sources can include publicly available information published by web sites, web services, curated knowledge stores, and other sources.

Profile engine 326 may perform the statistical analysis to disambiguate between patterns identified in the data. For example, data analyzed by profile engine 326, may be evaluated to compute a pattern metric (e.g., a statistical frequency of different patterns in the data) for each of the different patterns identified in the data. Each of the set of pattern metrics is computed for a different pattern of the patterns that are identified. Profile engine 326 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 326 may convert the dates to a standard format in addition to normalization and may then determine a standard deviation for each format from different patterns. In this example, profile engine 326 may statistically disambiguate between the formats in the data as having the format with the lowest standard deviation. The pattern corresponding to the format of the data having the lowest standard deviation may be selected as the best pattern for the data.

Profile engine 326 may determine a classification of a pattern that it identifies. Profile engine 326 may communicate with knowledge service 310 to determine whether the identified pattern can be classified within a knowledge domain. Knowledge service 310 may determine one or more possible domains associated with the data based on techniques described herein such as matching techniques and similarity analysis. Knowledge service 310 may provide profile engine 326 with a classification of one or more domains possibly similar to data identified with a pattern. Knowledge service 310 may provide, for each of the domains identified by knowledge service 310, a similarity metric indicating a degree of similarity to the domain. The techniques disclosed herein for similarity metric analysis and scoring can be applied by recommendation engine 308 to determine a classification of data processed by profile engine 326. The metadata generated by profile engine 326 may include information about the knowledge domain, if any are applicable, and a metric indicating a degree of similarity with the data analyzed by profile engine 326.

Profile engine 326 may perform statistical analysis to disambiguate text identified in data, regardless of whether patterns are identified in the data. The text may be part of a pattern, and the analysis of the text may be used to further identify a pattern, if any can be identified. Profile engine 326 may request knowledge service 310 to perform domain analysis on text to determine whether the text can be classified into one or more domains. Knowledge service 310 may operate to provide information about one or more domains that are applicable to the text being analyzed. Analysis performed by knowledge service 310 to determine a domain may be performed using techniques described herein, such as similarity analysis used to determine a domain for data.

In some embodiments, profile engine 326 may identify text data in a data set. The text data may correspond to each entity identified in the set of entities. A classification may be determined for each entity that is identified. Profile engine 326 may request knowledge service to identify a classification for the entity. Upon determining a set of classifications for a set of entities (e.g., entities in a column), profile engine 326 may compute a set of metrics ("classification metrics") to disambiguate between the set of classifications. Each of the set of metrics may be computed for a different one of the set of classifications. Profile engine 326 may statistically disambiguate the set of metrics by comparing them to each other to determine which classification most closely represents the set of entities. A classification of the set of entities may be chosen based on the classification that represents the set of entities.

Using the knowledge sources 340, knowledge service 310 can match, in context, the patterns identified by profile engine 326. Knowledge service 310 may compare the identified patterns in the data or the data if in text to entity information for different entities stored by a knowledge source. The entity information may be obtained from one or more knowledge sources 340 using knowledge service 310. Examples of known entity may include social security numbers, telephone numbers, address, proper names, or other personal information. The data may be compared to entity information for different entities to determine if there is a match with one or more entities based on the identified pattern. For example, the knowledge service 310 can match the pattern "XXX-XX-XXXX" to the format of U.S. social security numbers. Furthermore, the knowledge service 310 can determine that social security numbers are protected or sensitive information, the disclosure of which is linked to various penalties.

In some embodiments, profile engine 326 can perform statistical analysis to disambiguate between multiple classifications identified for data processed by profile engine 326. For example, when text is classified with multiple domains, profile engine 326 can process the data to statistically determine the appropriate classification determined by knowledge service 310. The statistical analysis of the classification can be included in the metadata generated by profile engine 326.

In addition to pattern identification, profile engine 326 can analyze data statistically. The profile engine 326 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 326 can be provided to the recommendation engine 308 to generate one or more transform recommendations. The entities that match an identified pattern of the data can be used to enrich the data with those entities identified by classification determined using knowledge service 310. In some embodiments, the data to the identified patterns (e.g., city and state) may be provided to knowledge service 310 to obtain, from a knowledge source 340, entities that match the identified patterns. For example, knowledge service 310 may be invoked calling a routine (e.g., getCities( ) and getStates( )) corresponding to the identified patterns to receive entity information. The information received from knowledge service 310 may include a list (e.g., canonical list) of entities that have properly spelled information (e.g., properly spelled cities and states) for the entities. Entity information corresponding to matching entities obtained from knowledge service 310 can be used to enrich data, e.g., normalize the data, repair the data, and/or augment the data.

In some embodiments, the recommendation engine 308 can generate transform recommendations based on the matched patterns received from the knowledge service 310. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 322 can generate transform scripts based on the recommendations provided by recommendation engine 308 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 322 can automatically generate transform scripts to repair data at the data source. Repairs may include automatically renaming columns, replacing strings or patterns within a column, modifying text case, reformatting data, etc. For example, the transform engine 322 can generate a transformation script to transform a column of dates based on a recommendation from recommendation engine 308 to modify, or convert, the formats of the dates in the column. The recommendation may be selected from multiple recommendations to enrich or modify the data from a data source that is processed by profile engine 326. The recommendation engine 308 may determine the recommendation based on metadata, or profile, provided by the profile engine 326. The metadata may indicate a column of dates identified for different formats (e.g., MM/DD/YYYY, DD-MM-YY, etc.). The transform script generated by transform engine 322 can, for example, split and/or join columns based on suggestions from the recommendation engine 308. The transform engine 322 may also remove columns based on the data source profiles received from profile engine 326 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Examples of recommended transformations are described with reference to FIGS. 4A, 4B, 4C, and 4D. Based on the transform operations specified by a user through the graphical user interface, the transform engine 322 performs transform operations according to those operations. The transform operations may be recommended to the user to enrich a data set.

As described further below, the clients 304 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 330 by publish engine 324. In some embodiments, the data targets can be different data stores than the data sources. In some embodiments, the data targets can be the same data stores as the data sources. Data targets 330 can include a public cloud storage service 332, a private cloud storage service 334, various other cloud services 336, a URL or web-based data target 338, or any other accessible data target.

In some embodiments, recommendation engine 308 can query knowledge service 310 for additional data related to the identified platform. For example, where the data includes a column of city names, related data (e.g., location, state, population, country, etc.) can be identified and a recommendation to enrich the dataset with the related data can be presented. Examples of presenting recommendations and transforming data through a user interface are shown below with respect to FIGS. 4A-4D.

Knowledge service 310 can implement a matching method to compare the data to reference data available through knowledge service 310. Knowledge service 310 can include or have access to one or more knowledge sources 340. The knowledge sources can include publicly available information published by web sites, web services, curated knowledge stores, and other sources. Knowledge service 310 can implement a method to determine the semantic similarity between two or more datasets. This may also be used to match the user's data to reference data available through the knowledge service 310. Knowledge service 310 may perform similarity metric analysis as described in this disclosure. The techniques performed by knowledge service 310 may include those described in this disclosure including the techniques described by the references incorporated herein.

Knowledge service 310 can perform operations to implement automated data analyses. In some embodiments, knowledge service 310 can use an unsupervised machine learning tool, such as Word2Vec, to analyze an input data set. Word2Vec can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine corresponding numeric vector for each input word. When these vectors are analyzed, it may be determined that the vectors are "close" (in the Euclidean sense) within a vector space. Although this can identify that input words are related (e.g., identifying input words that are clustered closely together within a vector space), Word2Vec may not be usable to identify a descriptive label for the words (e.g., "tire manufacturers"). Knowledge service 310 may implement operations to categorize the related words using a curated knowledge source 340 (e.g., YAGO, from the Max Planck Institute for Informatics). Using information from a knowledge source 340, knowledge service 310 can add additional, related data to the input data set.

In some embodiments, knowledge service 310 may implement operations to perform trigram modeling to further refine categorization of related terms. Trigram modeling can be used to compare sets of words for category identification. The input data set can be augmented with the related terms.

Using the input data set, which may include added data, knowledge service 310 can implement matching methods (e.g., a graph matching method) to compare the words from the augmented data set to categories of data from knowledge source 340. Knowledge service 310 can implement a method to determine the semantic similarity between the augmented data set and each category in knowledge source 340 to identify a name for the category. The name of the category may be chosen based on a highest similarity metric. The similarity metric may computed be based on the number of terms in the data set that match a category name. The category may be chosen based on the highest number of terms matching based on the similarity metric. Techniques and operations performed for similarity analysis and categorization are further described below.

In some embodiments, knowledge service 310 can augment an input data set and use information from a knowledge source 340 to add additional, related data to the input data set. For example, a data analysis tool such as Word2Vec can be used to identify semantically similar words to those included in the input data set from a knowledge source, such as a text corpus from a news aggregation service. In some embodiments, knowledge service 310 can implement trigram modeling to preprocess data obtained from a knowledge source 340 (such as YAGO) to generate an indexed table of words by category. Knowledge service 310 can then create trigrams for each word in the augmented data set and match the word to a word from the indexed knowledge source 340.

Using the augmented data set (or the trigram matched augmented data set), knowledge service 310 can compare the words from the augmented data set to categories of data from knowledge source 340. For example, each category of data in the knowledge source 340 can be represented as a tree structure, with the root node representing the category, and each leaf node representing a different word belonging to that category. Knowledge service 310 can implement a method (e.g., Jaccard index, or other similarity metric) to determine the semantic similarity between the augmented data set and each category in knowledge source 510. The name of the category that matches the augmented data set (e.g., having a highest similarity metric) can then be applied as a label to the input data set.

In some embodiments, knowledge service 310 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sorensen index; the Tversky index; the Tanimoto metric; and the cosine similarity metric.

In some embodiments, knowledge service 310 may utilize a data analysis tool, such as Word2Vec, to compute a refined metric (e.g., score) that indicates a degree of match between data from a knowledge source 340 and an input data, which may be augmented with data from a knowledge source. The score ("knowledge score") may provide greater knowledge about the degree of similarity between an input data set and a category to which a comparison is made. The knowledge score may enable data enrichment service 302 to choose a category name that bests represents the input data.

In the techniques described above, knowledge service 310 may count the number of matches of terms in the input data set to a candidate category (e.g., genus) name in a knowledge source 340. The result of the comparison may yield a value that represents a whole integer. As such the value, although indicative of the degree of match between terms, may not indicate a degree of match between an input data set and different terms in a knowledge source.

Knowledge service 310 may utilize Word2Vec to determine a similarity of a comparison of each term (e.g., a term for a genus) in a knowledge source and the terms of input data (e.g., species). Using Word2Vec, knowledge service 310 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.5. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, knowledge service 310 can associated "company" instead of "surname" with a user-supplied column of data containing tire manufactures.

Knowledge service 310 can determine information about knowledge groups (e.g., domains or categories). Information about knowledge groups can be presented in a graphical user interface. Information about knowledge domains may include a metric (e.g., a knowledge score) indicating a measure of similarity between a knowledge domain and an input data set of terms. Input data may be compared to data from a knowledge source 340. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, knowledge service 310 may determine a more accurate matching score. The score may correspond to a value computing using a scoring formula using techniques disclosed herein including references that are incorporated herein. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

In some embodiments, user interface 306 can generate one or more graphical visualizations based on metadata provided by profile engine 326. As explained above, the data provided by profile engine 326 may include statistical information indicating metrics about data that has been processed by profile engine 326. Examples of graphical visualizations of metrics of profiled data are shown in FIGS. 5A-5D. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 326 enable the recommendation engine to better focus its queries to knowledge service 310, improving processing speed and reducing load on system resources. For example, this information can be used to limit the scope of knowledge being queried so that the knowledge service 310 does not attempt to match a column of numerical data to place names.

Data discovery engine 344 can process datasets from multiple data sources to determine, or "discover" a relationship between the datasets. The datasets may be processed as ingested from data sources, and/or may be processed after processing performed by any elements of data enrichment service 302. Data discovery engine 344 may include one or more components to perform processing on a dataset from a data source. All or a portion of any two datasets may be compared to identify a relationship. One or more relationships may be identified based on the processing of the datasets. The relationships between any two compared datasets may be used to determine one or more recommendations for merging (e.g., joining), or "blending," the data sets together.

In at least one embodiment, data discovery engine 344 may implement one or more techniques for cross-source relationship discovery. Relationship discovery may include determining a relationship between a subset of data, such as a relationship between a pair of columns, or column pair, each column in a different dataset of the datasets that are compared. Given two datasets to process for relationship discovery, data discovery engine 344 can identify and recommends a ranked subset of column pairs between two compared datasets. The ranked column pairs identified as a relationship may be useful for blending the datasets with respect to those column pairs.

A significant amount of computing resources may be expended to compare every column of data between two datasets. The number of possible column pairs between any two datasets is $N^2$, where N represents the number of columns in any single dataset. To reduce the amount of processing for comparing datasets and to improve the efficiency of a computer system of data enrichment service 302 utilized for comparing two datasets, techniques disclosed herein may be implemented to compare a reduce portion of the datasets to identify relationships, if any, between the two data sets. For "big data" datasets, new and improved techniques for comparing datasets is desired to enable quick and efficient processing of data for enrichment. Data discovery engine 344 can quickly and automatically "discover" a subset of column pairs that are related amongst any two data sets. To avoid an expensive data-level overlap analysis over all columns in the datasets, profile data for each column as identified herein can be used for further, efficient comparison. Data discovery engine 344 can quickly and efficiently filter out known unpromising column pairs.

In some embodiments, data discovery engine 344 can implement one or more approaches for data relationship discovery. FIG. 6 illustrates some embodiments of a process for data relationship discovery. Examples of techniques are further disclosed in U.S. Provisional Application No. 62/395,349, filed Sep. 15, 2016 and entitled "TECHNIQUES FOR RELATIONSHIP DISCOVERY BETWEEN DATASETS." One technique is a top-down approach for discovery in which relationships are configured manually or "suggested" based on identical or similar column names. In such an approach, keys for relationships are obvious based on user provided identifier or comparison of column names. Another technique is a bottom-up approach in which contents of two data sets are profiled and analyzed from the bottom up of those data sets to determine relationships between datasets. In a bottom-up approach, keys for relationships between data sets are discovered and users verify relationships based on confidence metrics and previews. Yet another technique is a hybrid approach including a mix of both top-down and bottom-up approaches with additional assistance from hyper previews and visualizations. These techniques, although effective, may be challenged due to the heterogeneity and size of the datasets, which introduces makes it hard difficult to find columns in the data that could be used for joining (blending) these datasets.

Techniques for data relationship discovery may include performing one or more processes comparing a subset of column pairs between two datasets that are analyzed. Profile metadata about the column pairs are used to filter out unpromising column pairs. The process(es) may include employing a predictive model to score and/or rank the remaining column pairs as an indication of possible relationships between two datasets. The profile metadata about a column in any dataset may be obtain by processes disclosed herein. The profile metadata for column pairs that are compared enables data discovery engine 344 to determine a relationship, such as any overlap between columns.

In some embodiments, data discovery engine 344 can perform one or more operations to determine a type of join based on a discovered relationship between datasets. Such operations are disclosed with reference to FIGS. 6A and 6B. Examples of techniques for different types of joins are disclosed in U.S. Provisional Application No. 62/395,349, filed Sep. 15, 2016 and entitled "TECHNIQUES FOR RELATIONSHIP DISCOVERY BETWEEN DATASETS." The type of join may be determined based on the relationship discovered between columns in datasets. The type of join may be based on that which a user specifies via an interface that provides suggestions for joins based on relationships between the datasets, Based on the type of join, data discovery engine 344 can generate one or more visual representations ("Glenn Diagrams") of the type of join for the datasets corresponding to one or more recommendations of relationships between the datasets. U.S. Provisional Application No. 62/395,349, filed Sep. 15, 2016 and entitled "TECHNIQUES FOR RELATIONSHIP DISCOVERY BETWEEN DATASETS" disclose and illustrate some embodiments for determining and displaying a visual representation of a join of datasets.

Figure 3B:
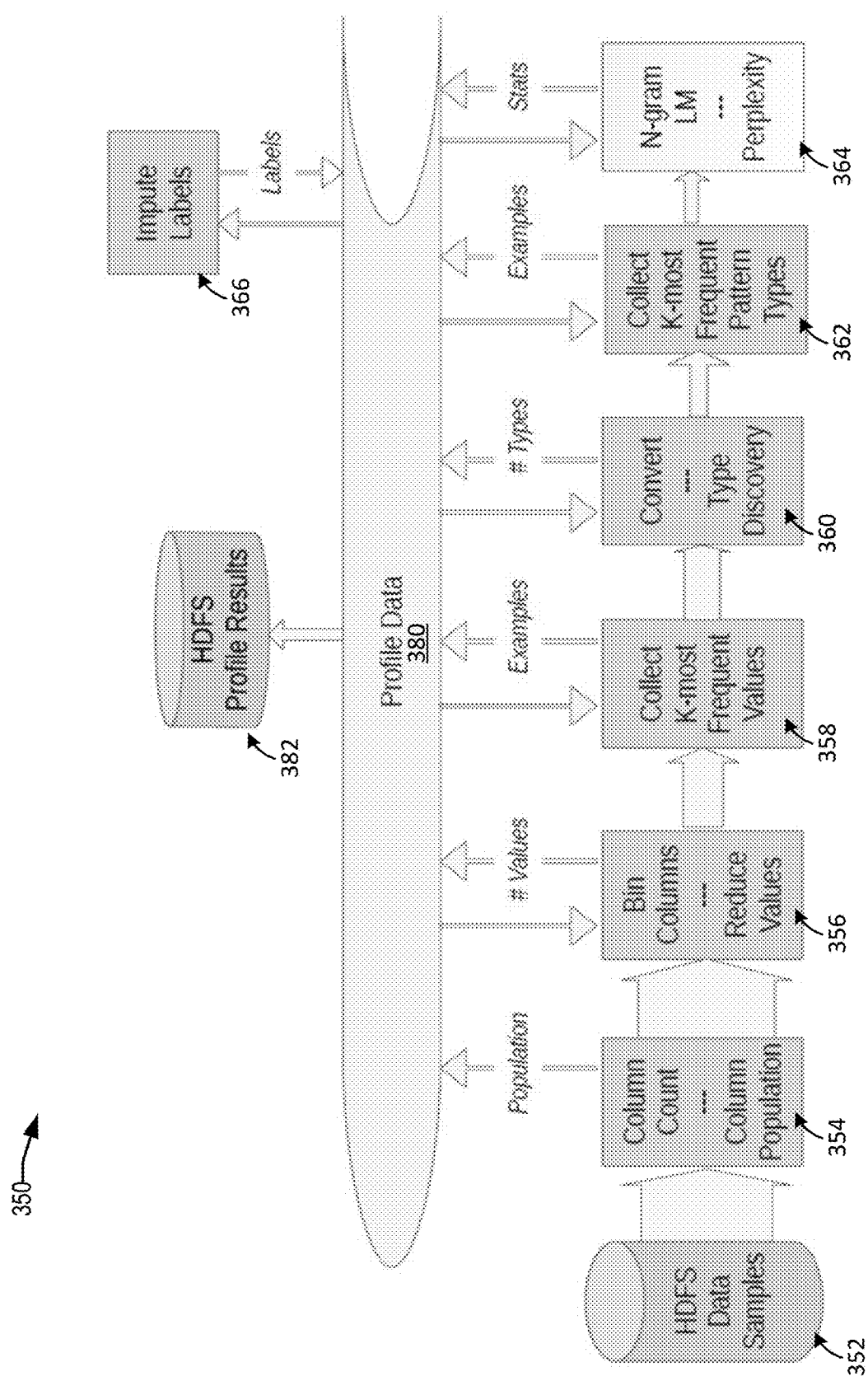
FIG. 3B depicts an example data flow of a profile process of an interactive visualization system, in according with an embodiment of the present disclosure.

FIG. 3B depicts an example data flow of a profile process 350 of an interactive visualization system, in according with an embodiment of the present disclosure. Profile process 350 may be implemented by data enrichment service 302. Profile engine 326 may implement all or part of profile process 350 to profile data ingested from various data sources.

Data enrichment service 302 may request data to be processed from data sources. The data sources may be sampled and the sampled data may be stored in a distributed storage system (such as a Hadoop Distributed Storage (HDFS) system) accessible to data enrichment service. In some embodiments, sampled data may be received from one or more data sources. Profile process 350 may analyze sampled data for enrichment, making large data sets more manageable. The data may be processed semantically by a number of processing stages (described herein as a pipeline or semantic pipeline), such as processing stages described with reference to FIGS. 2 and 3A.

Profile process 350 may begin at step 352 by accessing sampled data for profiling. Data that is profiled 380 ("profile data") may be generated at one or more steps of process 350. Profile data 380 may be stored in one or more data targets such as a distributed storage system 382. Process 350 may analyze sampled data to determine global statistics including statistics about columns.

At step 354, sampled data may be characterized to determine global statistics, including a column profile. A column profile may indicate column-specific statistics. Examples of column-specific statistics include column count and column population. At step 356, sampled data may be further profiled to determine column values. Column values may be processed to reduce a format of unique values and their frequencies for each column. At step 358, processing may continue to determine column-specific metrics such as a K-most frequent unique values. Examples of K-most frequent values may be stored as profile data 380 in distributed storage system 382. At step 360, type discovery may be performed, whereby unique types are discovered for column data. The number of types may be stored as profile data 380 in distributed storage system 382. At step 362, the unique types may be processed to determine metrics about type patterns, such as K-most frequent patterns types in column data. Examples of the types of patterns may be stored as profile data 380 in distributed storage system 382. At step 364, column data may be further processed to determine n-grams found in columns. Statistics about the N-grams may be stored as profile data 380 in distributed storage system 382. As described herein, profiled data 380 may be used to present data visualizations indicating statistics about large sets of data. At step 366, profiled data may be modified for enrichment to impute labels, such as column names. The labels may be imputed on the basis of the statistics of the profiled data.

With reference to FIG. 3B, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted FIG. 3B may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3B is not intended to be limiting. Other sequences of steps may also be performed according to alternative embodiments. For example, alternative embodiments of the present disclosure may perform the steps outlined above in a different order. Moreover, the individual steps illustrated in FIG. 3B may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the flowchart of FIG. 3B can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 3C:
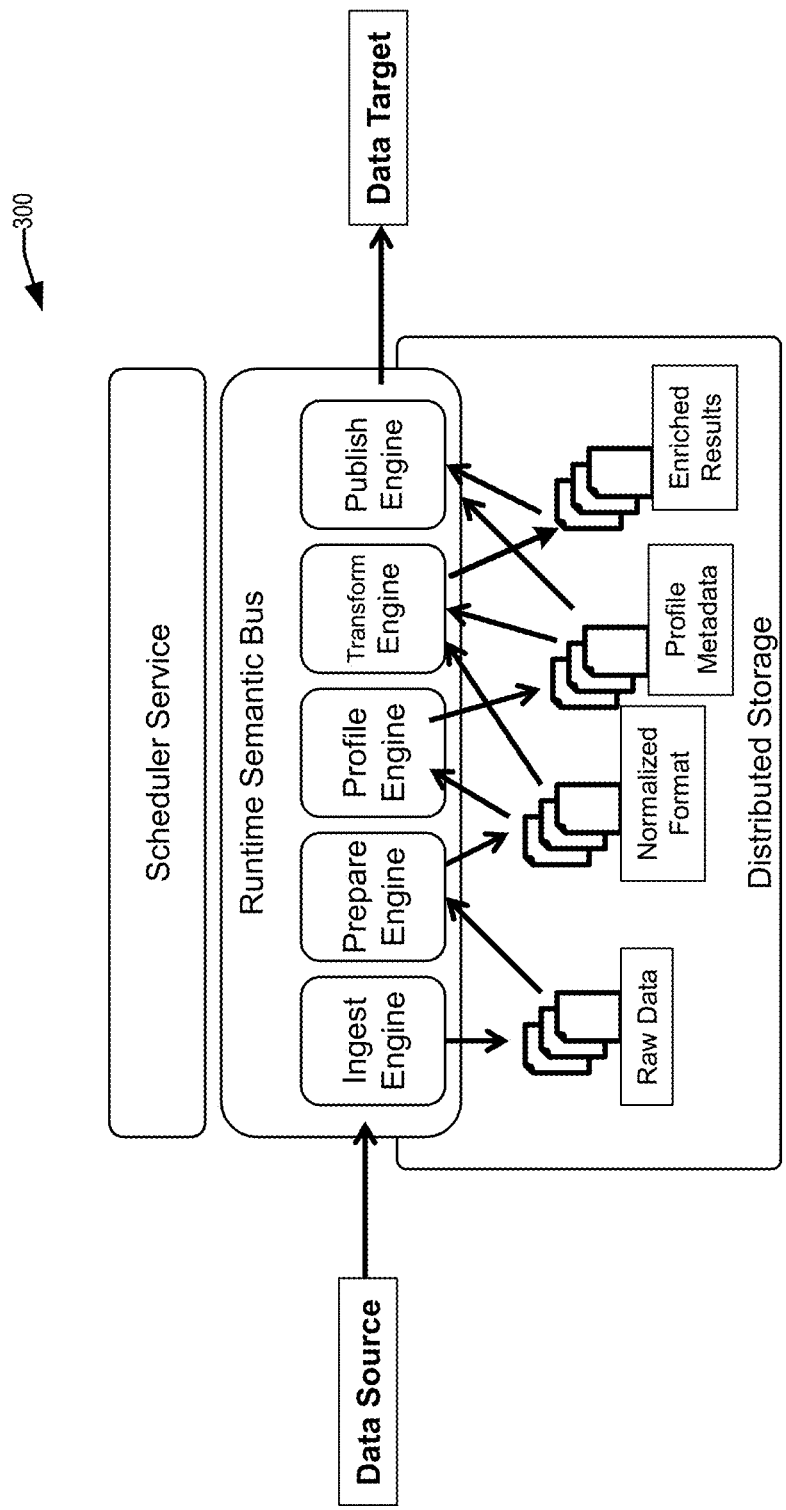
FIG. 3C depicts a simplified block diagram of a data enrichment system, in accordance with an embodiment of the present disclosure.

FIG. 3C depicts a simplified block diagram of a data enrichment system 300, in accordance with an embodiment of the present disclosure. Specifically, data enrichment system 300 may include a semantic processing pipeline, in accordance with an embodiment of the present disclosure. All or part of the semantic processing pipeline may be implemented by data enrichment service 102. As shown in FIG. 3C, when a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is further described in this disclosure, such as with reference to FIGS. 3A and 3B.

In at least one embodiment, the pipeline may include data discovery engine 344 to perform processes disclosed herein as being performed for data discovery. The data discovery may be performed using the profiled data generated by profile engine. In some embodiments, the information determined by data discovery engine 344 may be used to produce one or more recommendations for data relationships. The recommendations may be used to determine one or more transform scripts for merging two datasets based on the relationship of column pairs between those data sets.

Figure 4B:
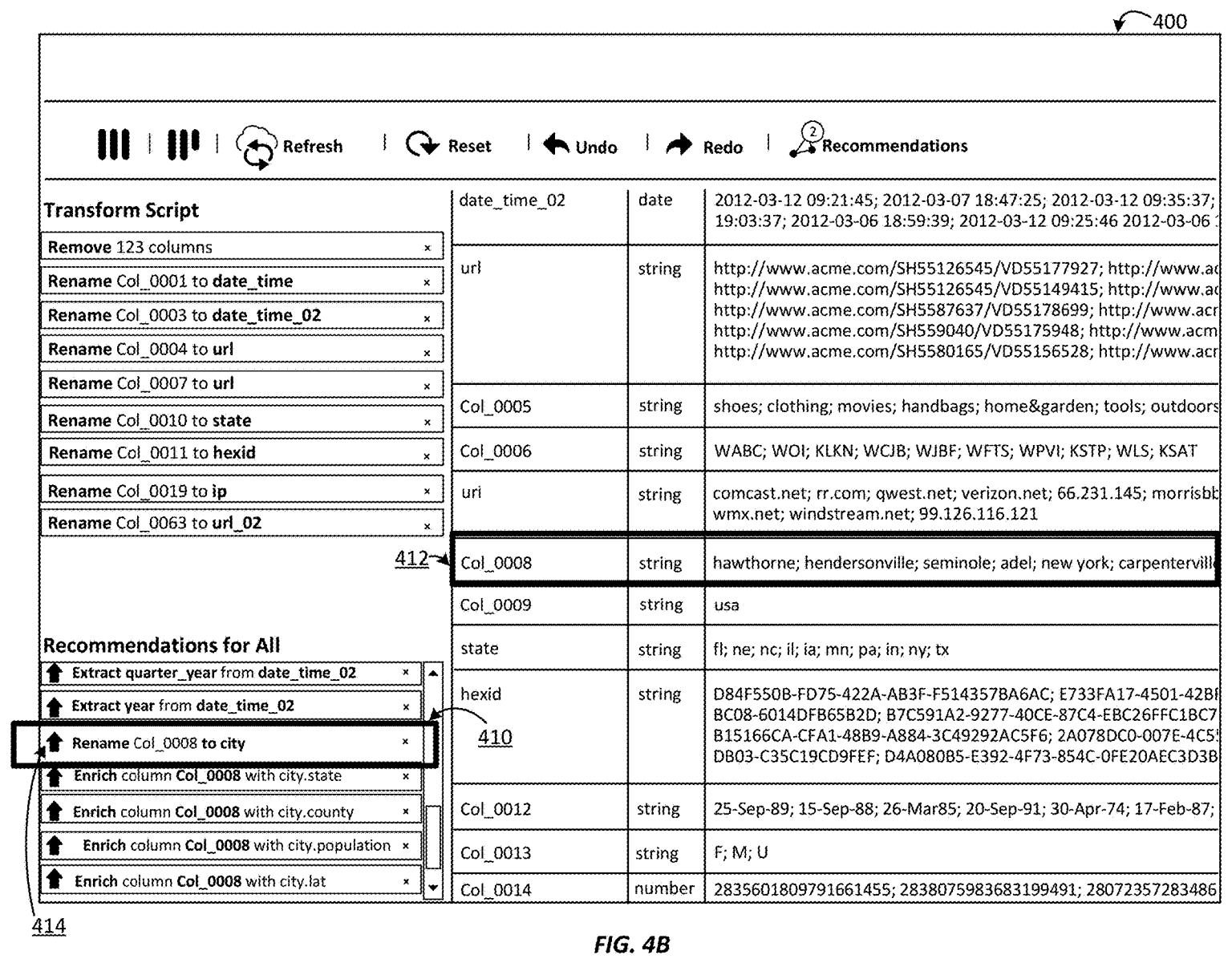

FIGS. 4A-4D depict examples of a user interface that provides interactive data enrichment, in accordance with an embodiment of the present disclosure. As shown in FIG. 4A, an example interactive user interface 400 can display transform scripts 402, recommended transforms 404, and at least a portion of the data 406 being analyzed/transformed. Transform scripts listed in panel 402 can include indicate transforms that have been applied to the data and are visible in panel 406. Each transform script 402 can be written in a simple declarative language intelligible to a business user. Transform scripts listed in panel 402 may be automatically applied to the data and reflected in the portion of the data 406 displayed in the interactive user interface 400. For example, the transform scripts listed in patent 402 include renaming columns to be descriptive of their content. Columns 408 shown in interactive user interface 400 have been renamed according to the transform scripts 402 (e.g., column 0003 is now named date time_02, column_0007 is no named "url", etc.). Recommended transforms 404, however, have not been automatically applied to the user's data.

As shown in FIG. 4B, a user can view recommendations in recommendation panel 404 and based on the recommendation, identify the data to be changed. For example, recommendation 410 includes a recommendation to rename "Col_0008 to city". Because the recommendation is written such that a business user can understand it (instead of in, e.g., code or pseudo code) the corresponding data 412 can be readily identified by the user. As shown in FIG. 4B, data 412 includes a column of strings (represented as a row in user interface 400). The profile engine 326 can analyze the data to determine that it includes strings of two or fewer words (or tokens). This pattern can be provided to recommendation engine 318 which can query knowledge service 310. In this case, knowledge service 310 has matched the data pattern to city names and recommendation 408 was generated to rename the column accordingly.

In some embodiments, transforms listed in panel 404 may have been applied at the direction of the user (e.g., in response to an instruction to apply the transform) or may have been applied automatically. For example, in some embodiments, knowledge service 310 can provide a confidence score for a given pattern match. A threshold can be set in recommendation engine 318 such that matches having a confidence score greater than the threshold are applied automatically.

Figure 4C:
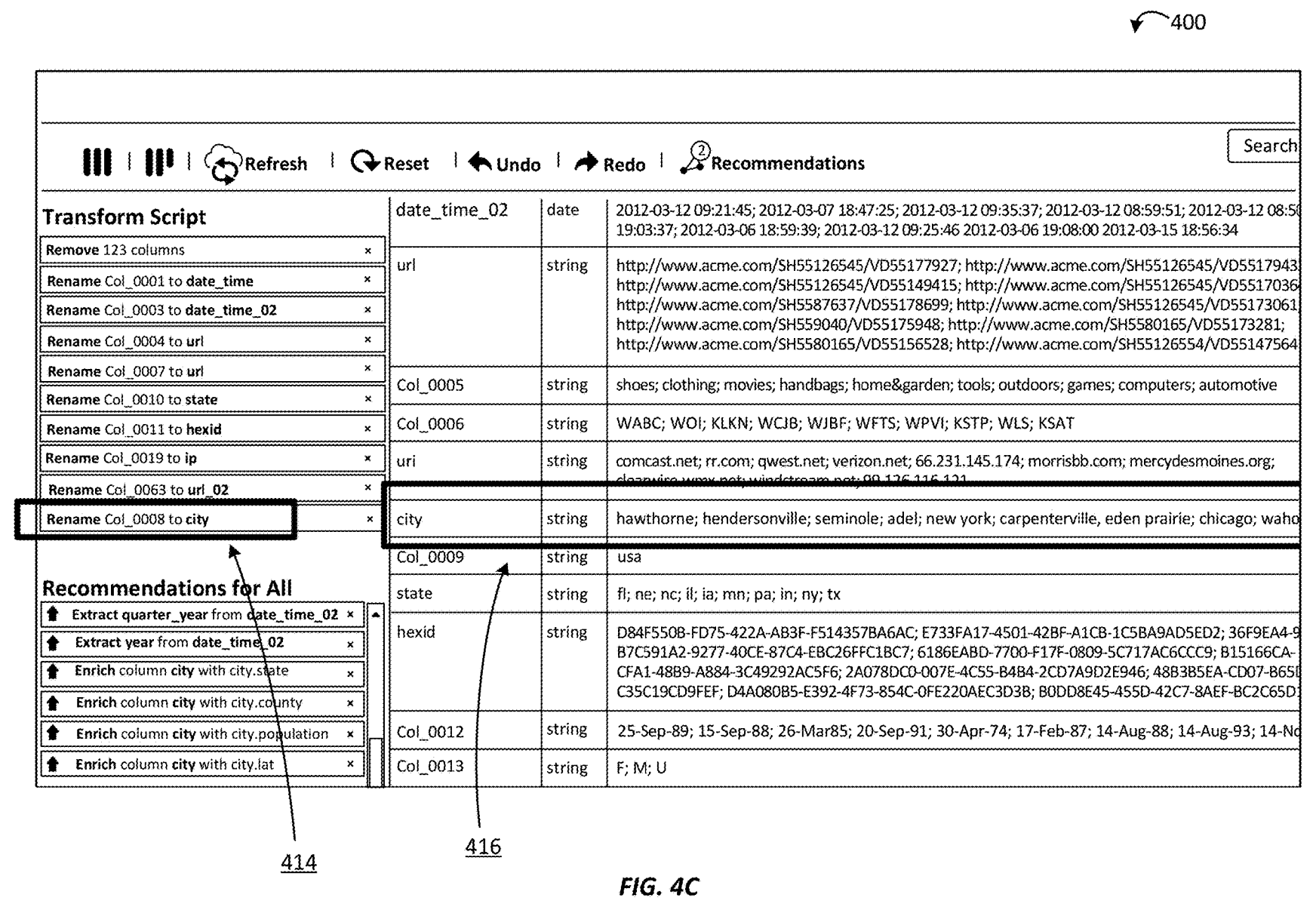

To accept the recommendation, the user can select an accept icon 414 (in this example an up arrow icon) associated with the recommendation. As shown in FIG. 4C, this moves the accepted recommendation 414 to transform scripts panel 402 and automatically applies the transform to the corresponding data 416. For example, in the embodiment shown in FIG. 4C, Col_0008 has now been renamed to "city" in accordance with the selected transform.

In some embodiments, data enrichment service 302 can recommend additional columns of data to be added to a data source. As shown in FIG. 4D, continuing with the city example, transforms 418 have been accepted to enrich the data with new columns including city population, and city location detail including longitude and latitude. When selected, the user's data set is enriched to include this additional information 420. The data set now includes information that was not previously available to the user in a comprehensive and automated fashion. The user's data set can now be used to produce a nationwide map of locations and population zones associated with other data in the dataset (for example, this may be associated with a company's web site transactions).

FIGS. 5A-5D depict examples of various user interfaces that provide visualizations of datasets, in accordance with an embodiment of the present disclosure.

Figure 5A:
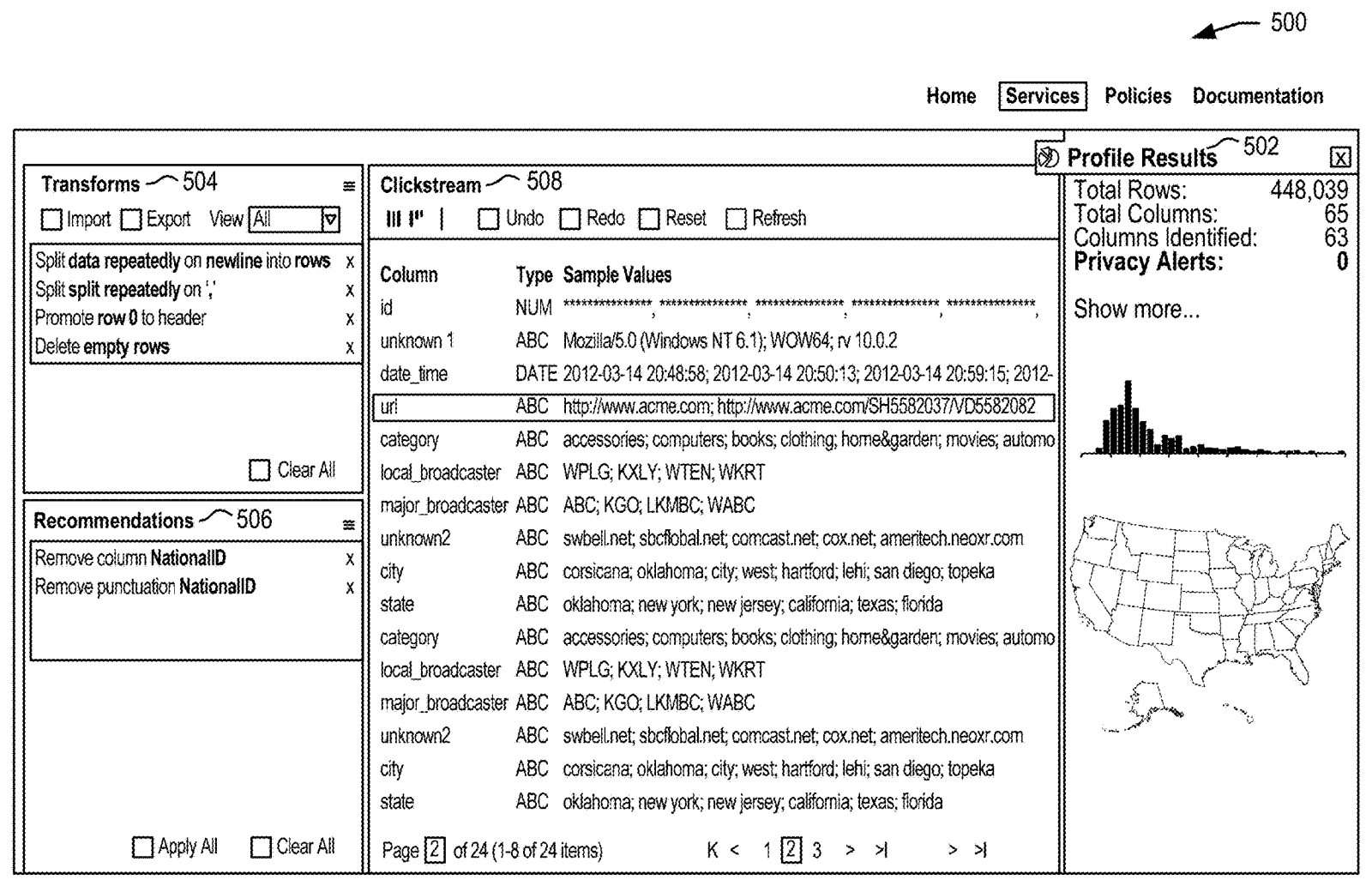

FIG. 5A depicts an example of a user interface that provides visualizations of datasets, in accordance with an embodiment of the present disclosure. As shown in FIG. 5A, an example interactive user interface 500 can display a profile summary 502 ("Profile Results"), transform scripts 504, recommended transforms 506, and at least a portion of the data 508 being analyzed/transformed. Transforms listed in panel 504 can include transforms that have been applied to the data and are visible in panel 508.

Profile summary 502 can include global statistics (e.g., total rows and columns) as well as column-specific statistics. The column-specific statistics can be generated from analysis of data processed by data enrichment service 302. In some embodiments, the column-specific statistics can be generated based on column information determined by analysis of data process by data enrichment service 302.

Profile summary 502 may include a map (e.g., "a heat map") of the United States, where different areas of the United States are shown in different colors, based on statistics identified from the data being analyzed 508. The statistics may indicate how frequently those locations are identified as being associated with the data. In one illustrative example, data may represent purchase transactions at an online retailer, where each transaction can be associated with a location (e.g., based on shipping/billing addresses, or based on recorded IP addresses). Profile summary 502 may indicate locations of transactions based on processing of the data representing the purchase transactions. In some embodiments, visualizations can be modified based on user input to assist the user in searching the data and finding useful correlations. These features are described further below.

Figure 5B:
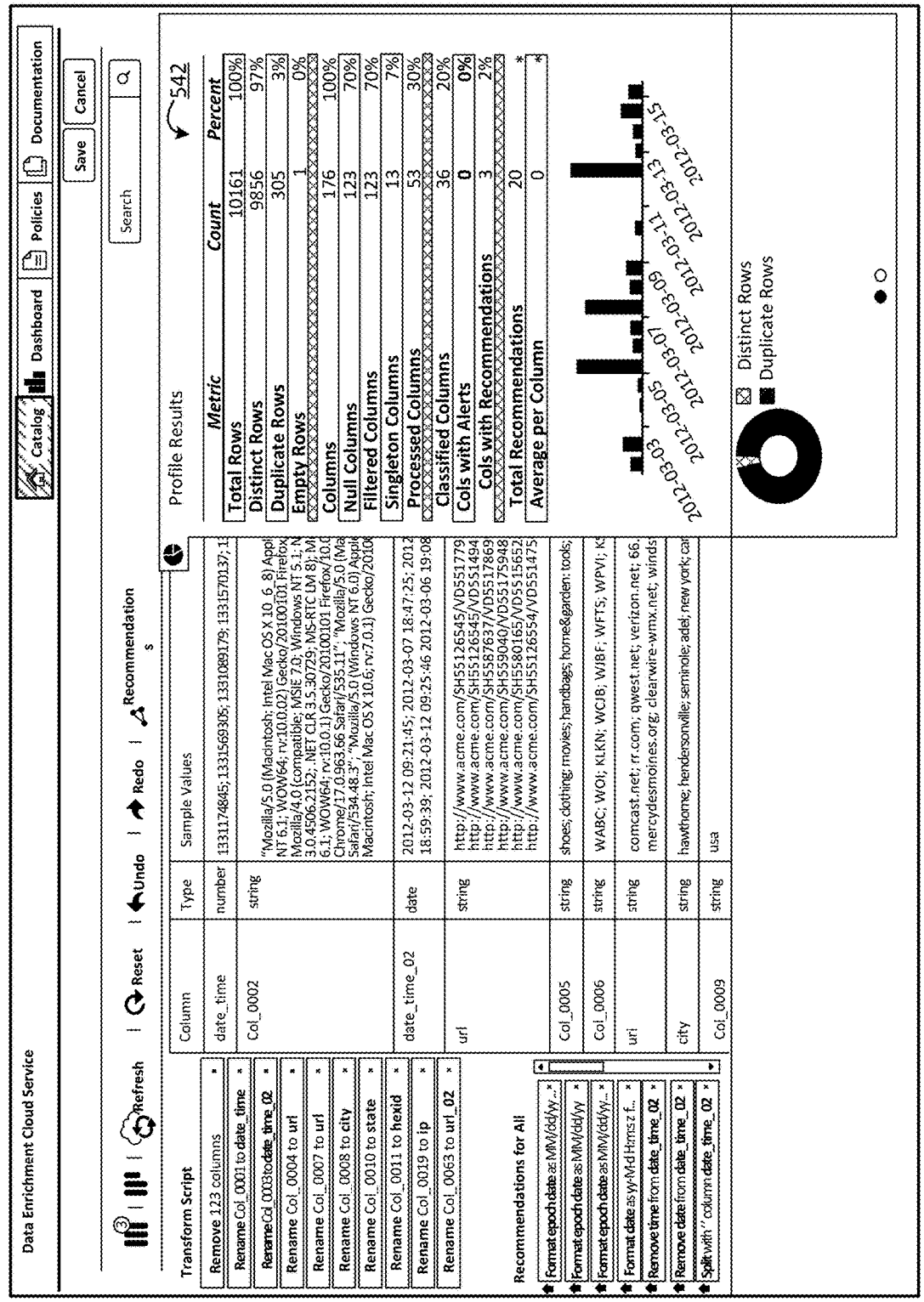
Figure 5C:
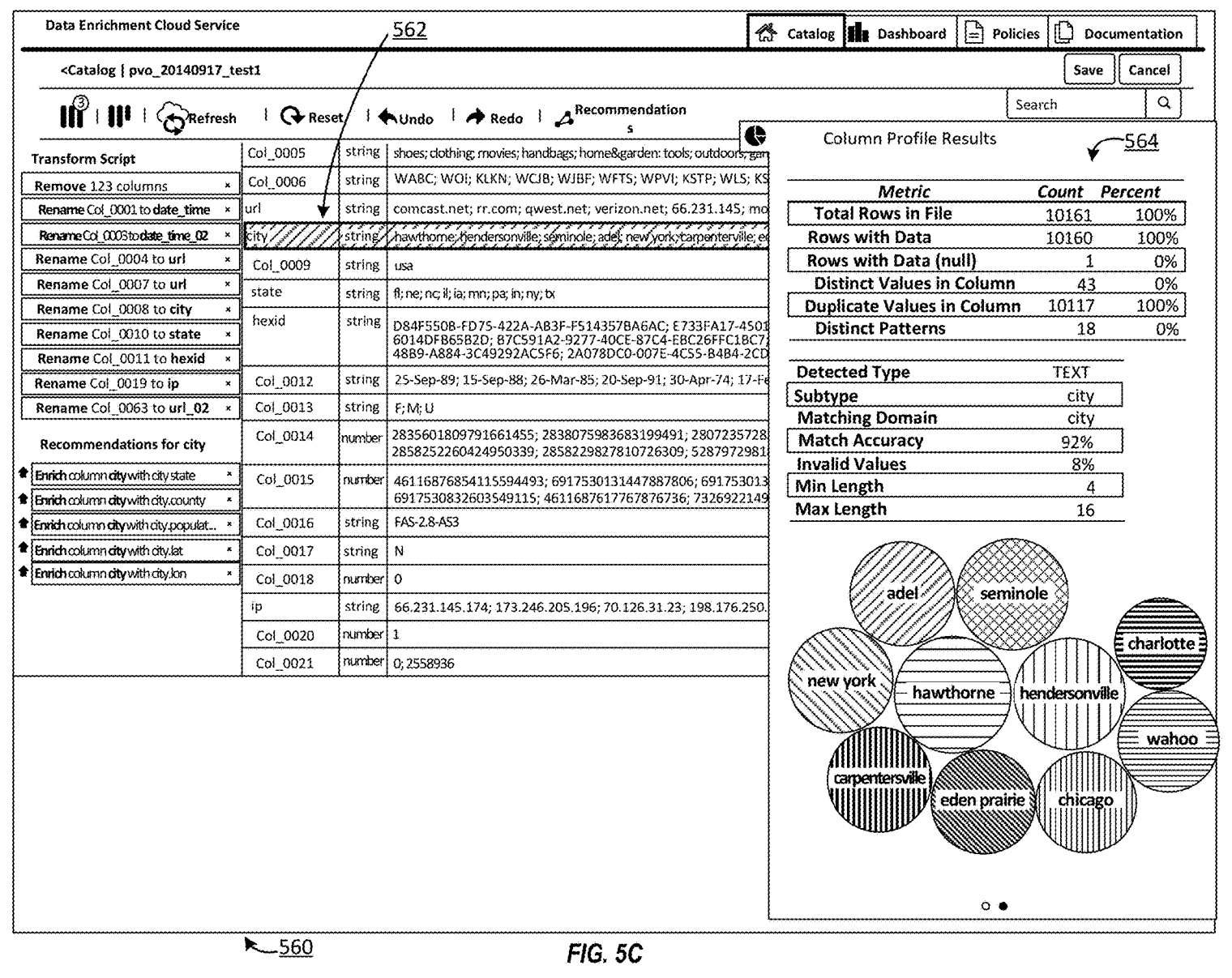
Figure 5D:
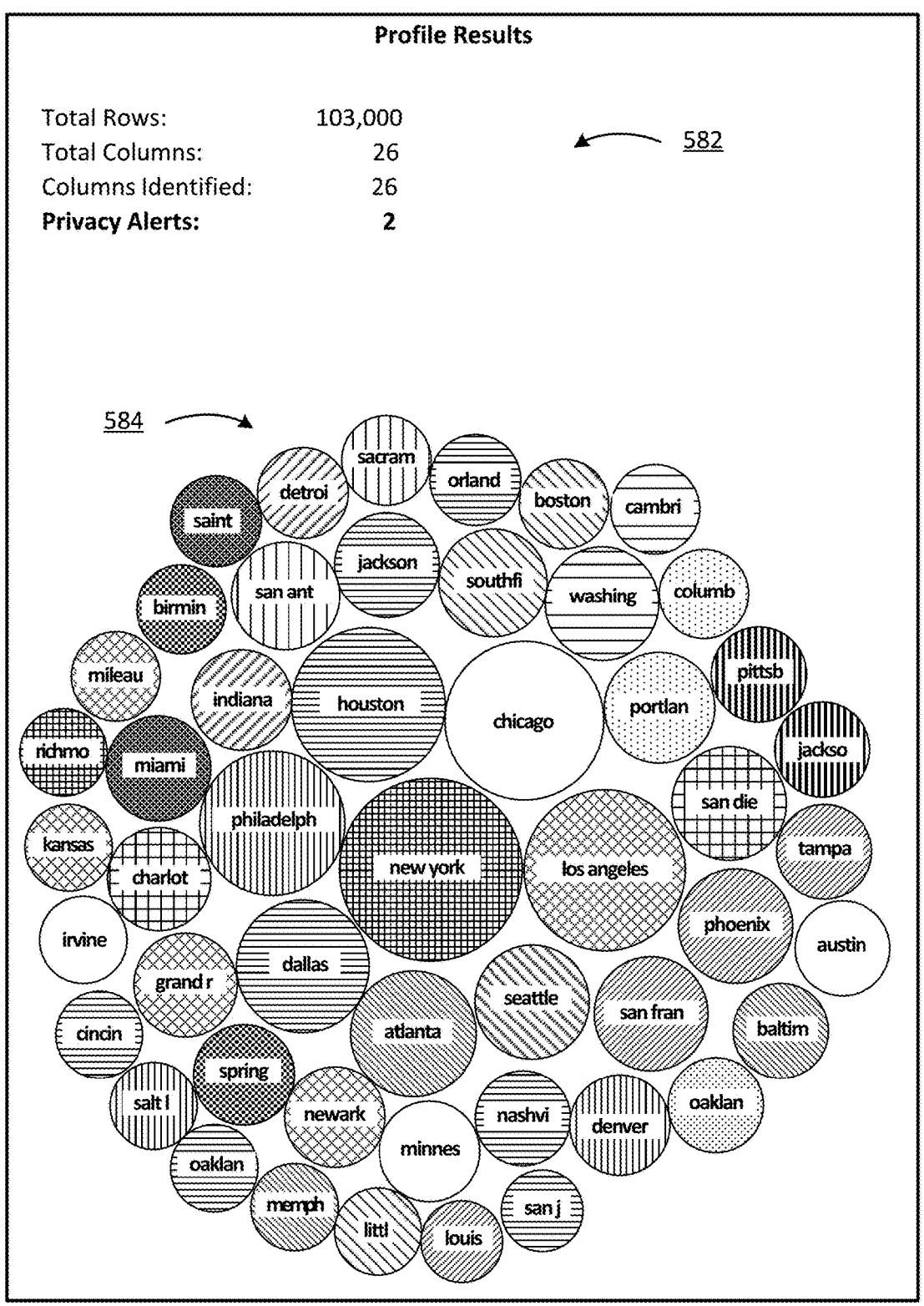

FIGS. 5B, 5C, and 5D show examples of results of interactive data enrichment for data sets. FIG. 5B shows a user interface 540 that can include a profile metric panel 542. Panel 542 can show a summary of metrics associated with the selected data source. In some embodiments, as shown in FIG. 5C, a profile metric panel 560 can include metrics for a particular column 562, instead of an entire data set. For example, the user can select the particular column on the user's client device and the corresponding column profile 564 can be displayed. In this example, the profiler indicates a 92% match of column_0008 with known cities in the knowledge source. A high probability in some embodiments can cause the transform engine to automatically label col_0008 to "city".

FIG. 5D shows a profile metric panel 580 that includes global metrics 582 (e.g., metrics related to an entire dataset), and column-specific visualizations 584. The column specific visualizations 584 can be selected by a user and/or used to navigate the data (e.g., by clicking, dragging, swiping, etc.). The examples described above represent simplified transforms to small data sets. Similar and more complex processing can also be applied automatically to large data sets comprising billions of records.

Figure 6A:
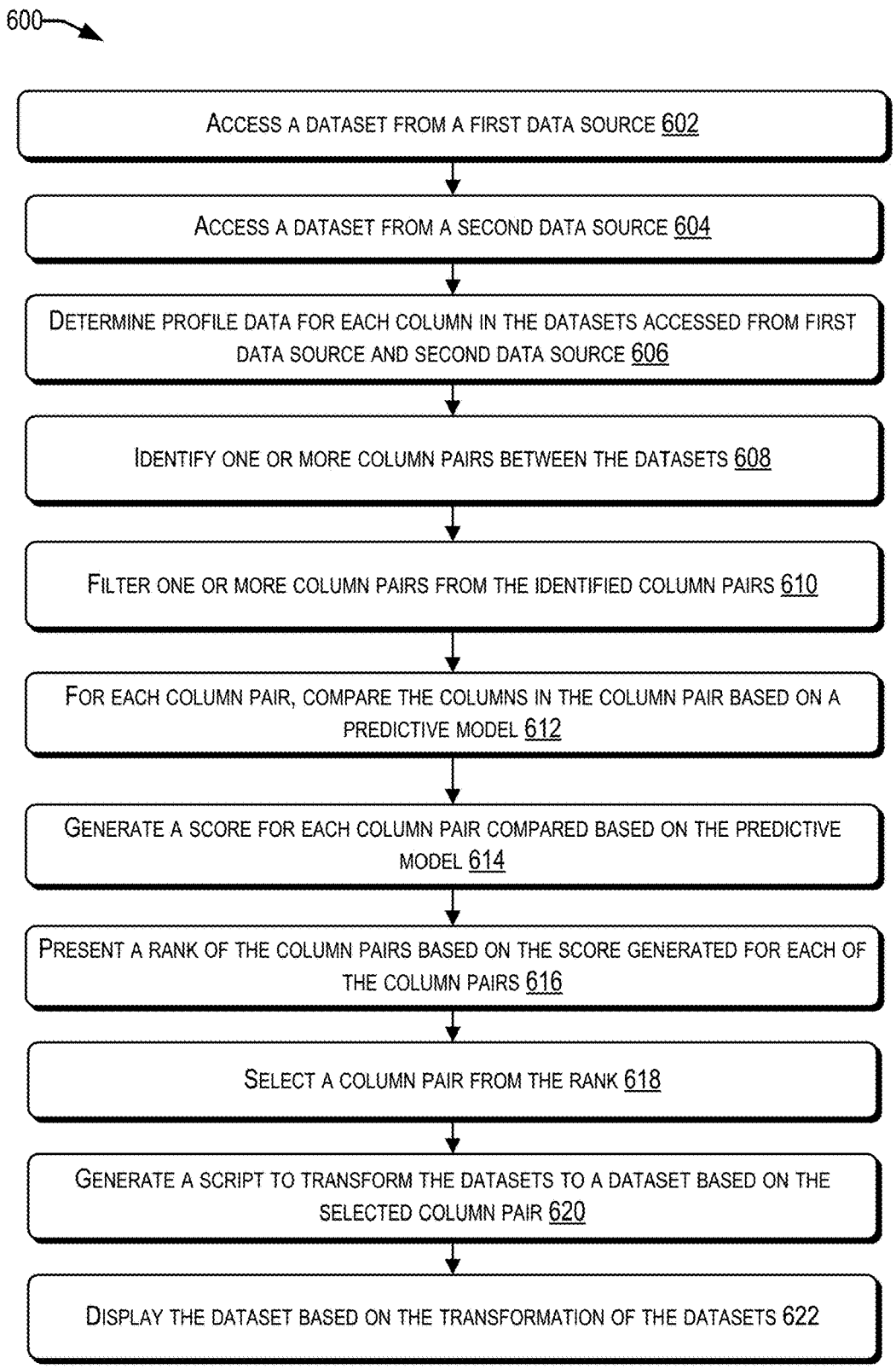
FIG. 6A depicts a flowchart of a process in accordance with an embodiment of the present disclosure.

FIG. 6A depicts a flowchart of a process 600, in accordance with an embodiment of the present disclosure. In some embodiments, process described with reference to FIG. 6A can be implemented by a computing system of a data enrichment service 302. Process 600 may be implemented all or in part of Data Discovery as disclosed in U.S. Provisional Application No. 62/395,349, filed Sep. 15, 2016 and entitled "TECHNIQUES FOR RELATIONSHIP DISCOVERY BETWEEN DATASETS."

Process 600 may begin at block 602 by accessing a dataset (e.g., a first dataset) from a data source (e.g., a first data source). At block 604, a dataset (e.g., a second dataset) may be accessed from a data source (e.g., a second data source) that is different from the data source accessed at block 602. The second dataset can be different from the first dataset.

At block 606, profile data about each column in the first dataset and each column in the second dataset are determined. The profile data may be generated by data enrichment service 302. The profile data may include metadata. For example, first profile metadata is generated for for each column of a first plurality of columns in a first dataset stored a first data source and second profile metadata is generated for each column of a second plurality of columns in a second dataset stored a second data source. In some embodiments, the profile data may be generated by a third party computer system and made accessible to process 600. By using profile data, such as metadata, a computer system can efficiently and quickly process data sets to determine their relationship without having to analyze the underlying datasets. Where datasets are large, such as big data datasets, a significant amount of processing time of the computer system is saved, or reduced, by not having to analyze the underlying datasets to determine column-wise relationships.

At block 608, pairs of columns, or column pairs are identified for comparison between the first dataset and the second dataset. A column pair is identified for each distinct column in the first dataset and each distinct column in the second dataset. For example, a plurality of column pairs between the first dataset and the second dataset are identified, where each column pair in the plurality of column pairs includes a different one of the first plurality of columns and a different one of the second plurality of columns. All possible pairs of columns are identified between the first and the second datasets. A column pair include one distinct column from the first dataset and one distinct column from the second dataset. The profile data for each column is identified for the column in each column pair.

At block 610, one or more column pairs are filtered to be excluded as being unlikely to have a relationship ("unpromising") between columns in the column pair. One or more column pairs may be determined from the possible plurality of column pairs, the one or more column pairs determined by excluding at least one column pair from the plurality of columns pairs. In other words, the identified column pairs are modified, or reduced to exclude those based on filtering. The remaining column pairs that are not filtered, are kept or not excluded from consideration for a possible relationship. Column pairs may be filtered based on a threshold by which a column pair is identified as being unlikely to have a relationship between columns in the column pair. Column pairs may be filtered using the profile data. A column pair is excluded based on determining that no join can be performed between the columns in the column pair. The profile data may be used to make such a determination that there is no data overlap, or possibility of a join between columns in a column pair. Column pairs may be filtered using any number of techniques, such as "Filtering Out Unpromising Column Pairs," including, without limitation or restriction by order, "byCategoryMatch," "byCompleteExampleSetOverlap," "byTextLengthRange," "byNumericalRange," "byCourseTypeMatch," or a combination thereof. The filtering can reduce a large number of column pairs for the identified column pairs. The filtering, thereby, reduces the processing of a computer system so identify a relationship between columns in any column pair for large datasets.

At block 612, for each remaining column pair, the profile data for the columns in the column pair are compared. The profile data is extracted for comparison of features in the profile data for the column pair according to a predictive model. The model may be selected based on analysis of the column pairs. The model can be selected based on a type of join specified by a user, such as through a graphical interface.

At block 614, a score is generated for each column pair according to the selected predictive model. The predictive model is applied for a specific join type to predict pair relationship rank. As a part of applying the model, one or more scores is determined for each comparison. Each score may be generated based on one or more scoring functions. Each scoring function may be based on a feature or classification for a comparison type of columns. A score may be generated for each scoring function as a feature of the column pair. Examples of features include, without restriction or limitation by order, "byColumnType," "byValueUniquenessLeft," "byValueUniquenessRight," "byExampleCharacterSequences," "byExampleValues," "byUniqueExampleOverlap," "byHeaderNameMatch," "byHistograms," or a combination thereof.

Each score may be weighted based on a weight defined by a model for the comparison. A column pairs final score is based on a combination (e.g., a summation) of the weighted score for each scoring function. The total weights for all scoring function may not exceed 1.0. Multiple models may be defined including an inner join model, a left outer join model, and a right outer join model. Each model may be defined by one or more scoring functions, each assigned a different weight, the total not exceeding 1.0.

In at least one embodiment, for each of the one or more column pairs: based on a type of join specified via a graphical interface, computing a plurality of scores for the column pair, each of the plurality of scores computed based on a different one of a plurality of scoring functions, the score indicating a measure for joining columns in the column pair. A plurality of weighted scores may be computed. Each of the plurality of weighted scores may be computed for a different one of the plurality of scores based on applying one of a plurality of weights to the different one of the plurality of scores. A pair score for the column pair may be determined based on a summation of the plurality of weighted scores.

At block 616, column pairs are ranked based on the score generated for each column pair. In some embodiments, the column pairs may be shown with or without the score. Column pairs are presented as a rank of the column pairs based on the score generated for each of the column pairs. Column pairs may be displayed to reflect the relationship based on the score. In at least one embodiment, a higher score may be reflective of a stronger relationship based on the type of join for the predictive model. Each of the column pairs may be ranked based on the score as a suggestion for a possible join of the datasets based on the column pair.

Weights may be adjusted for a predictive model based on the success of the user choosing one of the ranked columns. The weights may be adjusted based on the selection of a column pair relative to the rank. For example, if the rank is useful such that a user selected a column pair having a high rank, then the weights may be maintained as useful because a highest ranking column pair is chosen. If a column pair is selected based on a lower rank, then weights may be adjusted to favor one or more scoring functions to improve ranking of the column pairs closer to the selection.

At block 618, a selection is made for one of the column pairs as a basis for merging or blending the datasets based on the relationship discovered for the selected column pair. The columns of the selected column pair are identified as a pair, or keys, of a relationship between the accessed datasets. Blocks 602-618 may be part of a design-time process during which a relationship between datasets is designed based on relationship discovery.

At block 620, a transform script, or code, for transforming the datasets may be generated. The script may be generated for merging the datasets based on the selected column pair. The script may be executed against datasets from having a similar relationship, such as datasets from the same sources. The transform script may include information identifying the columns of the pair as keys for a relationship. The profile data may be included with the column pair for the relationship identified in the script. A new dataset (e.g., a third dataset) may be generated based on executing the transform script. The new dataset may be generated as a merger of the datasets based on the selected column pair according to the type of join. For example, a third dataset may be generated based on merging, the according to a type of join, a first dataset at a first column within the selected column pair with the second dataset at a second column in the selected column pair.

At block 622, the datasets may be displayed based on the transformation of the datasets. The datasets may be merged, joined, or blended based on the transformation according to the selected column pair. A graphical interface may be generated and displayed to display the dataset.

Blocks 620 and 622 may be part of a run-time process during which data is merged or blended based on the design-time relationship discovery.

In some embodiments, based on identifying a relationship between column pairs, the same relationship may be identified in new datasets from the same data sources. The relationship may be identified for similar datasets, such that the relationship can be recommended again as new data is generated. The transform script may be applied to the new datasets based on the same relationship.

In some embodiments, data discovery may implement learning techniques (e.g., machine learning or user-assisted learning) to identify a pattern, such as certain types of relationships between columns. For example, similar relationships can be identified based on the previous relationships using the predictive model.

In some embodiments, a transform script may be executed periodically to join, or merge the datasets from the data sources. The identification of the relationship can be used to merge or join data as it is obtained from the data sources.

In some embodiments, data enrichment service 302 may provide one or more interfaces (e.g., a graphical interface). In some embodiments, an interface may include a web service interface for specifying profile data for comparison of column pairs as disclosed herein. The web service interface may enable selection of a preferred type of join. Process 600 may be implemented using a predictive model based on a type of join specified by a user. Web service interface may provide a callable interface for communicating with data enrichment service 302.

Figure 6B:
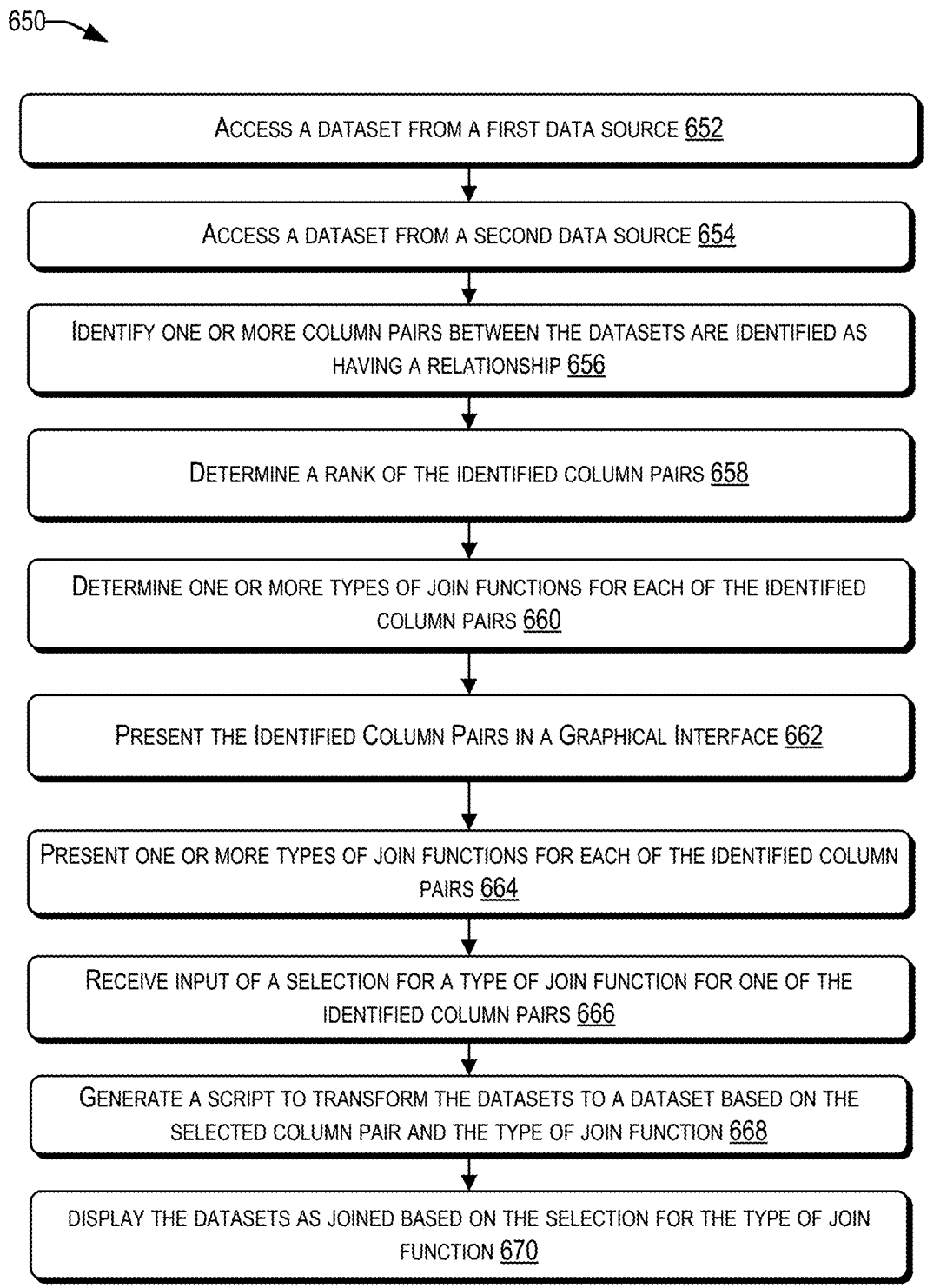
FIG. 6B depicts a flowchart of a process in accordance with an embodiment of the present disclosure.

FIG. 6B depicts a flowchart of a process 650, in accordance with an embodiment of the present disclosure. In some embodiments, process described with reference to FIG. 6B can be implemented by a computing system of a data enrichment service 302. Process 650 may be implemented all or in part of Data Discovery and Joining ("Blending").

At block 652, a dataset (e.g., a first dataset) may be accessed from a data source (e.g., a first data source. At block 654, a different dataset (e.g., a second dataset) may be access from a data source (e.g., a second data source) that is different from the data source accessed at block 652. A dataset may be accessed from a data source using one or more interfaces.

At block 656, pairs of columns, or column pairs are identified between the first dataset and the second dataset as having a potential relationship. The column pairs may be identified by data discovery, such as by part of process 600, such as operations performed by blocks 606, 608, 610, 612, and 614 of FIG. 6A. The profile data matching for the relationship may be identified for the column pair. The identified column pairs may be associated with a rank based on a score generated for each column pair. The profile data associated with the identified column pairs may be retrieved.

At block 658, based on the identified column pairs, a rank of the identified column pairs is determined. For example, the rank may be determined based on techniques disclosed with reference to FIG. 6A. The rank may be based on a highest score for each column pair. Column pairs may be ranked in an order based on each of their scores.

At block 660, one or more types of join functions may be determined for each of the identified column pairs. Types of join functions, may include without restriction, a left join, a right join, an outer join, rows matching datasets (e.g., an inner join), or other types of joins. The type of join function may be determined based on the relationship between datasets. Some of the types of join functions may not be possible for certain types of relationships. Due to the columns that match, possible join functions may be identified. The data in each of the datasets corresponding to a column pair may be processed to determine where the relationship exists. As described below, one or more graphical interfaces may be provided to enable selection of possible joins based on the relationship between columns in a column pair.

At block 662, the identified column pairs may be presented in a graphical interface according to the order determined for the rank of each of the identified column pairs. A graphical interface may be generated to display the identified column pairs based on the rank. The identified column pairs may be displayed as suggestions. Profile data, such as a column name, may be displayed with the identified column pairs for each dataset corresponding to the column pairs. In some embodiments, the identified column pairs may be generated as a graphical visual representation that is displayed in an existing graphical interface. The graphical interface and/or the visual representation may be sent to a client for display. Each of the identified column pairs may be presented with or as one or more an interactive elements, that are interactive to choose the identified column pair for joining, or blending. At least one embodiment, column pairs are shown as "blending key recommendations" in a graphical interface.

At block 664, one or more types of join functions ("output options") are presented in the graphical interface. Each of the types of join functions may be based on the type of join functions determined for each of the identified column pairs. Similar to block 612, the types of join functions may be generated in a graphical interface or as a visual representation that is presented in an existing graphical interface. The types of join functions may be presented in the graphical interface as one or more interactive elements. In some embodiments, one or more types of join functions may be presented based on the identified column pairs that are selected. If more than one column pair is selected, then the types of join functions may be those which can be performed for the selected column pairs. Examples of presentation of types of join functions is shown as "Output Options" in a graphical interface.

In some embodiments, each of the types of join functions may be displayed with a visual diagram ("Glenn Diagram") showing how the datasets compared for joining or blending would visually appear for the type of join function if selected for the column pair. The visual diagram may be presented to have an appearance (e.g., style, format, color, or animation). The visual diagram may show how to datasets can be joined such that they do not overlap, but are merged. The visual diagram may include an example of data that is joinable for the type of join based on the relationship for the identified column pair. In some embodiments, the visual diagram may show the type of join between two datasets based on multiple relationships of the column pairs selected.

At block 666, a selection is received for a type of join function for one of the column pairs as a basis for merging or blending the datasets based on the relationship discovered for the selected column pair.

At block 668, a transform script, or code, for transforming the datasets may be generated. The script may be generated for merging the datasets based on the selected column pair and the type of join. The script may be executed against datasets from having a similar relationship, such as datasets from the same sources. The transform script may include information identifying the columns of the pair as keys for a relationship. The profile data may be included with the column pair for the relationship identified in the script. A new dataset (e.g., a third dataset) may be generated based on executing the transform script. The new dataset may be generated as a merger of the datasets based on the selected column pair. The new dataset may be generated based on applying the type of join function using the first dataset and the second dataset.

At block 670, the datasets may be displayed based on the transformation of the datasets. The datasets may be merged, joined, or blended based on the transformation according to the selected column pair and the type of join. Blocks 620 and 622 may be part of a run-time process during which data is merged or blended based on the design-time relationship discovery. The datasets may be displayed to show the type of join for the selected column pairs. The datasets may be displayed with a visualization ("Glenn Diagram") that further highlights the type of join for the selected column. The visualization may be presented as a Glenn Diagram highlighting the portion of the datasets in where a join is performed for the type of join.

In some embodiments, a visual representation may be generated to show a sample result of a join based on the selected column pairs and the type of join function. The visual representation may be generated for display as part of a graphical interface. The visual representation may include a Glenn Diagram showing the type of join for the sample result.

Figure 7:
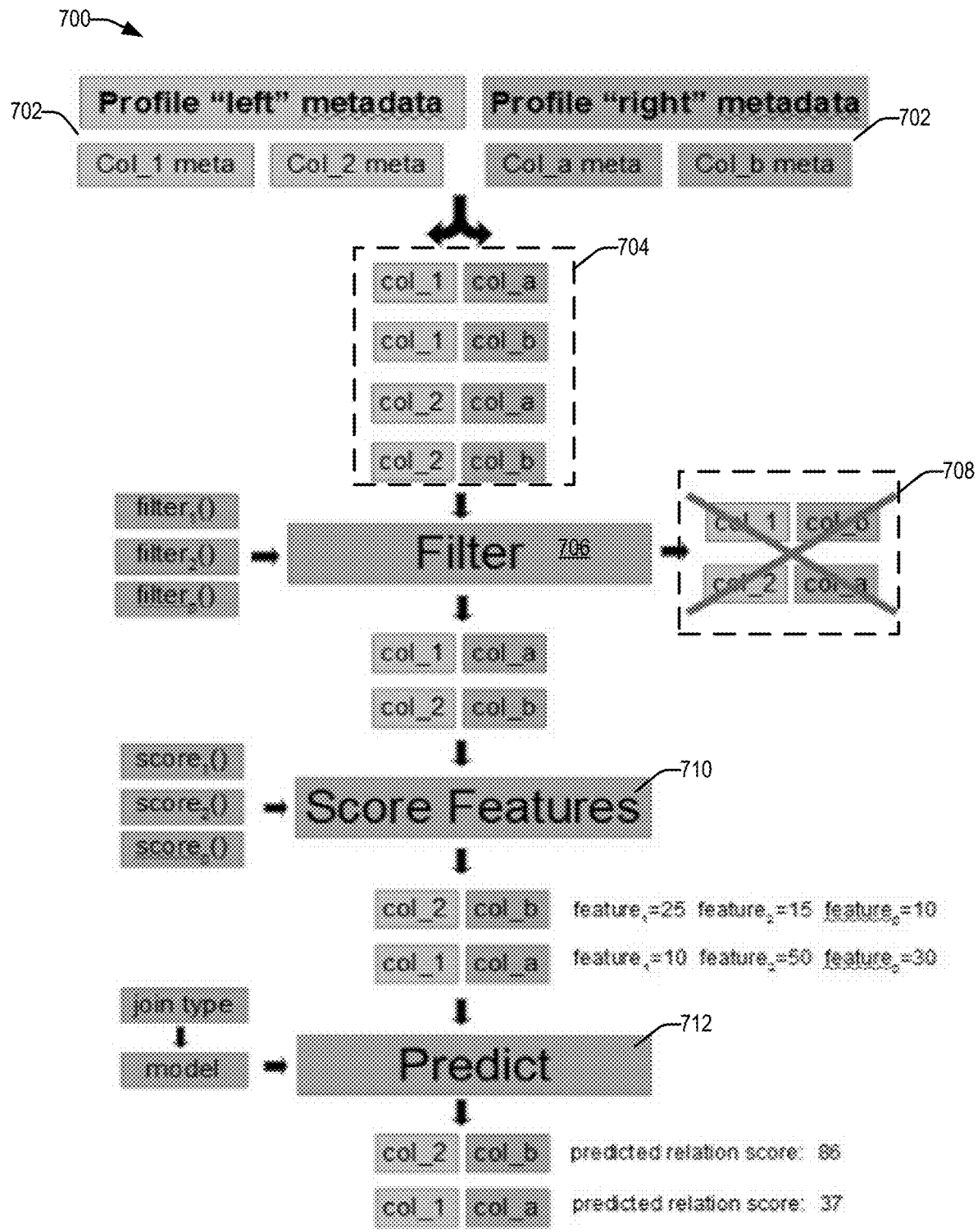
FIG. 7 depicts a block diagram of a process for data discovery according to some embodiments.

FIG. 7 illustrates a block diagram 700 of a process for data discovery according to some embodiments. Specifically, all or some blocks of diagram 700 may be implemented by blocks described with reference to FIGS. 6A and 6B.

At block 702, for the datasets to be compared for relationship discovery, profile data about each column in the first dataset and each column in the second dataset are determined. The profile data may be generated by data enrichment service 302 by techniques disclosed herein for profiling. The profile data may include metadata. The metadata may be pre-profiled on a data set before implementing the process of FIG. 7. For example, profile data may be determined as disclosed with reference to block 606 of FIG. 6A.

At block 704, one or more pairs of columns, or column pairs, are identified for comparison between the first dataset and the second dataset. A column pair is identified for each distinct column in the first dataset and each distinct column in the second dataset (e.g., (col_1, col_a), (col_1, col_b), (col_2, col_a), and (col_2, col_b)). All possible pairs of columns are identified between the first and the second datasets. A column pair may include one distinct column from the first dataset and one distinct column from the second dataset. The profile data for each column is identified for the column in each column pair.

At block 706, one or more column pairs are filtered to be excluded as being unlikely to have a relationship ("unpromising") between columns in the column pair. For example, block 708 is shown including column pairs that are filtered as unpromising. Techniques for filtering may include those described with reference to FIG. 6A. Column pairs may be filtered based on a threshold by which a column pair is identified as being unlikely to have a relationship between columns in the column pair. Column pairs may be filtered using the profile data. A column pair is excluded based on determining that no join can be performed between the columns in the column pair. The profile data may be used to make such a determination that there is no data overlap, or possibility of a join between columns in a column pair.

In at least one embodiment, filtering 706 of column pairs may be implemented using any number of techniques, including, without limitation, "byCategoryMatch," "byCompleteExampleSetOverlap," "byTextLengthRange," "byNumericalRange," "byCourseTypeMatch," or a combination thereof. The number of possible column pairs (where n is a measure of the number of columns in a data set) is $n^2$, so leveraging pre-profiled metadata, pairs can be filtered out as unequivocally not having data overlap. Each filter function ideally successively whittles down the candidate pair set. Column pairs that clearly overlap and/or pairs which potential overlap cannot be ruled out. In other words, filtering has guaranteed the remaining pairs meet some necessary conditions for a join, but these conditions may not be sufficient. The filtering can reduce a large number of column pairs for the identified column pairs. The filtering may utilize the profile metadata for filtering without using the actual data underlying the columns in the column pairs that are compared. The filtering, thereby, reduces the processing of a computer system to identify a relationship between columns in any column pair for large datasets. Specifically, processing is reduced by minimizing the amount of data to access and compare by filtering using the profile data for each column instead of the data of the column itself.

Filtering by category match may be implemented using profile data to determine one or more semantic categories or attributes (e.g. city, first name, phone number, address, etc). Based on semantic categories defined in the profile data, mismatches based on formatting of the name of a category or attribute, may be avoided. Not every column may be predicted as a semantic category.

Filtering by complete example set overlap may be implemented by using profile data to for each column. A set of example "character sequence patterns" of the column data AND the population percentages each example character sequence represents. Numerical patterns are represented with the character '9' and alphabetic patterns use the 'A'. For example, four-digit currency values might have a character sequence of 9999.99, a phone number might have 999-999-9999, and an email address might be AAAAA@AAAAAAAA.AAA. When these metadata example character sequences represent 100% of the column pair populations, these character sequence "shape summaries" are compared for overlap. Pairs with no character sequence overlap are filtered out.

Filtering by text length range may be implemented by for each column. A "top-N" histogram of the most frequently appearing values and their percentage(s) of the overall population are extracted from the profile data. When columns contain relatively few unique values, this histogram can characterize 100% of the column population. When the example values do represent 100% of the column population, this filter removes pairs without any population overlap whatsoever.

Filtering by numerical range may be implemented by classifying a column as numerical data. Profile data for each column, including statistics generated by profiling each column, among other measures, contains min and max values. This filter removes pairs with no numerical overlap whatsoever.

Filtering by coarse type match may be implemented by for each column by classifying the column data into a familiar database schema data type. Using statistical methods, the profiler predicts/classifies column coarse database types based on potentially noisy column data. This noisy database type classification is used to quickly filter out column pairs that classified as different database schema data types.

At block 710, a score is generated for each column pair based on filtering. The score may be generated using an inference prediction model. The model may be generated to "infer", from profile metadata, which pairs might have more favorable metadata features for a join. The prediction model is based on selected proprietary metadata dimensions. For each column pair, the profile data for the columns in the column pair are compared. The profile data is extracted for comparison of features in the profile data for the column pair according to a predictive model. The model may be selected based on analysis of the column pairs. The model can be selected based on a type of join specified by a user, such as through a graphical interface. In at least one embodiment, multiple models may be generated for prediction based on join operations including left outer join, right outer join, and inner join. The predictive model is applied for a specific join type to predict pair relationship rank.

As a part of applying the model, one or more scores is determined for each comparison. Each score may be generated based on one or more scoring functions. Scoring functions are the independent variables in the predictive model which predict the dependent variable. The dependent variable is the prediction of how related, or "joinable" the columns might be to the user. Each scoring function may be based on a feature or classification for a comparison type of columns. A score may be generated for each scoring function as a feature of the column pair. Examples of features include, without restriction or limitation by order, "byColumnType," "byValueUniquenessLeft," "byValueUniquenessRight," "byExampleCharacterSequences," "byExampleValues," "byUniqueExampleOverlap," "byHeaderNameMatch," "byHistograms," or a combination thereof.

Each score may be weighted based on a weight defined by a model for the comparison. A column pairs final score is based on a combination (e.g., a summation) of the weighted score for each scoring function. For a given join type (e.g. left outer), a model contains a set of scoring functions & weights. The total weights for all scoring function may not exceed 1.0. Multiple models may be defined including an inner join model, a left outer join model, and a right outer join model. Each model may be defined by one or more scoring functions, each assigned a different weight, the total not exceeding 1.0. Each scoring function output is multiplied by its weight. The column pair's final score is the sum of these weighted scores. Each column pair's "relatedness" prediction is scored this way. This prediction provides the rank shown to the user. Table 1 below shows an example of scoring for a column pair (using the inner join model's scoring functions & weights).

TABLE 1

| scoring function | score | weights (must sum to 1.0) | Weighted score (scaled 0-100) | pair score |
| --- | --- | --- | --- | --- |
| byHeaderNameMatch | 0.98 | 0.20 | 20 | |
| byColumnType | 0.67 | 0.20 | 13 | |
| byValueUniquenessLeft | 1.00 | 0.12 | 12 | |
| byValueUniquenessRight | 0.29 | 0.12 | 3 | |
| byHistogram | 0.71 | 0.18 | 13 | |
| byExampleCharacterSequences | 0.81 | 0.06 | 5 | |
| byExampleValues | 0.23 | 0.06 | 1 | |
| byUniqueExampleSetOverlap | 0.36 | 0.06 | 2 | 69 |

In Table 1 above, the above models' weights and selected predictors is just an example. The implementation actually has three different models to predict under three different desired join operations: left outer, right outer, and inner. When the customer intends a left outer join and requests our join column predictions, the left outer model will favor unique values in the left columns of the pairs. A customers' right outer join request will favor predictions with more unique values on the right. The inner join predictive model favors unique values equally in both columns of the candidate column pair.

Examples of features for scoring functions include, without restriction or limitation by order, "byColumnType," "byValueUniquenessLeft," "byValueUniquenessRight," "byExampleCharacterSequences," "byExampleValues," "byUniqueExampleOverlap," "byHeaderNameMatch," "byHistograms," or a combination thereof.

ByColumnType leverages the profiler's proprietary three-level custom type classifications. The first BASE level includes very basic types (integer, decimal, date, text, etc). The second TYPE level is more specific (int, long, char, etc.). The third SUBTYPE level is more specific still (bool, gender, zero). Further, the subtypes may be augmented in several ways based on specific data distribution (important if the data is all unique for discovery to recommend as a join key useful join key). As a column pair potentially matches each progressive level of this three-level hierarchy, this scoring function incrementally adds more to the score. E.g. matching on BASE start with a score of 0.33, then matching on TYPE adds 0.33 to the score, and finally, matching on SUBTYPE add 0.34 for a total possible score of 1.0. ByUniquenessLeft is a measure of the number of unique values as a percentage of the population. This favors unique potential join keys over lower cardinality columns containing something like gender which is not very unique over the population (e.g. "male" and "female" is less desirable as a predicted join key compared to a column containing many unique SSNs). ByUniquenessRight is a measure that is similar to left uniqueness. (These uniqueness measures are also important in the join-type-specific aspect of the model). ByExampleCharacterSequences is a measure that evaluates the overlap of the profilers' row data character sequence "shapes". In filtering, we described profiler metadata character sequences summary of the "shape" of the column values. Consider one column containing colors and another containing email addresses. The color metadata character sequences might be AAA, AAAA, AAAAA, etc. and the email addresses will all contain some variation of AAA@AAAAA. Although both columns contain string typed data, the character sequences clearly indicate these columns shouldn't be recommended for a join. This will also catch potential overlap of string length, number "length" in addition to the pattern similarities/differences.

ByExampleValues is a measure that compares the two sets of example data and their populations to predict a degree of example value overlap. Specifically, if two example values match between the sets of example values, the smaller (minimum) of the two population fractions is selected. This measure is the sum of these (any) minimum overlapping population fractions. The profile data provides a "top-n" population histogram of the column row values and their population percentages (this is separate from the more traditional histogram also output for numerical data).

ByUniqueExampleOverlap is based on profile metadata, which provides a column's "top k" list of most frequent values and their population percentages. In other words, a column with all unique values has example values that represent very low percentages of the population. A "gender" column might only have example values of "male" and "female" and both together represent 100% of the population. So, the examples may be a full representation or not depending on column value uniqueness. This coring function includes getting a percentage of left population that's unique, determining the example values on the right that match example values on the left, determining a summation of the population fractions of said matching values on the right. (This produces the percentage of the right's example population that that matches example values from the left. Aka "example right overlap"). For example, the scoring function may be score=leftPopulationUniquePct* ((leftPopulationUniquePct*rightUniqOverlapPct)/rightPopulation). This favors more unique values on left and higher overlap on right (a more common join use case compared to other joins). Uniqness on left is favored more to penalize "low cardinality" like gender or state. Higher right overlaps is favored more because human preference feedback suggests it's "better" (more useful).

ByHeaderNameMatch is based on determining a string edit distance using one or more algorithms. For example, a Jaro-Winkler edit distance may be used. The algorithm may be implemented using one or more programming interfaces.

ByHistogram uses numerical data extracted from profile data based on histogram summaries of column populations. Histograms pairs are compared to produce a feature score. Given that a histogram is defined by a contiguous set of equal-length intervals and a non-negative real number for each interval, then most of the literature for comparing two histograms seems to start with the assumption that the two have an equal number of intervals of equal length. In our case this is only half true; the Profiler does a fixed number of intervals (or bins, currently 20), but the intervals may start and end at different places. A comparison of incongruent histograms is performed by creating a histogram with the same intervals as the histogram with wider intervals, and mapping the proportions of the narrower histogram's intervals' populations into it. This allows an "apples-to-apples" comparison as in the literature, but is asymmetrical. There are other considerations when doing joins. The left and right histograms may differ in these characteristics: Relative overall populations, Range overlap, Population overlap in the range overlap, and Mapping left to right vs. right to left. These four variables may affect how we want to weight the apples-to-apples histogram similarity, but are not currently being used. Note that searching for "comparing histograms" leads one to "histogram similarity" measures, but there is a semantic distinction between "comparing" and "similarity" for our purposes. Since we are doing inner, left outer, and right outer joins, we may want scores relative to these operations, and not just a generic symmetric similarity measure. The histogram score is determined using the Chi-square statistic. To get cross-bin comparison, using the Quadratic-Chi Histogram Distance. The problem is to generate a "bin-similarity matrix" A satisfying the condition that A is a "non-negative symmetric bounded matrix such that each diagonal element is bigger or equal to every other element in its row." Here is a possible solution for histograms P and Q with n bins. Define a_ij to be 1 for i !=j, else $1/(2*|i-j|)$. This ignores any particulars about P and Q. "2" could be anything >=1, and the absolute value could be raised to a power, say 0.5. This may emphasize correlation with nearer bins.

FIGS. 8-22 illustrates some embodiments of interfaces and/or visual representations for techniques related to data discovery, including those performed by data discovery in a data enrichment service. Each of the graphical interfaces and/or visual representations disclosed herein may be generated by any of the systems disclosed herein. In some embodiments, data enrichment service 302 may generate a graphical interface and/or visual representation, which is then sent to a device, e.g., a client device, to be rendered in an application for a service provided by data enrichment service 302.

Figure 8:
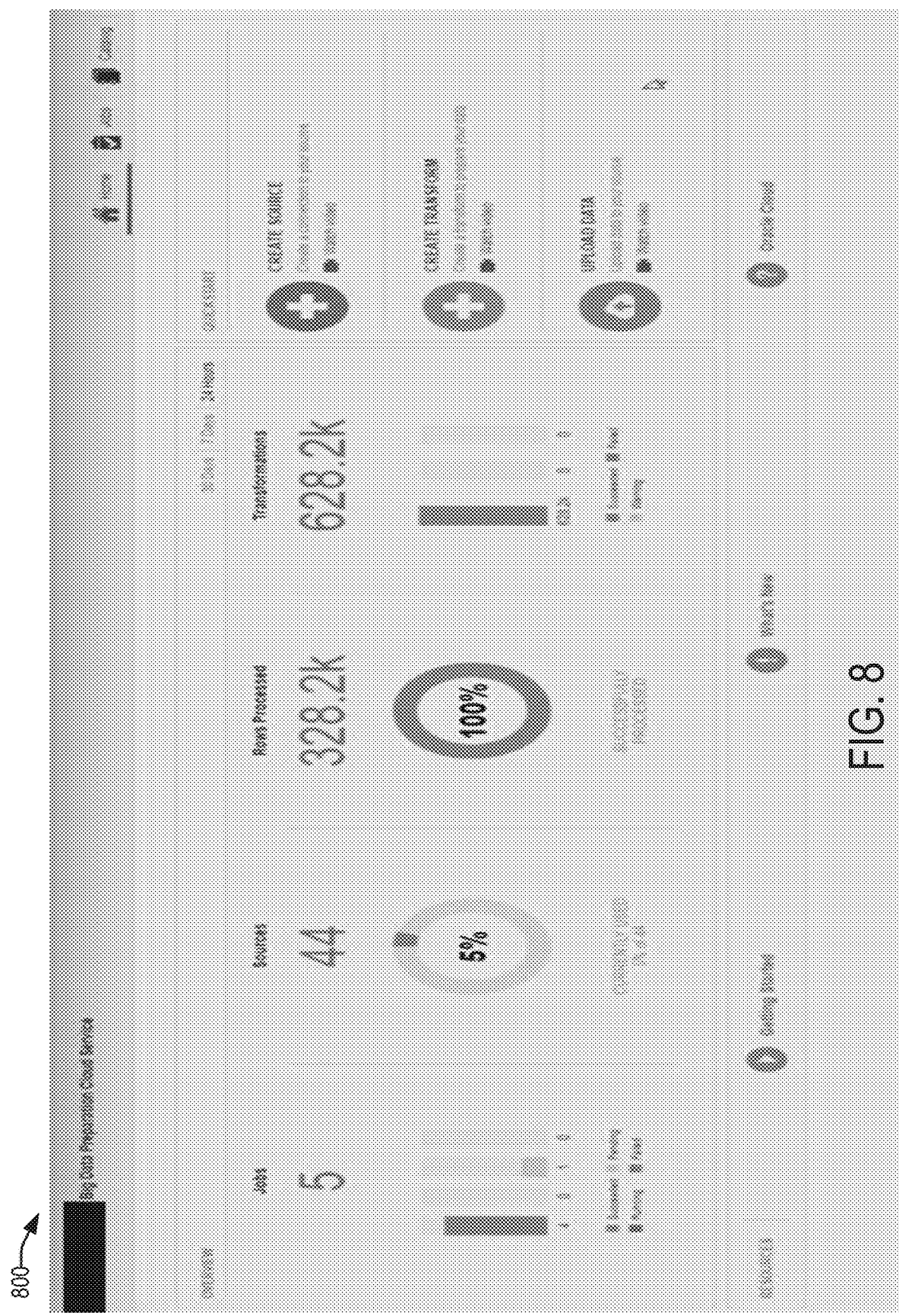
FIGS. 8-22 depicts graphical interfaces for data discovery according to some embodiments.
Figure 9:
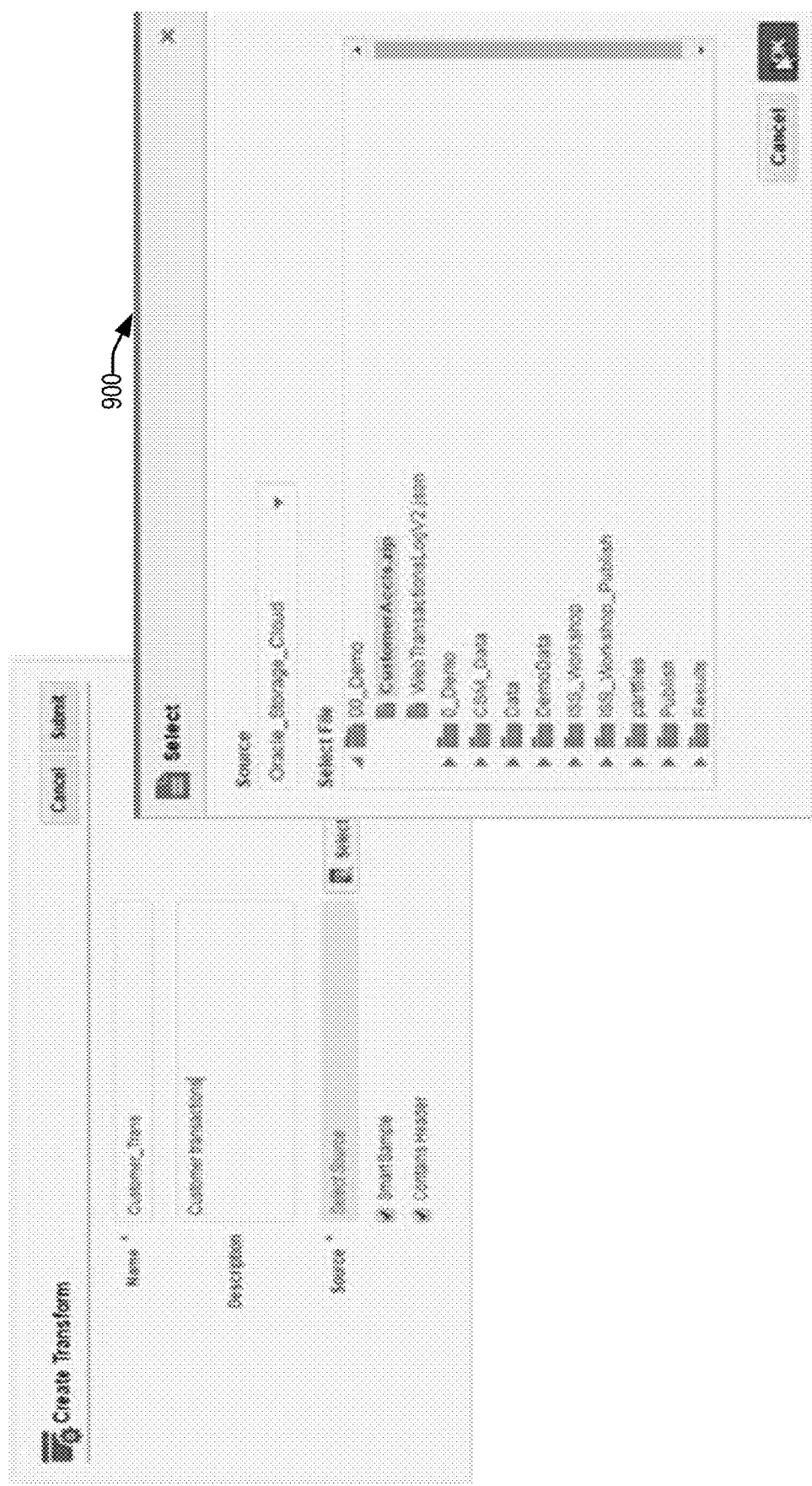

FIG. 8 is an example of a graphical interface 800 presented in an application for accessing a data preparation service of a computer system. This graphical interface illustrates functions for initiating a data discovery service to determine a relationship between datasets for blending datasets. FIG. 9 illustrates a graphical interface 900 for creating a transform (e.g., a transform script) to modify or generate data. The graphical interface may receive input to configure a source for which a transform is to be applied. The transform may be configured to blend data based on relationship discovery.

Figure 10:
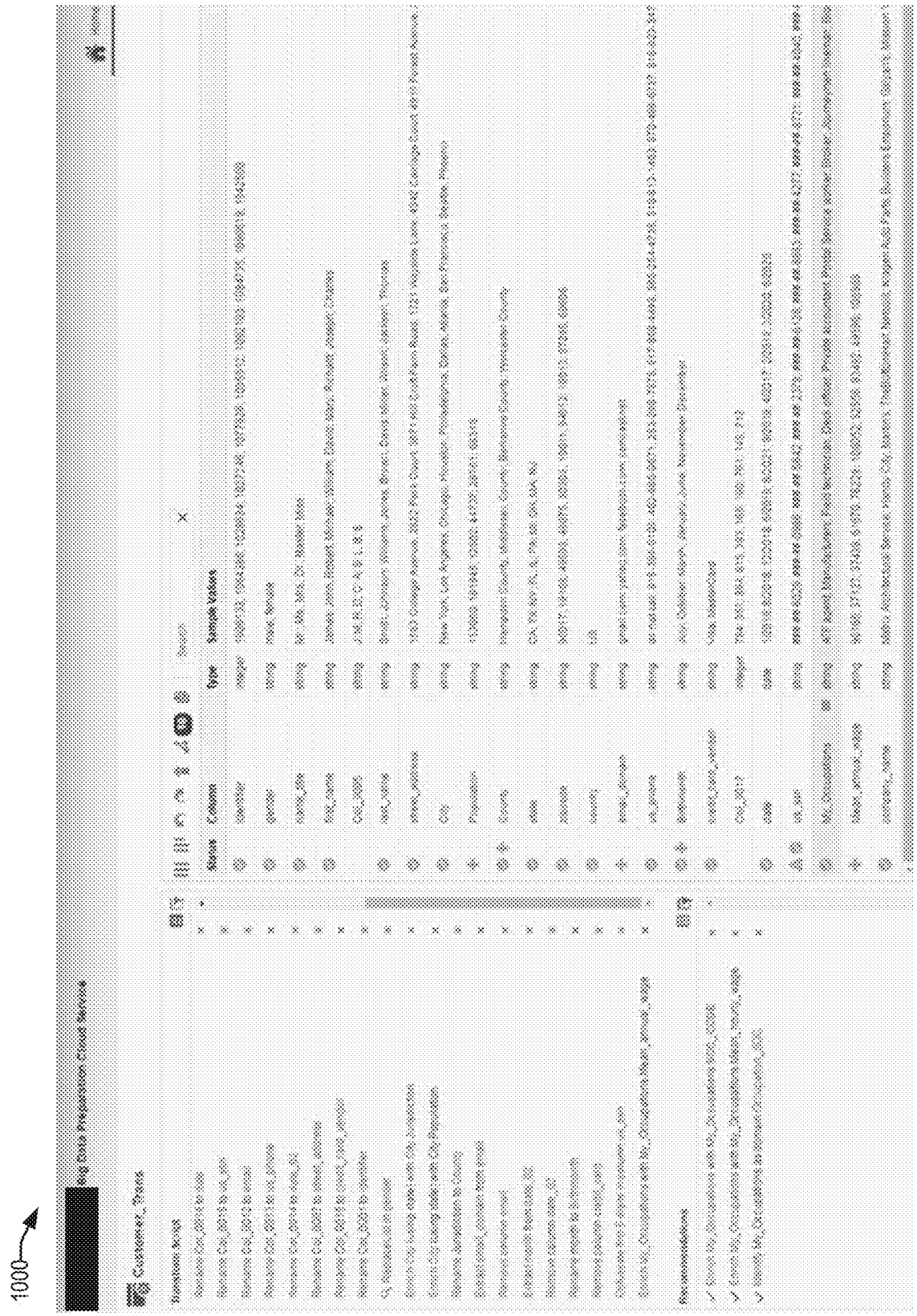
Figure 11:
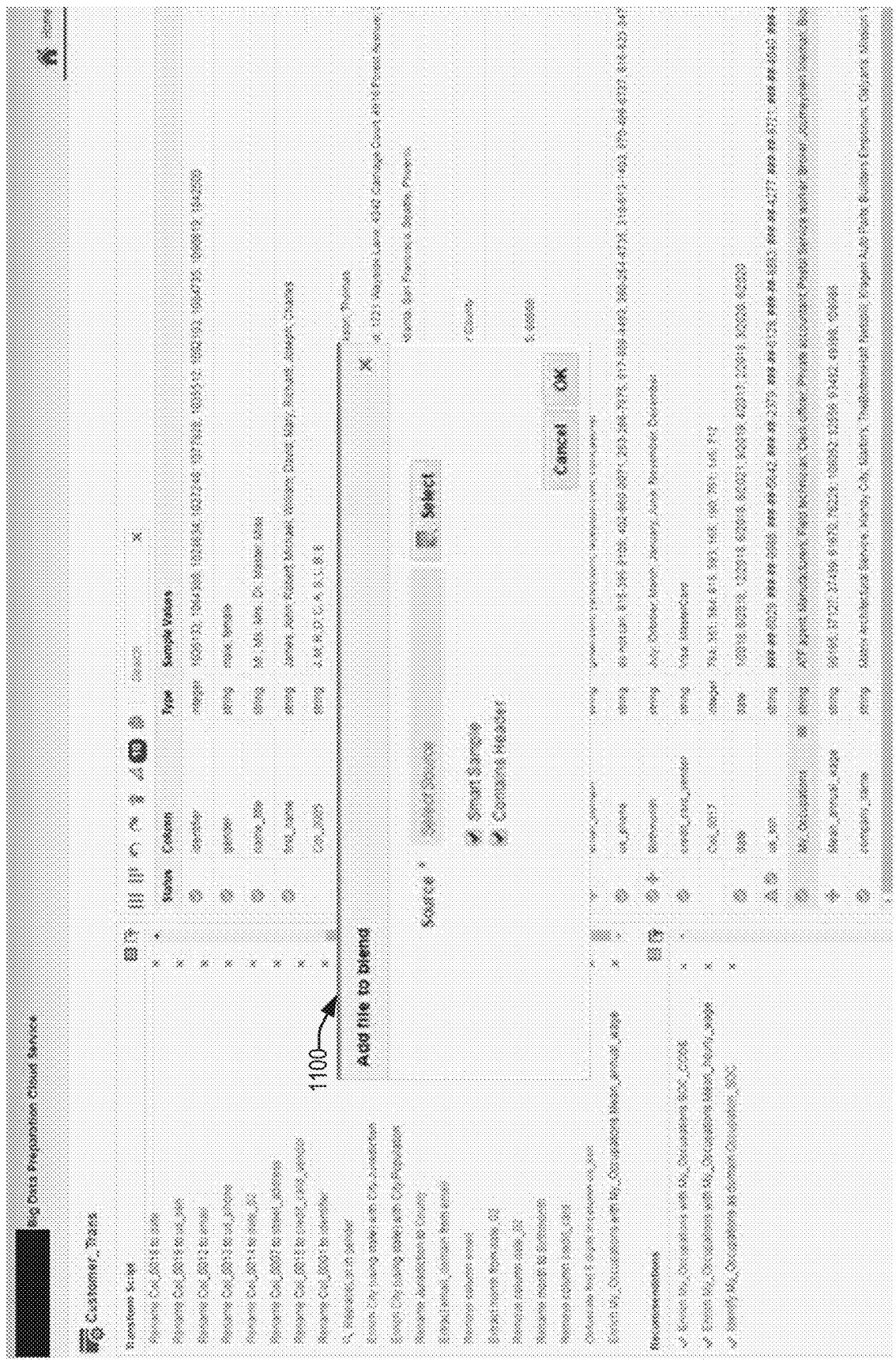
Figure 12:
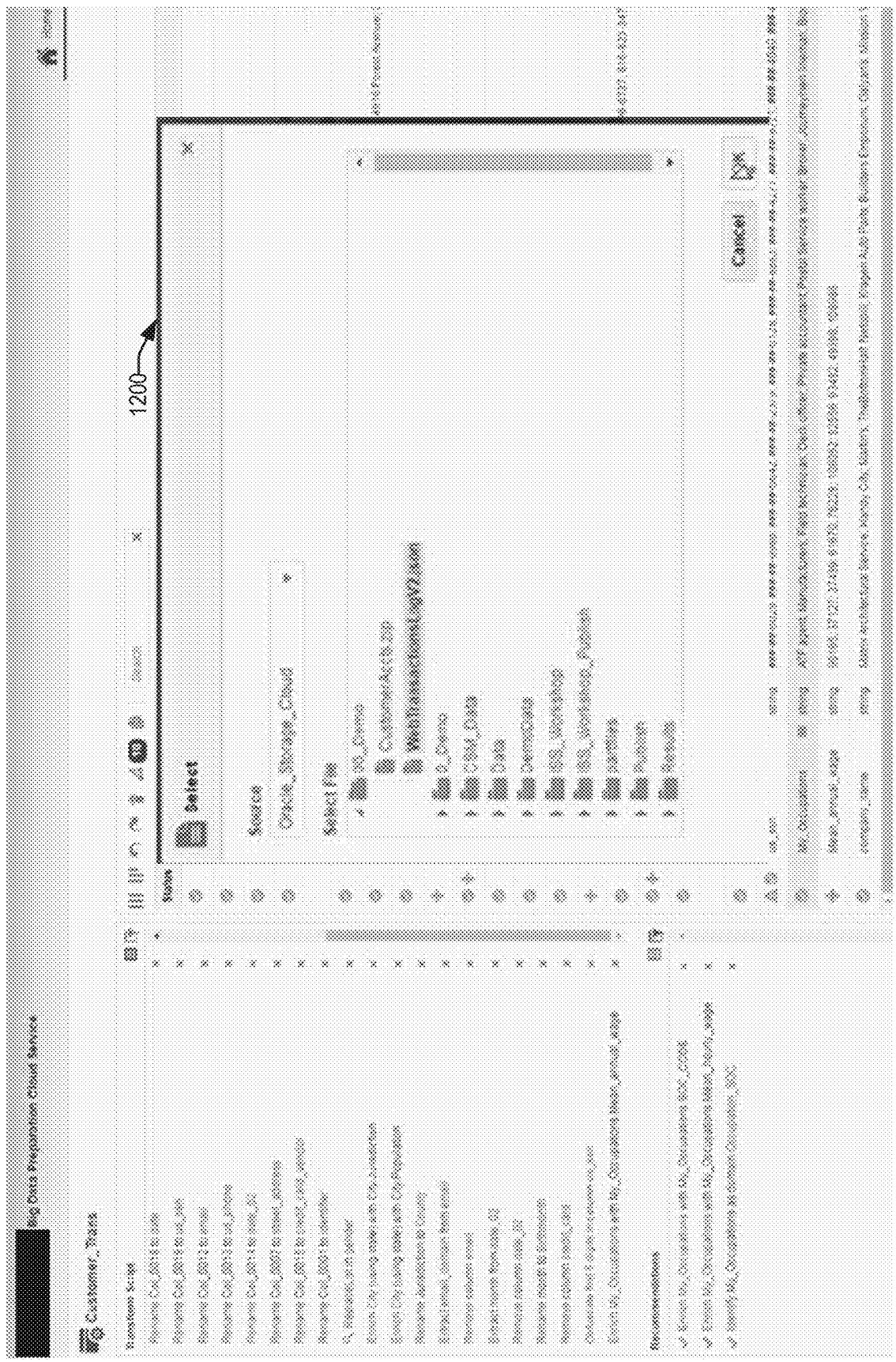

FIG. 10 illustrates an example of a graphical interface 1000 for a data preparation service. Through the graphical interface 1000, input may be received to "Add File" for consideration for data discovery. A dataset (e.g., a file) may be added for data discovery to compare to one or more datasets from a data source. Interaction with "Add File", an interactive element, may cause one or more graphical interfaces to be displayed. FIG. 11 is an example of a graphical interface 1100 displayed upon interaction with "Add File." This graphical interface may be presented for specifying a source to provide a dataset to blend with one or more other datasets. Graphical interface 1100 may be displayed based on interaction with graphical interface 1000. FIG. 12 is an example of a graphical interface 1200 displayed upon interaction with the graphical interface 1100. Graphical interface 1200 may be interactive to enable selection of a file from one or more file systems, including a cloud-based storage system.

Figure 13:
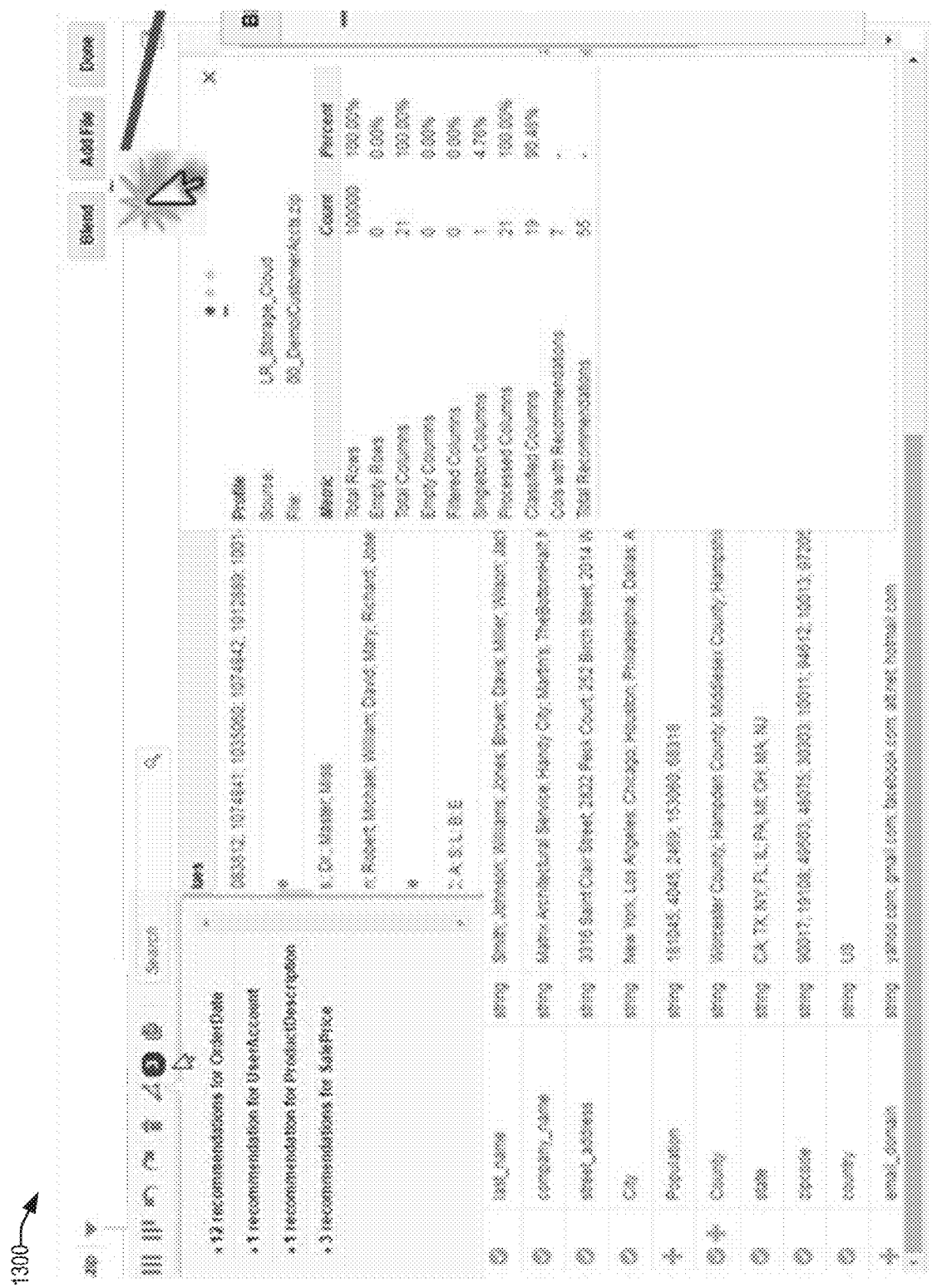
Figure 14:
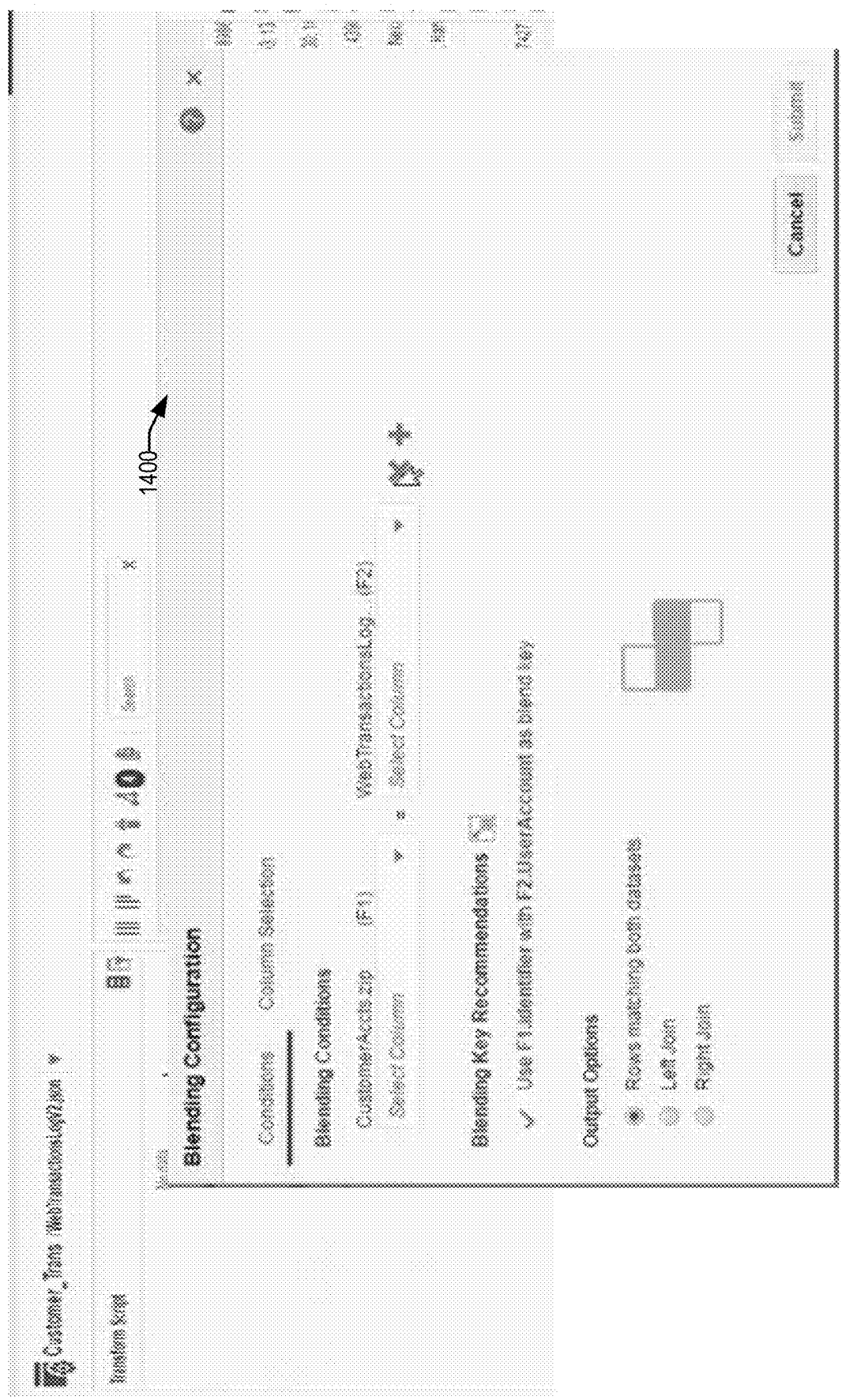

FIG. 13 illustrates an example of a graphical interface 1300 showing a status of one or more transforms that are performed on one or more datasets. The graphical interface 1300 may provide other functions for a service to enrich and view datasets. A user may interact with a column in the dataset, such as a column for "country" for which data discovery is desired for a blend. Graphical interface 1300 may provide one or more views that include recommendations for possible columns to blend between datasets. Recommendations are described further below with reference to FIG. 14. Graphical interface 1300 may include an element that is interactive to initiate a service to blend data sets. FIG. 14 is an example of a graphical interface 1400 configure datasets to compare for data discovery. Graphical interface 1400 may be displayed based on interaction with graphical interface 1300 to request to blend datasets.

Graphical interface 1400 may be interactive to enable selection of a column in each of two datasets to be blending. The selected columns may be the basis of the blend. In at least one embodiment, graphical interface 1400 may be interactive to select a column from each dataset from a list of columns in each dataset. Graphical interface 1400 may display one or more recommendations for blending datasets based on processes described with reference to FIGS. 6A, 6B, and 7. Specifically, graphical interface 1400 may display one or more recommendations based on prediction of a best match of columns between the datasets for blending. The datasets may be compared to determine possible recommendations for joining, or blending, the datasets. The prediction may be based on a score computed according to processes in FIG. 6A. The blend key recommendations may correspond to the columns to blend based on the prediction using the score. The recommendations may change based on the desired type of join function. Graphical interface 1400 may be interactive to enable a user to provide input to specify one or more types of joins (e.g., a left join or a right join). The blend key recommendations may include multiple recommendations based on the score computed for each recommendation.

Figure 15:
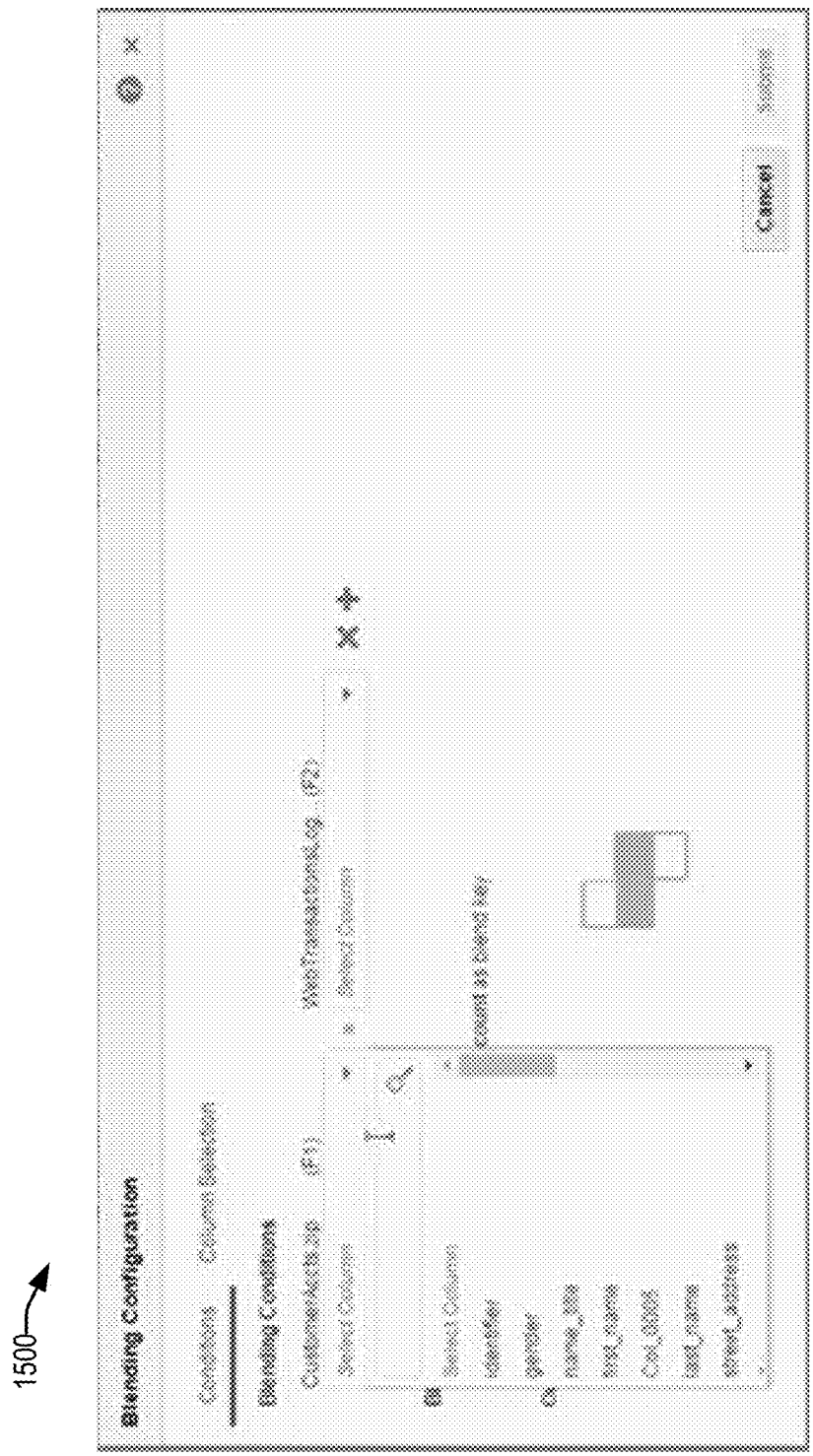
Figure 16:
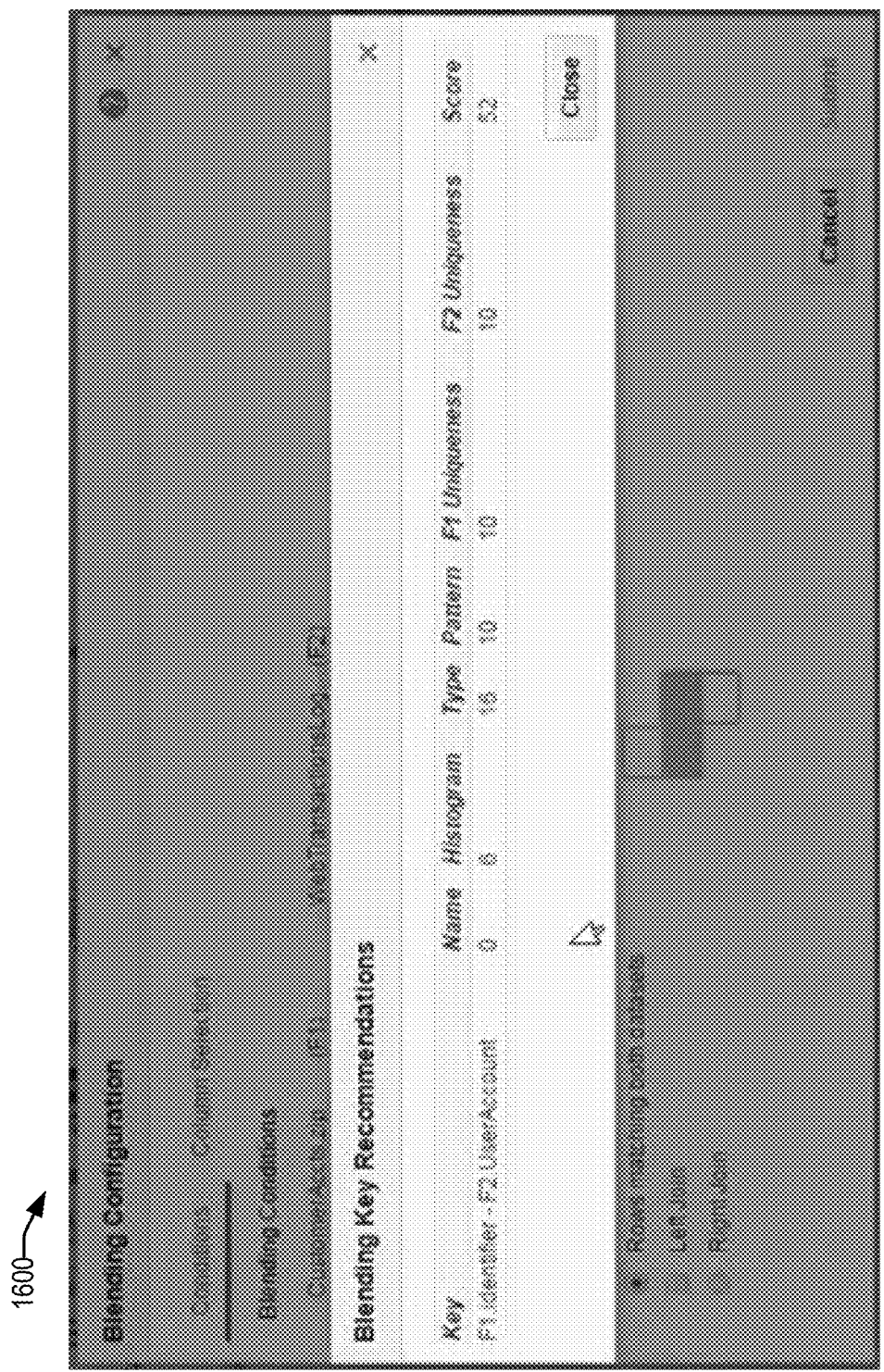

Graphical interface 1400 may be implemented based on techniques for data discovery, such as data relationship discovery between two data sets, a first dataset ("F1") and a second dataset ("F2"). The graphical interface may be interactive to specify a dataset, such as either of F1 or F2. The datasets can be accessed from different data sources or the same data source. The data source may be previously specified. The graphical interface may enable a user to specify a specific column in each of F1 and F2 to perform data discovery, to determine a relationship and/or similarity of data sets. Graphical interface 1400 an example of an interactive element for specifying a column in each of data sources F1 and F2. Graphical interface 1400 can be presented with one or more "blend key recommendations," each of which may correspond to a column in each of F1 and F2 that have a relationship with each other as determined by data discovery. The graphical interface may present one or more recommendations, each of which may be interactive to select the recommendations. Interaction with a recommendation in graphical interface 1400 may cause the graphical interface in FIG. 16 to be displayed with information about a relationship or similarity between datasets with respect to a column pair that is compared. The information may indicate statistics or measures based on techniques for data discovery disclosed herein. Such information may include measures (e.g., scores) used to determine a relationship between the columns compared for the recommendation. FIG. 15 illustrates graphical interface 1400 based on interaction with an element of selecting a column for one of the datasets. Each element may for each dataset may be interactive to display an element that provides the columns for the dataset.

Figure 17:
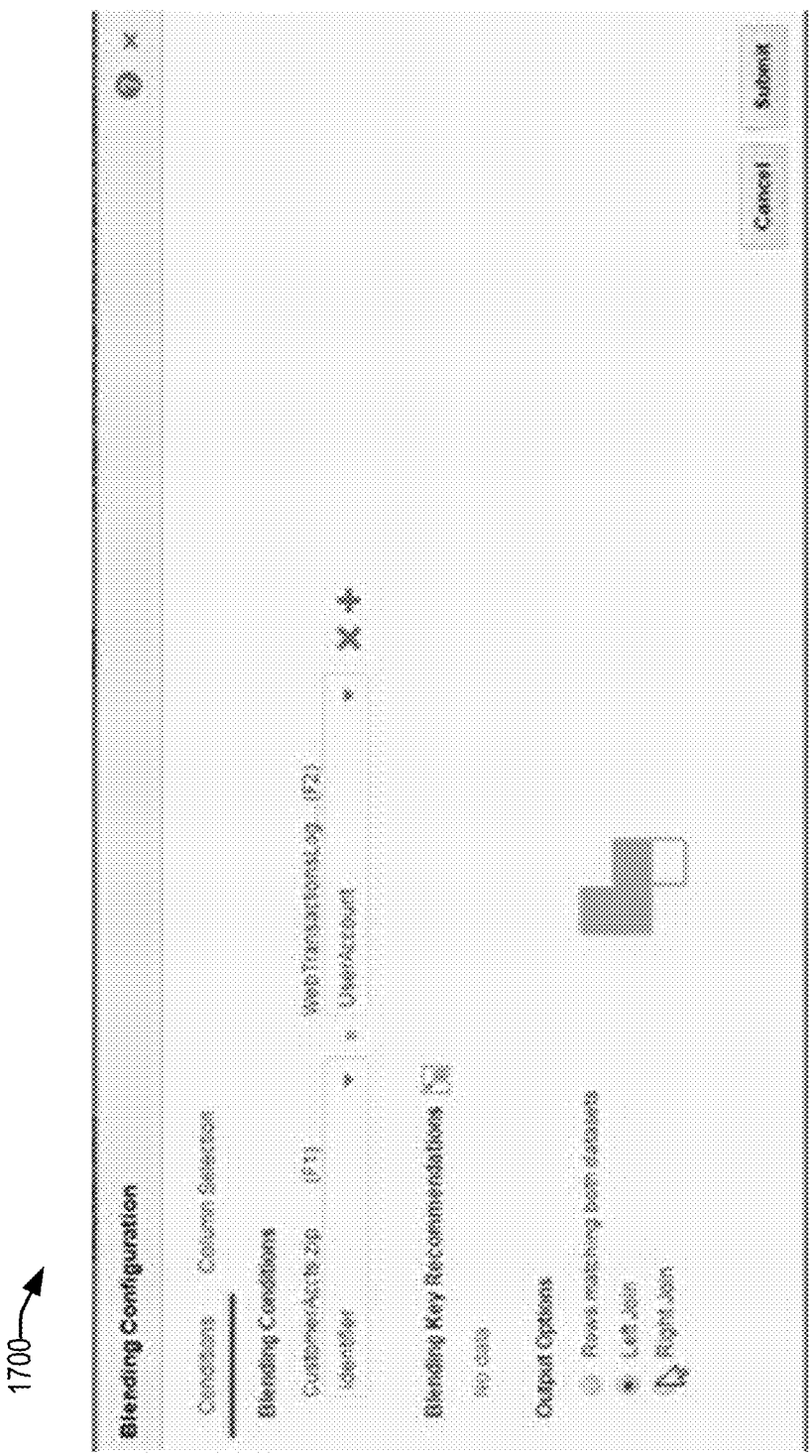
Figure 18:
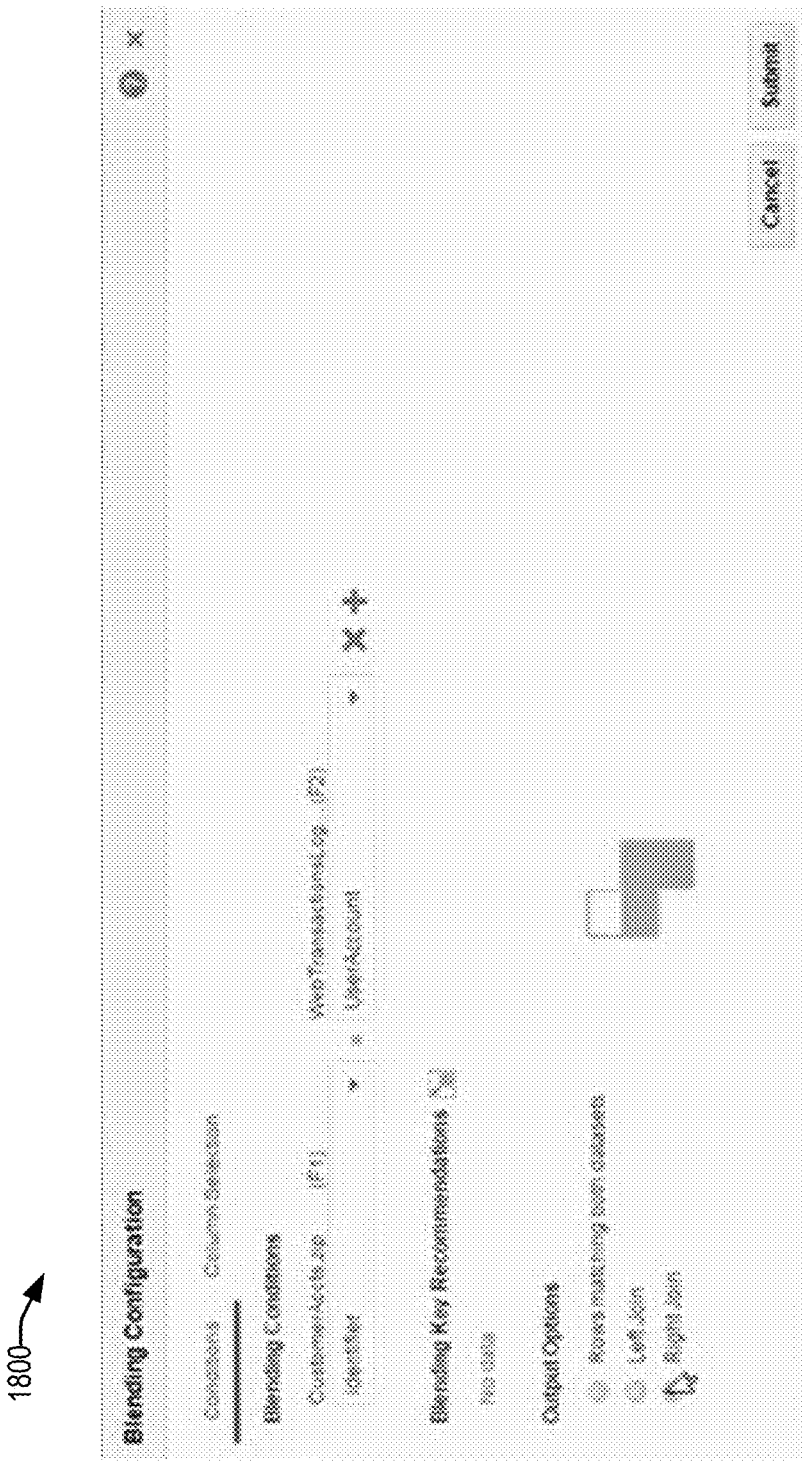
Figure 19:
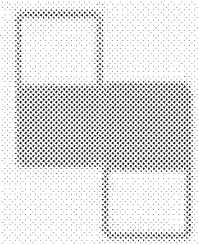
Figure 19:
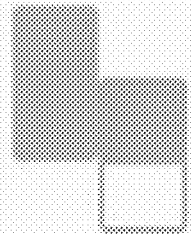
Figure 19:
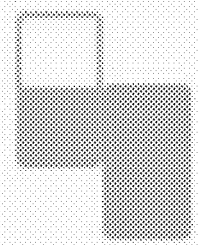

In each of the FIGS. 14, 17, and 18, graphical interfaces are shown of "Output Options" illustrating "Glenn Diagrams." The Output Options may be shown with one or more interactive elements for one or more options, each relating to possible types of join functions that can be performed on a chosen recommendation. The Glenn Diagrams may be shown with an appearance to indicate a type of join function. If more than one recommendation key is chosen, the type of join functions may be limited to those possible for the selected recommendations. Each of the types of join functions may be shown with a Glenn Diagram providing a visual representation of how the datasets may be joined for the type of join function with respect to the column relationship indicated by the "blend key recommendation." For example, graphical interface 1700 of FIG. 17 illustrates an Output Option for "left join" of the datasets specified in graphical interface 1400. Graphical interface 1800 illustrates an Output Option for "right join" of the datasets specified in graphical interface 1400. Graphical interface 1900 in FIG. 19 shows examples of multiple different types of Output Options, or "Glenn Diagrams," for selecting a join, or blending of datasets.

Figure 20:
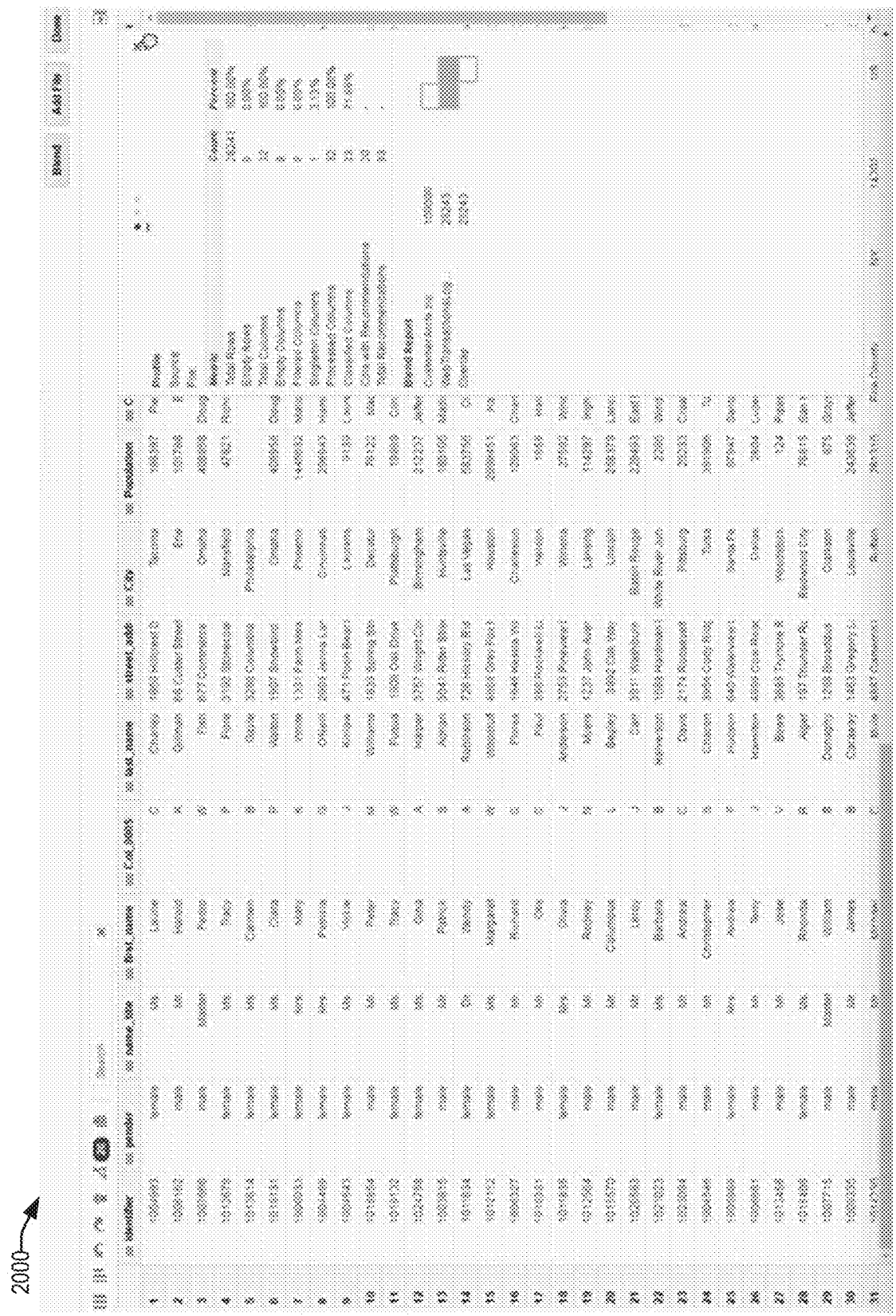

Interaction with the graphical interface 1400 in FIG. 14 may initiate a blend process to blend datasets based on the columns selected according to the Output Option. The blend may be performed according to a recommendation selected. FIG. 20 illustrates a graphical interface 2000 that shows a result of a blend, such as with columns that have been blended from two datasets selected in graphical interface 1400. Graphical interface 2000 illustrates data that may be presented with an appearance to reflect where a blend occurred with the datasets. Specifically, graphical interface 2000 illustrates a visual representation of a "blend" report showing statistics and information about a blend.

Figure 21:
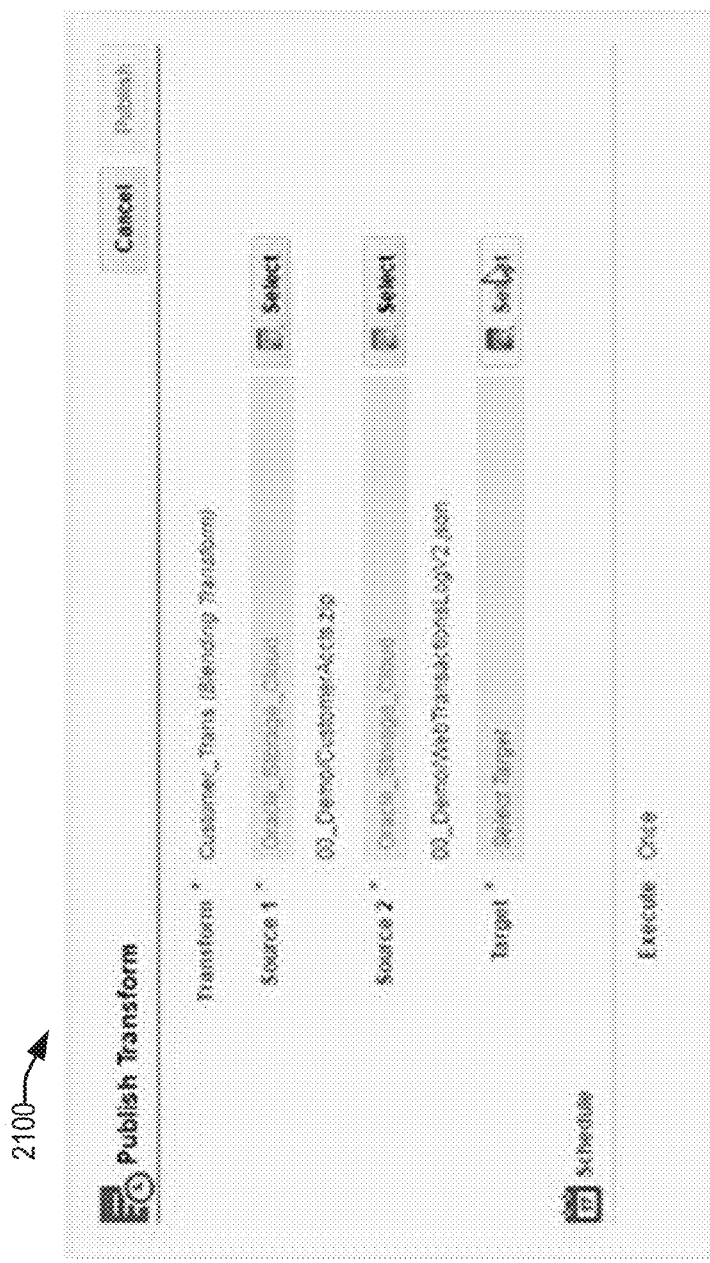
Figure 22:
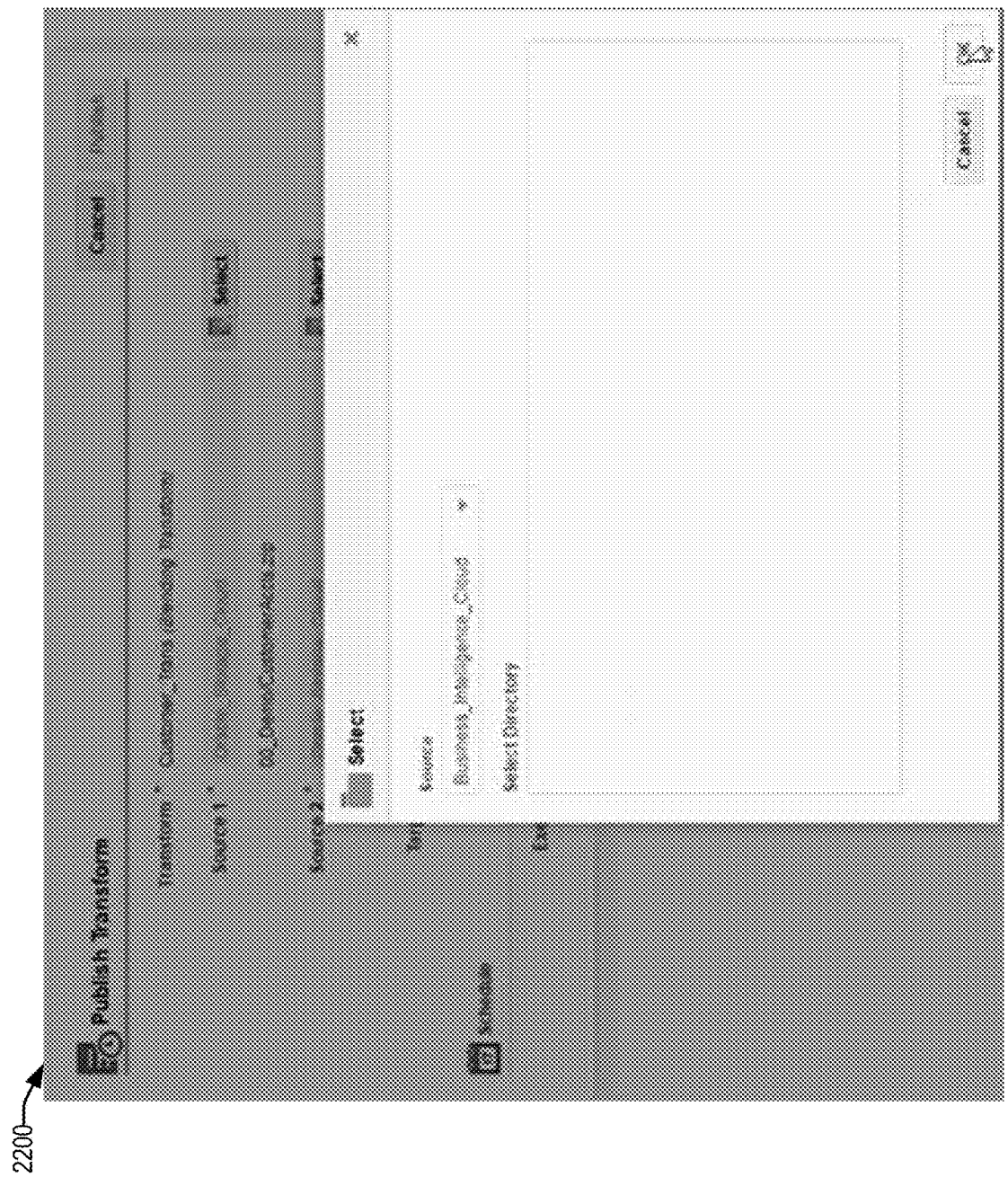

FIG. 21 illustrates a graphical interface 2100 for facilitating transform scripts that are generated for different blends that have been performed. A user can manage one or more transforms for a blend through this graphical interface. A transform script may be generated based on a previous blend of datasets according to a particular type of join. Graphical interface may be interactive to receive input to configure sources for datasets and a target, or destination, for output generated based on blending datasets. Graphical interface 2200 of FIG. 22 may be presented to enable a user to specify a source or a target for interactive fields selected in graphical interface 2100.

Figure 23:
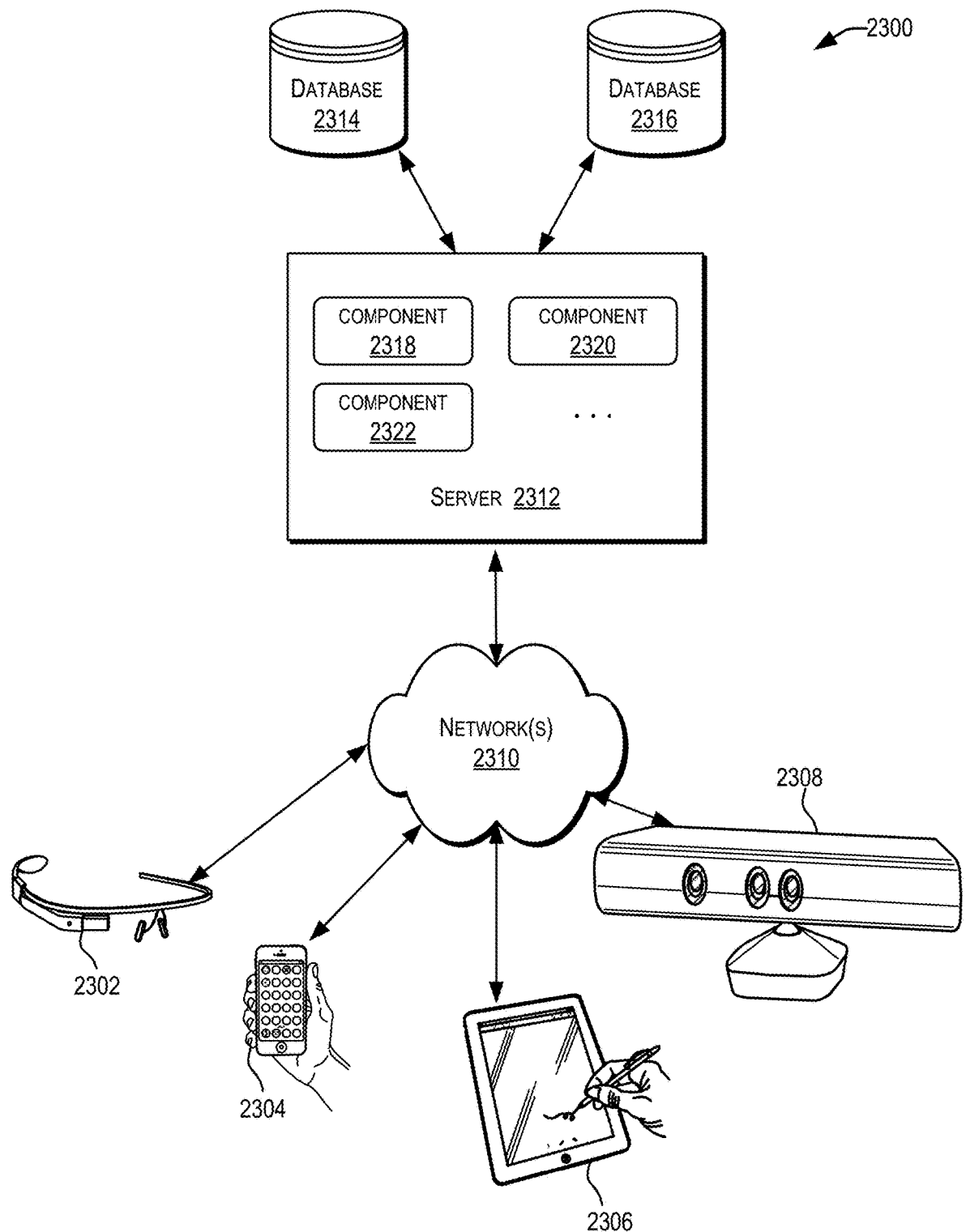
FIG. 23 depicts a simplified diagram of a distributed system for implementing an embodiment.

FIG. 23 depicts a simplified diagram of a distributed system 2300 for implementing an embodiment. In the illustrated embodiment, distributed system 2300 includes one or more client computing devices 2302, 2304, 2306, and 2308, which are configured to execute and operate a client application such as a web browser, proprietary client (e.g., Oracle Forms), or the like over one or more network(s) 2310. Server 2312 may be communicatively coupled with remote client computing devices 2302, 2304, 2306, and 2308 via network 2310.

In various embodiments, server 2312 may be adapted to run one or more services or software applications. In certain embodiments, server 2312 may also provide other services or software applications can include non-virtual and virtual environments. In some embodiments, these services may be offered as web-based or cloud services or under a Software as a Service (SaaS) model to the users of client computing devices 2302, 2304, 2306, and/or 2308. Users operating client computing devices 2302, 2304, 2306, and/or 2308 may in turn utilize one or more client applications to interact with server 2312 to utilize the services provided by these components.

In the configuration depicted in FIG. 23, software components 2318, 2320 and 2322 of system 2300 are shown as being implemented on server 2312. In other embodiments, one or more of the components of system 2300 and/or the services provided by these components may also be implemented by one or more of the client computing devices 2302, 2304, 2306, and/or 2308. Users operating the client computing devices may then utilize one or more client applications to use the services provided by these components. These components may be implemented in hardware, firmware, software, or combinations thereof. It should be appreciated that various different system configurations are possible, which may be different from distributed system 2300. The embodiment shown in FIG. 23 is thus one example of a distributed system for implementing an embodiment system and is not intended to be limiting.

Client computing devices 2302, 2304, 2306, and/or 2308 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2310.

Although distributed system 2300 in FIG. 23 is shown with four client computing devices, any number of client computing devices may be supported. Other devices, such as devices with sensors, etc., may interact with server 2312.

Network(s) 2310 in distributed system 2300 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 2310 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2312 can include one or more virtual machines running virtual operating systems, or other computing architectures involving virtualization. One or more flexible pools of logical storage devices can be virtualized to maintain virtual storage devices for the server. Virtual networks can be controlled by server 2312 using software defined networking. In various embodiments, server 2312 may be adapted to run one or more services or software applications described in the foregoing disclosure. For example, server 2312 may correspond to a server for performing processing as described above according to an embodiment of the present disclosure.

Server 2312 may run an operating system including any of those discussed above, as well as any commercially available server operating system. Server 2312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2312 may include one or more applications to analyze and consolidate data feeds and/or event updates received from users of client computing devices 2302, 2304, 2306, and 2308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2312 may also include one or more applications to display the data feeds and/or real-time events via one or more display devices of client computing devices 2302, 2304, 2306, and 2308.

Distributed system 2300 may also include one or more databases 2314 and 2316. These databases may provide a mechanism for storing information such as user interactions information, usage patterns information, adaptation rules information, and other information used by embodiments of the present disclosure. Databases 2314 and 2316 may reside in a variety of locations. By way of example, one or more of databases 2314 and 2316 may reside on a non-transitory storage medium local to (and/or resident in) server 2312. Alternatively, databases 2314 and 2316 may be remote from server 2312 and in communication with server 2312 via a network-based or dedicated connection. In one set of embodiments, databases 2314 and 2316 may reside in a storage-area network (SAN). Similarly, any necessary files for performing the functions attributed to server 2312 may be stored locally on server 2312 and/or remotely, as appropriate. In one set of embodiments, databases 2314 and 2316 may include relational databases, such as databases provided by Oracle that are adapted to store, update, and retrieve data in response to SQL-formatted commands.

Figure 24:
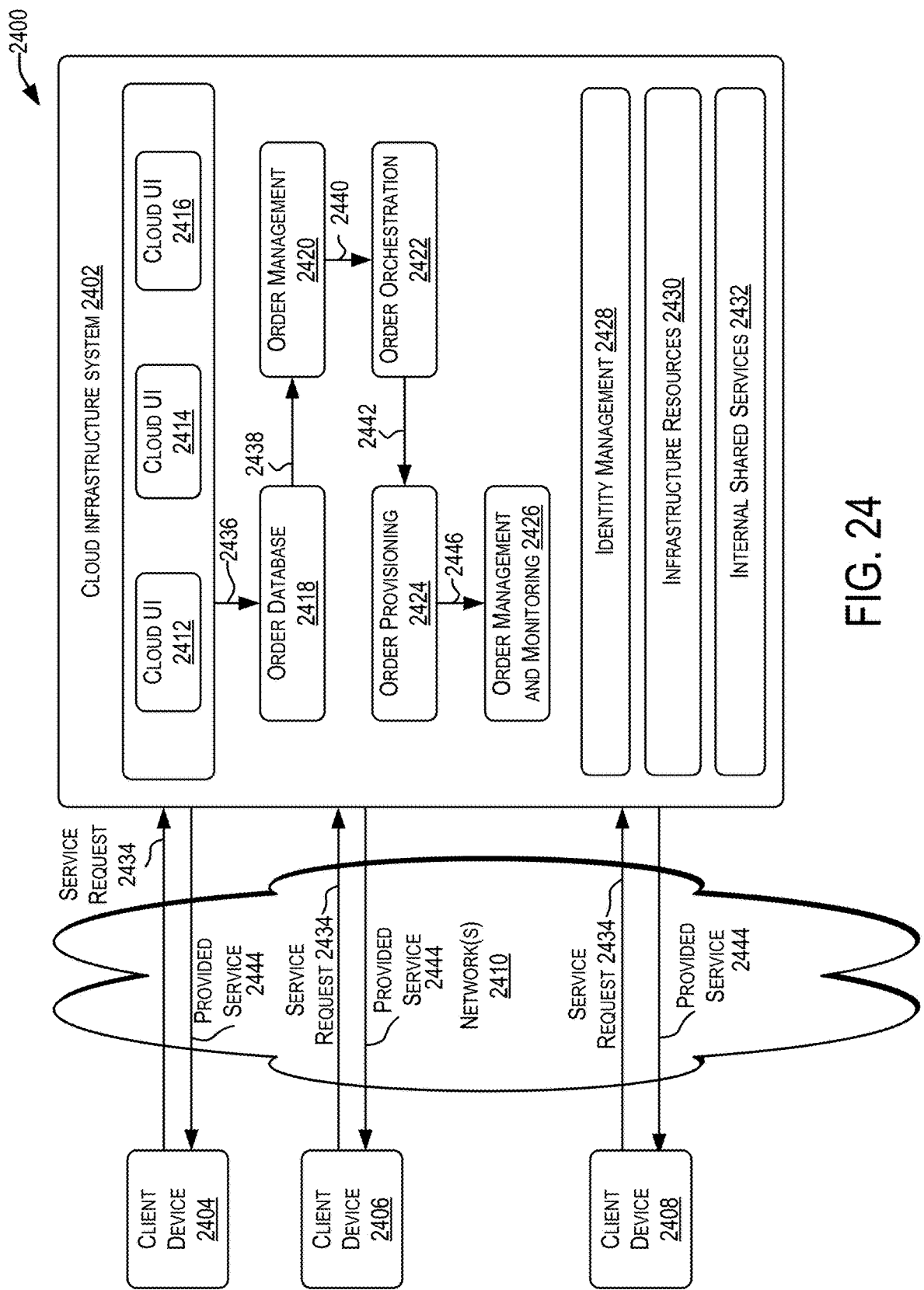
FIG. 24 illustrates a simplified block diagram of one or more components of a system environment in which services may be offered as cloud services, in accordance with an embodiment of the present disclosure.

In some embodiments, a cloud environment may provide one or more service. FIG. 24 is a simplified block diagram of one or more components of a system environment 2400 in which services may be offered as cloud services, in accordance with an embodiment of the present disclosure. In the illustrated embodiment in FIG. 24, system environment 2400 includes one or more client computing devices 2404, 2406, and 2408 that may be used by users to interact with a cloud infrastructure system 2402 that provides cloud services. Cloud infrastructure system 2402 may comprise one or more computers and/or servers that may include those described above for server 2312.

It should be appreciated that cloud infrastructure system 2402 depicted in FIG. 24 may have other components than those depicted. Further, the embodiment shown in FIG. 24 is only one example of a cloud infrastructure system that may incorporate an embodiment of the present disclosure. In some other embodiments, cloud infrastructure system 2402 may have more or fewer components than shown in the figure, may combine two or more components, or may have a different configuration or arrangement of components.

Client computing devices 2404, 2406, and 2408 may be devices similar to those described above for client computing devices 2302, 2304, 2306, and 2308. Client computing devices 2404, 2406, and 2408 may be configured to operate a client application such as a web browser, a proprietary client application (e.g., Oracle Forms), or some other application, which may be used by a user of the client computing device to interact with cloud infrastructure system 2402 to use services provided by cloud infrastructure system 2402. Although exemplary system environment 2400 is shown with three client computing devices, any number of client computing devices may be supported. Other devices such as devices with sensors, etc. may interact with cloud infrastructure system 2402.

Network(s) 2410 may facilitate communications and exchange of data between client computing devices 2404, 2406, and 2408 and cloud infrastructure system 2402. Each network may be any type of network familiar to those skilled in the art that can support data communications using any of a variety of commercially-available protocols, including those described above for network(s) 2310.

In certain embodiments, services provided by cloud infrastructure system 2402 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2402 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2402 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2402 may be adapted to automatically provision, manage and track a customer's subscription to services offered by cloud infrastructure system 2402. Cloud infrastructure system 2402 may provide the cloud services via different deployment models. For example, services may be provided under a public cloud model in which cloud infrastructure system 2402 is owned by an organization selling cloud services (e.g., owned by Oracle Corporation) and the services are made available to the general public or different industry enterprises. As another example, services may be provided under a private cloud model in which cloud infrastructure system 2402 is operated solely for a single organization and may provide services for one or more entities within the organization. The cloud services may also be provided under a community cloud model in which cloud infrastructure system 2402 and the services provided by cloud infrastructure system 2402 are shared by several organizations in a related community. The cloud services may also be provided under a hybrid cloud model, which is a combination of two or more different models.

In some embodiments, the services provided by cloud infrastructure system 2402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2402. Cloud infrastructure system 2402 then performs processing to provide the services in the customer's subscription order.

In some embodiments, the services provided by cloud infrastructure system 2402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2402 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2402 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2402 may also include infrastructure resources 2430 for providing the resources used to provide various services to customers of the cloud infrastructure system. In one embodiment, infrastructure resources 2430 may include pre-integrated and optimized combinations of hardware, such as servers, storage, and networking resources to execute the services provided by the PaaS platform and the SaaS platform, and other resources.

In some embodiments, resources in cloud infrastructure system 2402 may be shared by multiple users and dynamically re-allocated per demand. Additionally, resources may be allocated to users in different time zones. For example, cloud infrastructure system 2402 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2432 may be provided that are shared by different components or modules of cloud infrastructure system 2402 to enable provision of services by cloud infrastructure system 2402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2402, and the like.

In one embodiment, as depicted in FIG. 24, cloud management functionality may be provided by one or more modules, such as an order management module 2420, an order orchestration module 2422, an order provisioning module 2424, an order management and monitoring module 2426, and an identity management module 2428. These modules may include or be provided using one or more computers and/or servers, which may be general purpose computers, specialized server computers, server farms, server clusters, or any other appropriate arrangement and/or combination.

In an exemplary operation, at step 2434, a customer using a client device, such as client computing devices 2404, 2406 or 2408, may interact with cloud infrastructure system 2402 by requesting one or more services provided by cloud infrastructure system 2402 and placing an order for a subscription for one or more services offered by cloud infrastructure system 2402. In certain embodiments, the customer may access a cloud User Interface (UI) such as cloud UI 2412, cloud UI 2414 and/or cloud UI 2416 and place a subscription order via these UIs. The order information received by cloud infrastructure system 2402 in response to the customer placing an order may include information identifying the customer and one or more services offered by the cloud infrastructure system 2402 that the customer intends to subscribe to.

At step 2436, the order information received from the customer may be stored in an order database 2418. If this is a new order, a new record may be created for the order. In one embodiment, order database 2418 can be one of several databases operated by cloud infrastructure system 2418 and operated in conjunction with other system elements.

At step 2438, the order information may be forwarded to an order management module 2420 that may be configured to perform billing and accounting functions related to the order, such as verifying the order, and upon verification, booking the order.

At step 2440, information regarding the order may be communicated to an order orchestration module 2422 that is configured to orchestrate the provisioning of services and resources for the order placed by the customer. In some instances, order orchestration module 2422 may use the services of order provisioning module 2424 for the provisioning. In certain embodiments, order orchestration module 2422 enables the management of business processes associated with each order and applies business logic to determine whether an order should proceed to provisioning.

As shown in the embodiment depicted in FIG. 24, at step 2442, upon receiving an order for a new subscription, order orchestration module 2422 sends a request to order provisioning module 2424 to allocate resources and configure resources needed to fulfill the subscription order. Order provisioning module 2424 enables the allocation of resources for the services ordered by the customer. Order provisioning module 2424 provides a level of abstraction between the cloud services provided by cloud infrastructure system 2400 and the physical implementation layer that is used to provision the resources for providing the requested services. This enables order orchestration module 2422 to be isolated from implementation details, such as whether or not services and resources are actually provisioned on the fly or pre-provisioned and only allocated/assigned upon request.

At step 2444, once the services and resources are provisioned, a notification may be sent to the subscribing customers indicating that the requested service is now ready for use. In some instance, information (e.g. a link) may be sent to the customer that enables the customer to start using the requested services.

At step 2446, a customer's subscription order may be managed and tracked by an order management and monitoring module 2426. In some instances, order management and monitoring module 2426 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2400 may include an identity management module 2428 that is configured to provide identity services, such as access management and authorization services in cloud infrastructure system 2400. In some embodiments, identity management module 2428 may control information about customers who wish to utilize the services provided by cloud infrastructure system 2402. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

Figure 25:
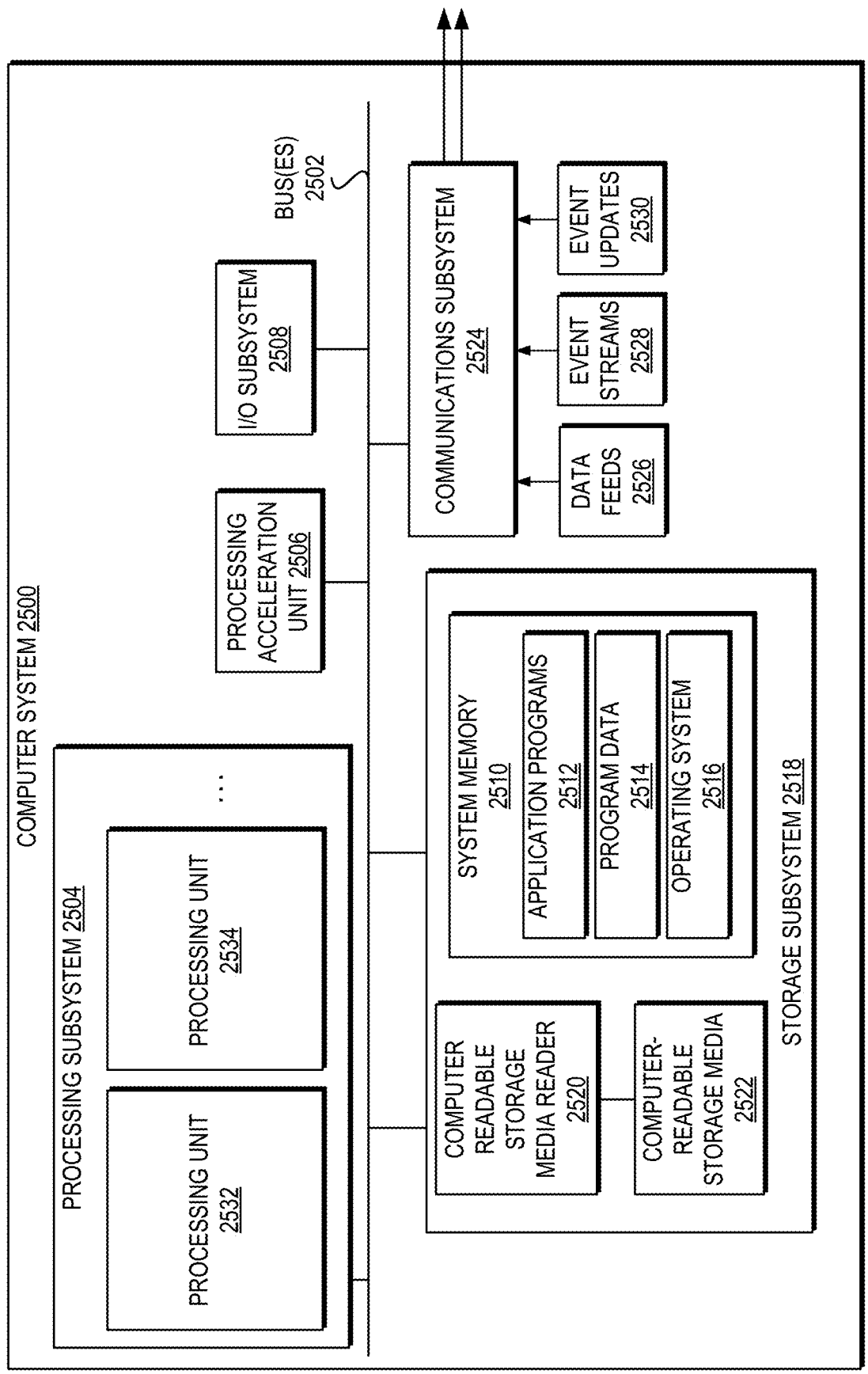
FIG. 25 illustrates an exemplary computer system that may be used to implement an embodiment of the present disclosure.

FIG. 25 illustrates an exemplary computer system 2500 that may be used to implement an embodiment of the present disclosure. In some embodiments, computer system 2500 may be used to implement any of the various servers and computer systems described above. As shown in FIG. 25, computer system 2500 includes various subsystems including a processing unit 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 may include tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2504 controls the operation of computer system 2500 and may comprise one or more processing units 2532, 2534, etc. A processing unit may include be one or more processors, including single core or multicore processors, one or more cores of processors, or combinations thereof. In some embodiments, processing subsystem 2504 can include one or more special purpose co-processors such as graphics processors, digital signal processors (DSPs), or the like. In some embodiments, some or all of the processing units of processing subsystem 2504 can be implemented using customized circuits, such as application specific integrated circuits (ASICs), or field programmable gate arrays (FPGAs).

In some embodiments, the processing units in processing subsystem 2504 can execute instructions stored in system memory 2510 or on computer readable storage media 2522. In various embodiments, the processing units can execute a variety of programs or code instructions and can maintain multiple concurrently executing programs or processes. At any given time, some or all of the program code to be executed can be resident in system memory 2510 and/or on computer-readable storage media 2522 including potentially on one or more storage devices. Through suitable programming, processing subsystem 2504 can provide various functionalities described above for semantic searching.

In certain embodiments, a processing acceleration unit 2506 may be provided for performing customized processing or for off-loading some of the processing performed by processing subsystem 2504 so as to accelerate the overall processing performed by computer system 2500.

I/O subsystem 2508 may include devices and mechanisms for inputting information to computer system 2500 and/or for outputting information from or via computer system 2500. In general, use of the term "input device" is intended to include all possible types of devices and mechanisms for inputting information to computer system 2500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2518 provides a repository or data store for storing information that is used by computer system 2500. Storage subsystem 2518 provides a tangible non-transitory computer-readable storage medium for storing the basic programming and data constructs that provide the functionality of some embodiments. Software (programs, code modules, instructions) that when executed by processing subsystem 2504 provide the functionality described above may be stored in storage subsystem 2518. The software may be executed by one or more processing units of processing subsystem 2504. Storage subsystem 2518 may also provide a repository for storing data used in accordance with the present disclosure.

Storage subsystem 2518 may include one or more non-transitory memory devices, including volatile and non-volatile memory devices. As shown in FIG. 25, storage subsystem 2518 includes a system memory 2510 and a computer-readable storage media 2522. System memory 2510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2500, such as during start-up, may typically be stored in the ROM. The RAM typically contains data and/or program modules that are presently being operated and executed by processing subsystem 2504. In some implementations, system memory 2510 may include multiple different types of memory, such as static random access memory (SRAM) or dynamic random access memory (DRAM).

By way of example, and not limitation, as depicted in FIG. 25, system memory 2510 may store application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2522 may store programming and data constructs that provide the functionality of some embodiments. Software (programs, code modules, instructions) that when executed by processing subsystem 2504 a processor provide the functionality described above may be stored in storage subsystem 2518. By way of example, computer-readable storage media 2522 may include non-volatile memory such as a hard disk drive, a magnetic disk drive, an optical disk drive such as a CD ROM, DVD, a Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2522 may provide storage of computer-readable instructions, data structures, program modules, and other data for computer system 2500.

In certain embodiments, storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for storing computer-readable information.

In certain embodiments, computer system 2500 may provide support for executing one or more virtual machines. Computer system 2500 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2500. Accordingly, multiple operating systems may potentially be run concurrently by computer system 2500. Each virtual machine generally runs independently of the other virtual machines.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to establish a communication channel to one or more client computing devices via the Internet for receiving and sending information from and to the client computing devices.

Communication subsystem 2524 may support both wired and/or wireless communication protocols. For example, in certain embodiments, communications subsystem 2524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

Communication subsystem 2524 can receive and transmit data in various forms. For example, in some embodiments, communications subsystem 2524 may receive input communication in the form of structured and/or unstructured data feeds 2526, event streams 2528, event updates 2530, and the like. For example, communications subsystem 2524 may be configured to receive (or send) data feeds 2526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2524 may be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2500 depicted in FIG. 25 is intended only as a specific example. Many other configurations having more or fewer components than the system depicted in FIG. 25 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been disclosed, these are not intended to be limiting. Various modifications and equivalents are within the scope of the following claims.

What is claimed is:

1. A method comprising, at a computer system:
    generating first profile metadata for each column of a first plurality of columns in a first dataset stored a first data source;
    generating second profile metadata for each column of a second plurality of columns in a second dataset stored a second data source;
    identifying, based on the first profile metadata and the second profile metadata, a plurality of column pairs between the first dataset and the second dataset, wherein columns in each of the plurality of column pairs have a relationship;

determining one or more recommendations for blending each of one or more column pairs of the plurality of column pairs that have the relationship;

determining one or more types of join functions that can be applied to each of the one or more column pairs based on the one or more recommendations for blending each of the one or more column pairs; and generating a first graphical interface to display each of the one or more types of join functions that can be applied to each of the one or more column pairs that have the relationship, wherein the first graphical interface is configured to receive a selection of the one or more types of join functions that can be applied to each of the one or more column pairs that have the relationship.

2. The method of claim 1, wherein each of the one or more types of join functions are displayed showing a diagram of a type of join function for joining the first dataset with the second dataset by columns in a different column pair of the plurality of column pairs, and wherein the diagram of the type of join function displayed for the type of join function is displayed with a visual appearance where columns in a first column pair are joined between the first dataset and the second dataset.

3. The method of claim 1, further comprising:
receiving a first input corresponding to selection of a first type of join function of the one or more types of join functions; and
generating a second graphical interface to display a third dataset based on joining, according to the first type of join function, the first dataset at a first column within a first column pair with the second dataset at a second column in the first column pair, wherein the third dataset is displayed with a visual appearance that indicates columns in the first column pair where the first dataset and the second dataset are joined to form the third dataset.

4. The method of claim 3, further comprising:
generating the third dataset based on joining, according to the first type of join function, the first dataset at the first column within the first column pair with the second dataset at the second column in the first column pair.

5. The method of claim 3, wherein the method further comprises:
receiving a second input corresponding to a selection of a second type of join function of the one or more types of join functions; and
updating the second graphical interface to display a fourth third dataset based on joining, according to the second type of join function, the first dataset at a first column within a second column pair with the second dataset at a second column in the second column pair.

6. The method of claim 1, wherein the one or more types of join functions includes a left join, a right join, or an outer join.

7. The method of claim 1, wherein the first graphical interface presents each of the identified column pairs with one of the one or more types of join functions.

8. A system comprising:
one or more processors; and
a memory accessible to the one or more processors, the memory comprising instructions that, when executed by the one or more processors, cause the one or more processors to:
generate first profile metadata for each column of a first plurality of columns in a first dataset stored a first data source;

generate second profile metadata for each column of a second plurality of columns in a second dataset stored a second data source;

identify, based on the first profile metadata and the second profile metadata, a plurality of column pairs between the first dataset and the second dataset, wherein columns in each of the plurality of column pairs have a relationship;

determining one or more recommendations for blending each of one or more column pairs of the plurality of column pairs that have the relationship;

determine one or more types of join functions that can be applied to each of the one or more column pairs based on the one or more recommendations for blending each of the one or more column pairs; and generate a first graphical interface to display each of the one or more types of join functions that can be applied to each of the one or more column pairs that have the relationship, wherein the first graphical interface is configured to receive a selection of the one or more types of join functions that can be applied to each of the one or more column pairs that have the relationship.

9. The system of claim 8, wherein each of the one or more types of join functions are displayed showing a diagram of a type of join function for joining the first dataset with the second dataset by columns in a different column pair of the plurality of column pairs, and wherein the diagram of the type of join function displayed for the type of join function is displayed with a visual appearance where columns in a first column pair are joined between the first dataset and the second dataset.

10. The system of claim 8, further comprising, causing the one or more processors to:
receive a first input corresponding to selection of a first type of join function of the one or more types of join functions; and
generate a second graphical interface to display a third dataset based on joining, according to a first type of join function, the first dataset at a first column within a first column pair with the second dataset at a second column in the first column pair, wherein the third dataset is displayed with an visual appearance that indicates columns in the first column pair where the first dataset and the second dataset are joined to form the third dataset.

11. The system of claim 10, wherein the instructions, when executed by the one or more processors, further cause the one or more processors to:
generate the third dataset based on joining, according to the first type of join function, the first dataset at the first column within the first column pair with the second dataset at the second column in the first column pair.

12. The system of claim 10, wherein the instructions, when executed by the one or more processors, further cause the one or more processors to:
receive a second input corresponding to a selection of a second type of join function of the one or more types of join functions; and
update the second graphical interface to display a fourth third dataset based on joining, according to the second type of join function, the first dataset at a first column within a second column pair with the second dataset at a second column in the second column pair.

13. The system of claim 8, wherein the one or more types of join functions includes a left join, a right join, or an outer join.

14. A non-transitory computer readable medium storing one or more instructions that are executable by one or more processors to cause the one or more processors to:
- generate first profile metadata for each column of a first plurality of columns in a first dataset stored a first data source;
- generate second profile metadata for each column of a second plurality of columns in a second dataset stored a second data source;
- identify, based on the first profile metadata and the second profile metadata, a plurality of column pairs between the first dataset and the second dataset, wherein columns in each of the plurality of column pairs have a relationship;
- determine one or more recommendations for blending each of one or more column pairs of the plurality of column pairs that have the relationship;
- determine one or more types of join functions that can be applied to each of the one or more column pairs based on the one or more recommendations for blending each of the one or more column pairs; and
- generate a first graphical interface to display each of the one or more types of join functions that can be applied to each of the one or more column pairs that have the relationship, wherein the first graphical interface is configured to receive a selection of the one or more types of join functions that can be applied to each of the one or more column pairs that have the relationship.

15. The non-transitory computer readable medium of claim 14, wherein each of the one or more types of join functions are displayed showing a diagram of a type of join function for joining the first dataset with the second dataset by columns in a different column pair of the plurality of column pairs, and wherein the diagram of the type of join function displayed for the type of join function is displayed with a visual appearance where columns in a first column pair are joined between the first dataset and the second dataset.

16. The non-transitory computer readable medium of claim 14, further comprising instructions that cause the one or more processors to:
- receive a first input corresponding to selection of a first type of join function of the one or more types of join functions; and
- generate a second graphical interface to display a third dataset based on joining, according to a first type of join function, the first dataset at a first column within a first column pair with the second dataset at a second column in the first column pair,
- wherein the third dataset is displayed with a visual appearance that indicates columns in the first column pair where the first dataset and the second dataset are joined to form the third dataset.

17. The non-transitory computer readable medium of claim 16, wherein the one or more instructions are executable by the one or more processors to further cause the one or more processors to:
- generate the third dataset based on joining, according to the first type of join function, the first dataset at the first column within the first column pair with the second dataset at the second column in the first column pair.

18. The non-transitory computer readable medium of claim 16, and wherein the one or more instructions are executable by the one or more processors to further cause the one or more processors to:
- receive a second input corresponding to selection of a second type of join function of the one or more types of join functions; and
- update the second graphical interface to display a fourth third dataset based on joining, according to the second type of join function, the first dataset at a first column within a second column pair with the second dataset at a second column in the second column pair.

19. The non-transitory computer readable medium of claim 14, wherein the one or more types of join functions includes a left join, a right join, or an outer join.

20. The non-transitory computer readable medium of claim 14, wherein the first graphical interface presents each of the identified column pairs with one of the one or more types of join functions.

* * * * *

UNITED STATES PATENT AND TRADEMARK OFFICE
CERTIFICATE OF CORRECTION

PATENT NO. : 11,200,248 B2
APPLICATION NO. : 16/731850
DATED : December 14, 2021
INVENTOR(S) : Murray et al.

It is certified that error appears in the above-identified patent and that said Letters Patent is hereby corrected as shown below:

On the Title Page

On page 2, Column 1, item (56) under Other Publications, Line 4, delete "Genism," and insert -- Gensim, --, therefor.

On page 2, Column 1, item (56) under Other Publications, Line 7, delete "HadoopMap Reduce" and insert -- Hadoop MapReduce --, therefor.

On page 2, Column 2, item (56) under Other Publications, Line 10, delete "(Cioudera)" and insert -- (Cloudera) --, therefor.

On page 2, Column 2, item (56) under Other Publications, Line 10, delete "(Cioudera)," and insert -- (Cloudera), --, therefor.

In the Specification

In Column 2, Line 33, after "enable" delete "may".

In Column 4, Line 13, delete "third dataset" and insert -- dataset --, therefor.

In Column 8, Line 20, delete "Extended" and insert -- Extensible --, therefor.

In Column 11, Line 51, delete "extended" and insert -- extensible --, therefor.

In Column 14, Line 29, delete "1: M" and insert -- 1:M --, therefor.

In Column 15, Lines 51-52, delete "hexidecimal" and insert -- hexadecimal --, therefor.

In Column 15, Line 59, delete "constraints constraints." and insert -- constraints. --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,200,248 B2

In Column 19, Line 17, after "identified)" insert -- . --.

In Column 25, Line 3, delete "Based" and insert -- based --, therefor.

In Column 27, Line 27, delete "column 0003" and insert -- column_0003 --, therefor.

In Column 27, Line 28, delete "date time_02," and insert -- date_time_02, --, therefor.

In Column 29, Line 22, delete "for for" and insert -- for --, therefor.

In Column 35, Line 7, delete "AND" and insert -- and --, therefor.

In Column 37, Line 48, delete "that that" and insert -- that --, therefor.

In Column 37, Line 54, delete "Uniqness" and insert -- Uniqueness --, therefor.

In Column 48, Line 27, delete "Enhanced" and insert -- Extended --, therefor.

In the Claims

In Column 53, Line 49, in Claim 5, delete "third dataset" and insert -- dataset --, therefor.

In Column 54, Line 61, in Claim 12, delete "third dataset" and insert -- dataset --, therefor.

In Column 56, Line 29, in Claim 18, delete "third dataset" and insert -- dataset --, therefor.